INVENTOR
JOSEPH A. KIMLINGER
BY Thomas J. Nikolai
AGENT

INSTRUCTION FORMAT

GENERAL

| $I^{23}$ — $I^{20}$ | $I^{19}$ | $I^{18}$ — $I^{16}$ | $I^{15}$ — $I^{13}$ | $I^{12}$ – $I^{11}$ | $I^{10}$ | $I^9$ — $I^0$ |
|---|---|---|---|---|---|---|
| N |  | F | T | J | O | A |

SHIFT

| $I^{23}$ — $I^{20}$ | $I^{15}$ — $I^{11}$ | $I^{10}$ | $I^9$ — $I^0$ |
|---|---|---|---|
| N | SK |  | A |

REPEAT

| $I^{23}$ — $I^{20}$ | $I^{12}$ – $I^{11}$ | $I^9$ — $I^0$ |
|---|---|---|
| N | R | RK |

STOP-JUMP

| $I^{23}$ — $I^{20}$ | $I^{18}$ — $I^{16}$ | $I^9$ — $I^0$ |
|---|---|---|
| N | SJ | NI |

WHERE:
- N is the INSTRUCTION OPERATION CODE
- F is the "FROM" DESIGNATOR
- T is the "TO" DESIGNATOR
- J is the "JUMP" DESIGNATOR
- O is the EXTERNAL FUNCTION DESIGNATOR
- A is an ADDRESS OR A CONSTANT
- SK is the SHIFT COUNTER
- R is the REPEAT DESIGNATOR
- RK is the REPEAT COUNTER
- SJ is the STOP-JUMP SELECTION
- NI is the ENTRANCE INSTRUCTION

INSTRUCTION FORMAT

*Fig. 2*

| F TRANSLATION | T TRANSLATION | SJ TRANSLATION | R TRANSLATION |
|---|---|---|---|
| 0. NOT USED | 0. NOT USED | 0. MACHINE JUMP | 0. TERM. NO ADV. |
| 1. HSM | 1. HSM | 1. KEY 1 JUMP | 1. TERM. ADV. |
| 2. NOT USED | 2. SEARCH WRITE | 2. KEY 2 JUMP | 2. NON TERM. NO ADV. |
|  |  |  | 3. NON TERM. ADV. |
| 3. I/O | 3. I/O | 3. KEY 3 JUMP | J TRANSLATION |
| 4. A | 4. A | 4. MACHINE STOP | 0. NOT USED |
| 5. SR | 5. NOT USED | 5. KEY 5 STOP | 1. SKIP A = 0 |
| 6. EKR | 6. NOT USED | 6. KEY 6 STOP | 2. SKIP A ≠ 0 |
| 7. $PCR_A$ | 7. NOT USED | 7. KEY 7 STOP | 3. SKIP A NEG. |

*Fig. 3*

| SUBCOMMAND | | |
|---|---|---|
| 0. $Z_N \longrightarrow$ SAC * | 10. TEST '$PCR_T$' THEN $Z \longrightarrow (PCR_T)$ *** FOR $PCR_T = M$ THEN $Z \longrightarrow M_{SAZ}$ | 17. $M_{SAZ} \longrightarrow Z$ |
| 1. $Z_A \longrightarrow$ SAC | | 18. $Z \longrightarrow$ SH |
| 2. TEST 'A' FOR SKIP (SEE J) IF NO-SKIP ADV. SAC | 11. $Z \longrightarrow$ PCR | 19. ADD PULSE 1 |
| 3. ADV. PAZ | 12. $X_A \longrightarrow PCR_A$ | 20. ADD PULSE 2 |
| 4. $PCR_A \longrightarrow$ PAZ | 13. $Z \longrightarrow X$ | 21. $Z \longrightarrow$ SE (SEARCH COMMAND) |
| 5. SET REPEAT CONDITIONS ** | 14. $Z' \longrightarrow X$ | 22. CHECK EK FOR INPUT (FIND FROM SE) IF NO FIND ADV. SAC |
| 6. $M_{PAZ} \longrightarrow Z$ (ADV. PAZ) | 15. CLEAR $X_A$ FOR $Z_A = 1$ | |
| 7. $Z_A \longrightarrow$ SAZ | 16. TEST $PCR_F$ THEN $(PCR_F) \longrightarrow Z$ **** FOR $PCR_F = M$ THEN $M_{SAZ} \longrightarrow Z$ | 23. TEST JUMP KEYS – NOT SET? ADV. SAC TEST STOP KEYS – IF SET – STOP CLOCK ON NEXT $Z_A \longrightarrow$ SAC |
| 8. SAC * (CLEAR) | | |
| 9. $A \longrightarrow Z$ | | |

\* SUB COMMAND 0 & 8 CAUSE AN AUTOMATIC SEQUENCE AS FOLLOWS:

1. $M_{SAC} \longrightarrow Z$

2. $Z_A \longrightarrow$ SAC

\*\* INHIBIT PAZ FROM COUNTING; ADV $PCR_A$ EACH $Z_N \longrightarrow$ SAC
COUNT SAZ (IF R. DESIGNATOR INDICATES "ADV")
INHIBIT $Z_A \longrightarrow$ SAZ AFTER NEXT REFERENCE
INHIBIT $Z_A \longrightarrow PCR_A$ AFTER NEXT $Z_A \longrightarrow$ SAZ REFERENCE
INHIBIT CLEAR PULSE FOR $PCR_A$ AFTER NEXT $Z_A \longrightarrow$ SAZ REFERENCE
IF R DESIGNATOR INDICATES "TERMINATED" – CLEAR REPEAT
CONDITIONS WITH $PCR_A$ OVERFLOW \*\*\* IF $PCR_T =$ SEARCH, WRITE INTO SEARCH MEMORY
IF $PCR_T =$ I/O, WAIT FOR I/O EQUIPMENT AFTER SENDING WORD

\*\*\*\* IF "F" = I/O, WAIT FOR I/O EQUIPMENT TO SEND WORD

*Fig. 4*

Aug. 23, 1966  J. A. KIMLINGER  3,268,872
STORED PROGRAM DATA PROCESSING SYSTEM
Filed Oct. 1, 1962  28 Sheets-Sheet 7
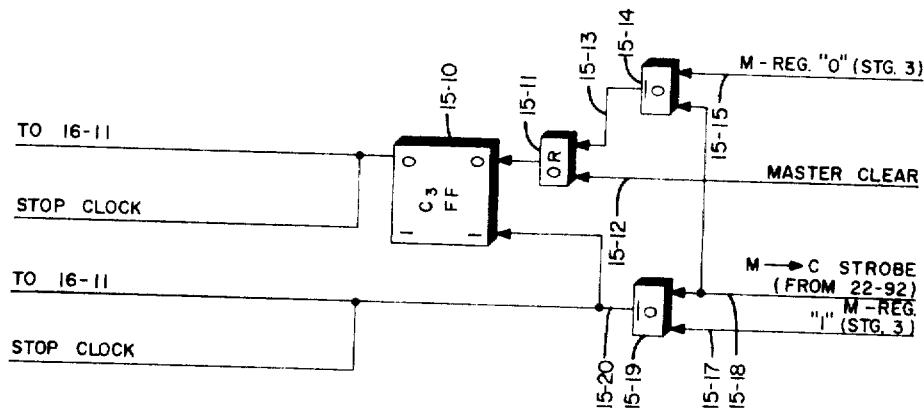
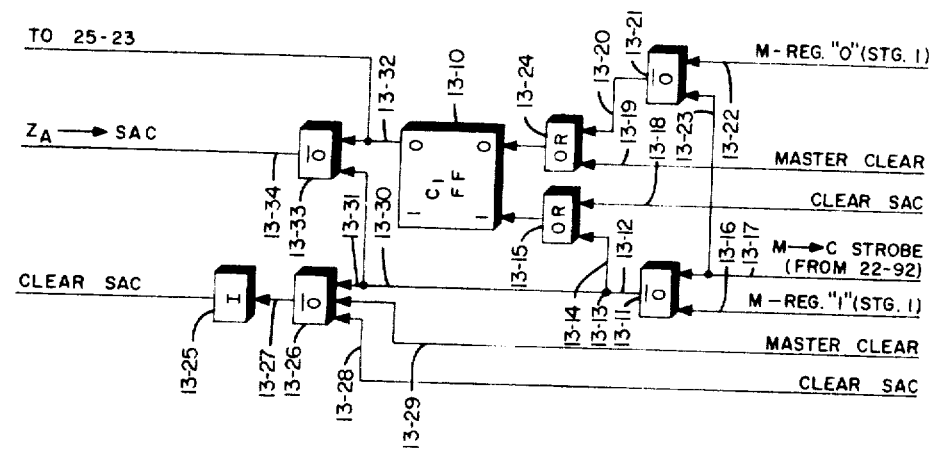
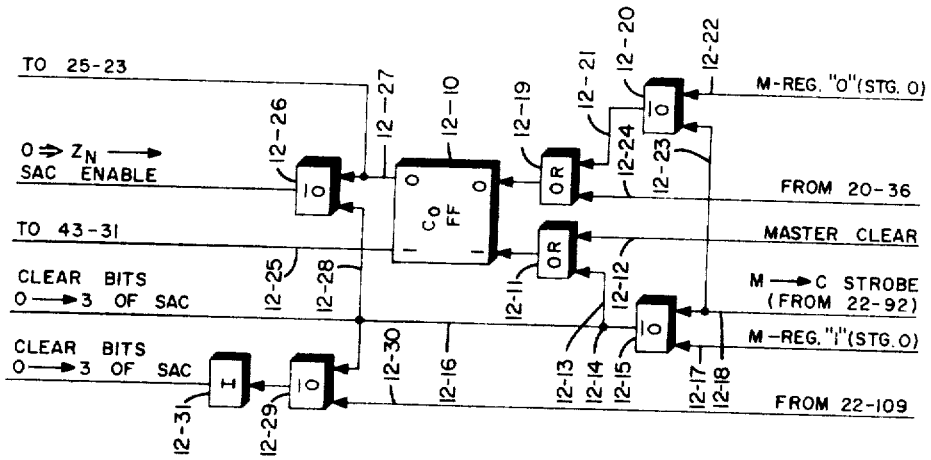

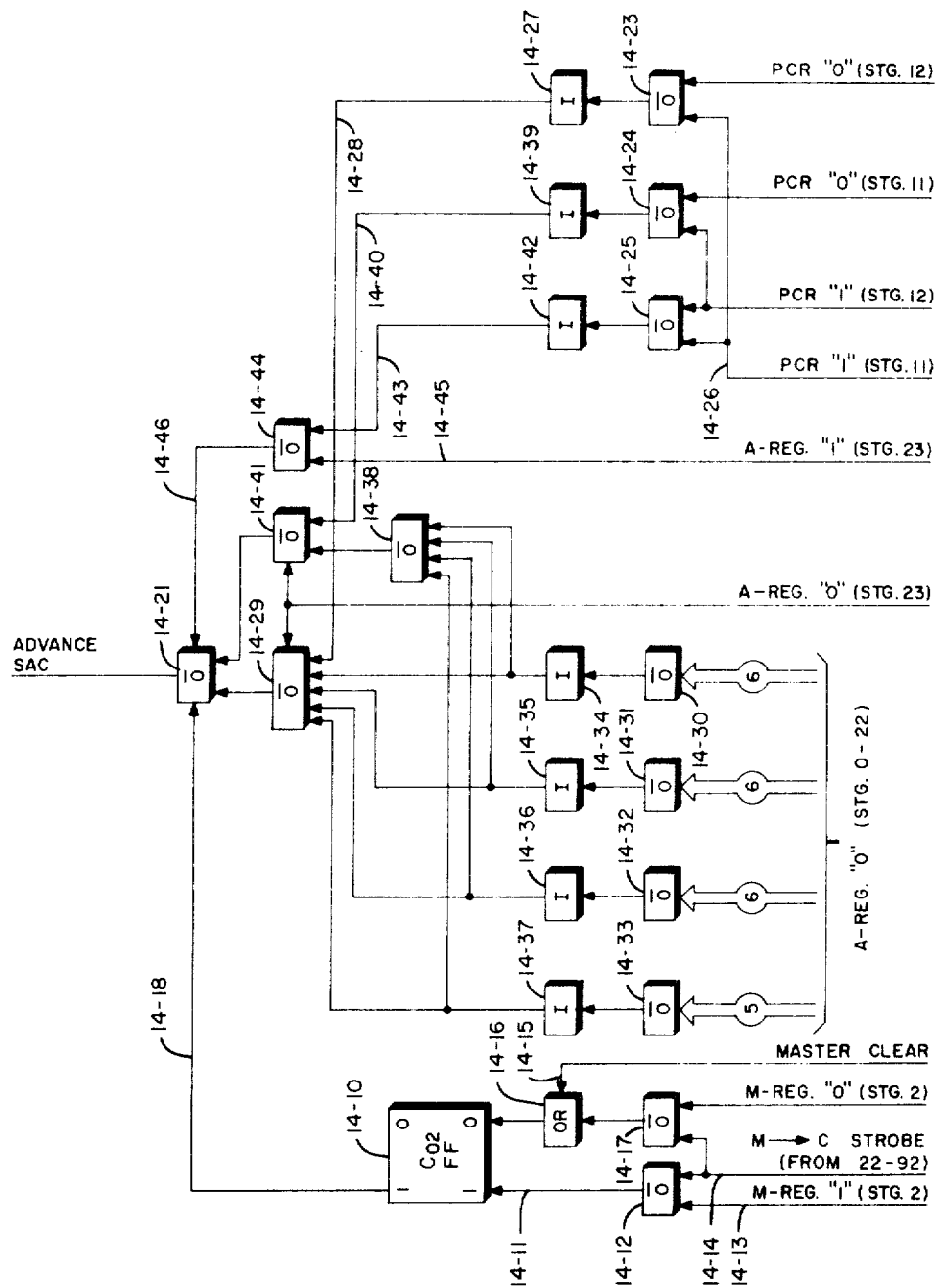

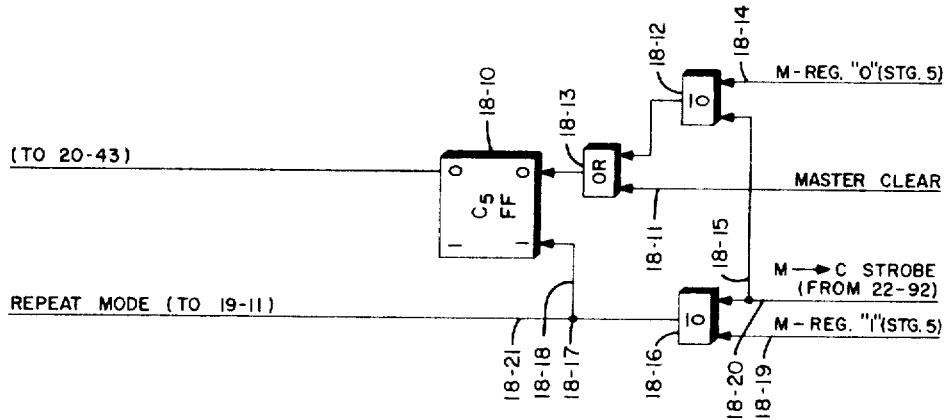
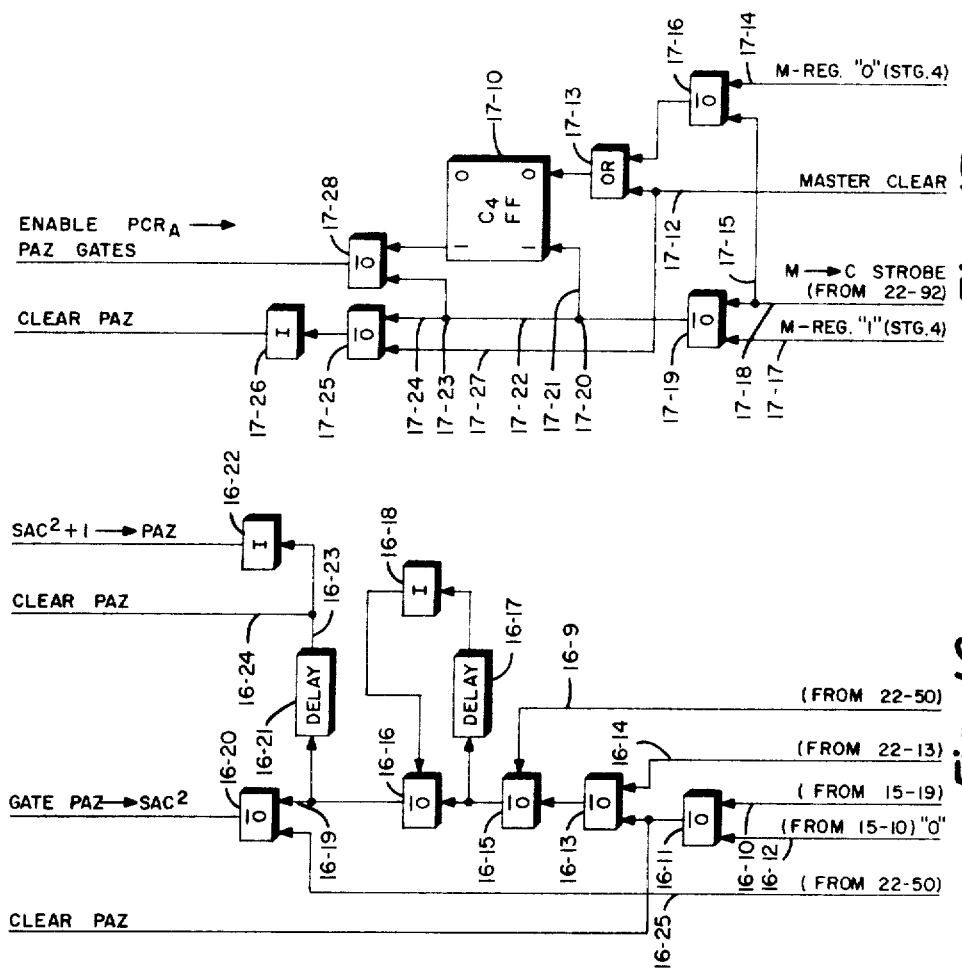

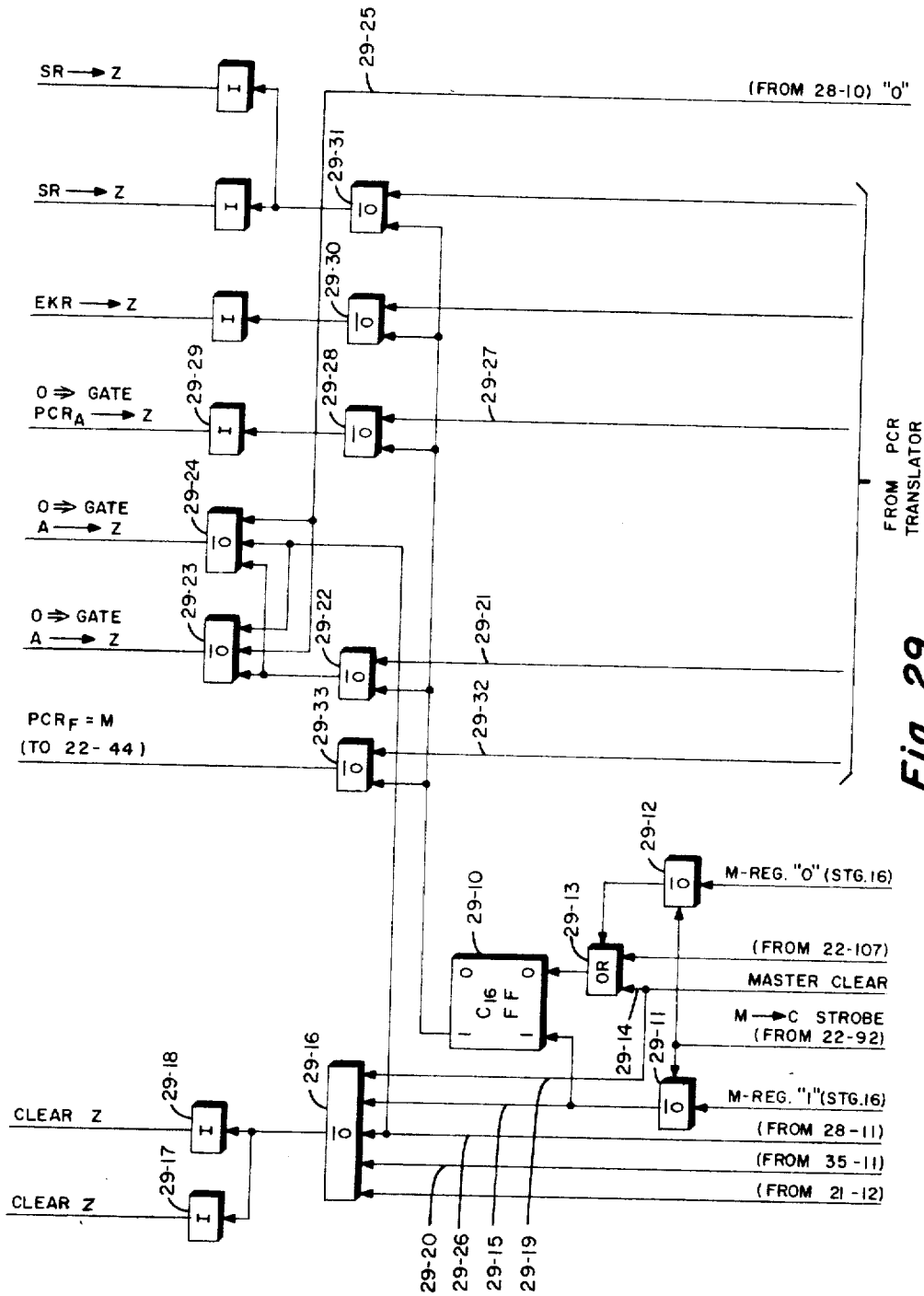

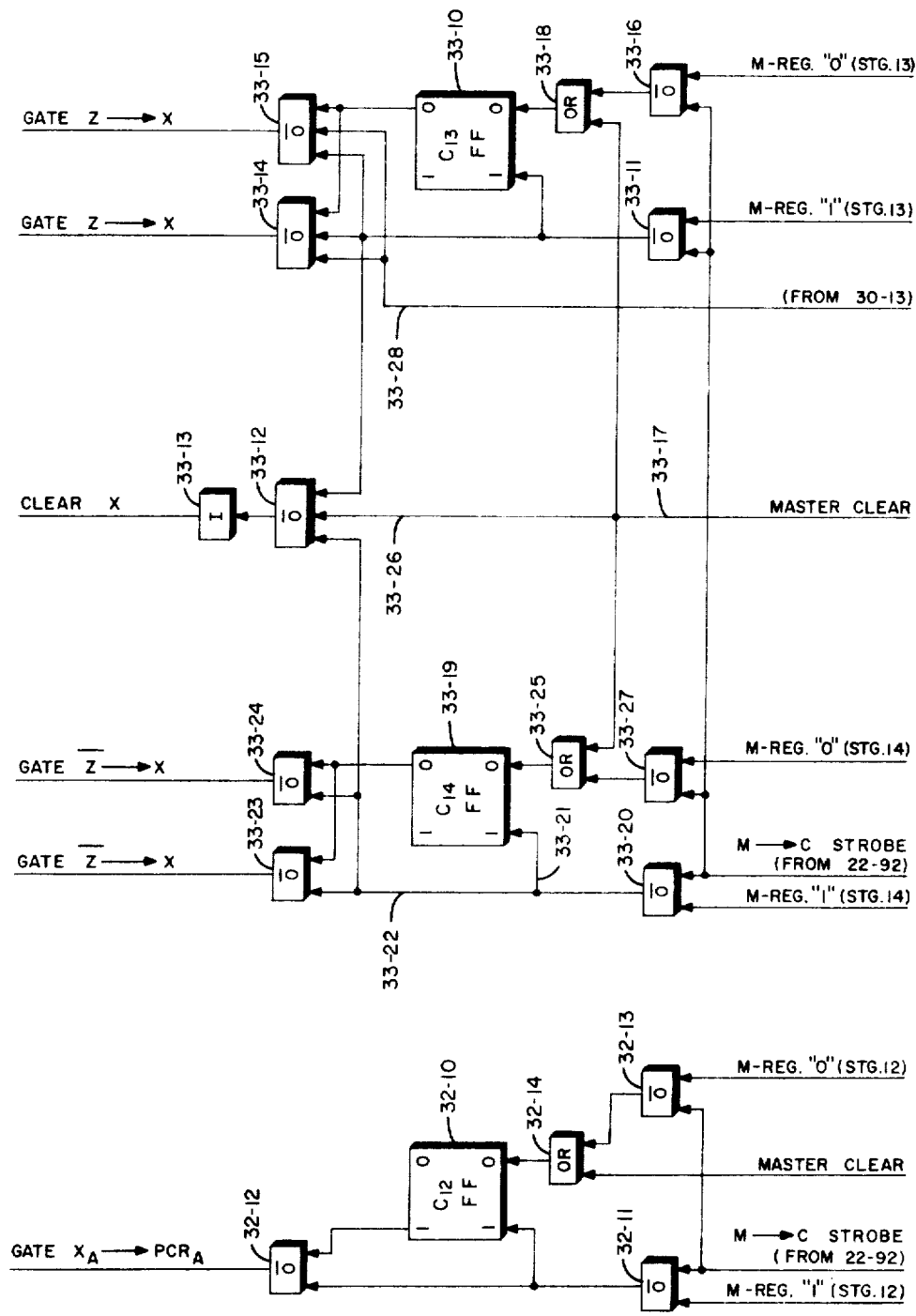

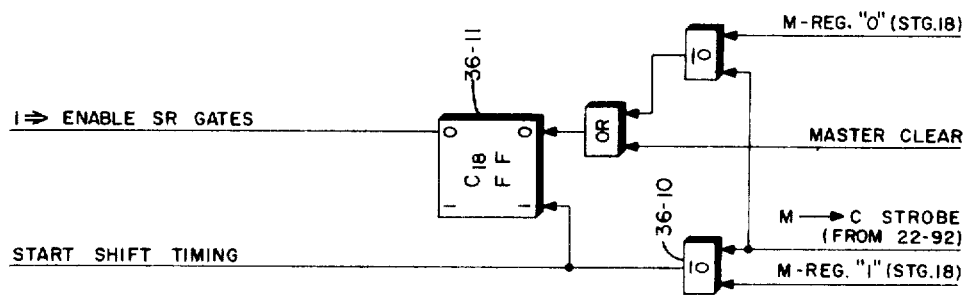
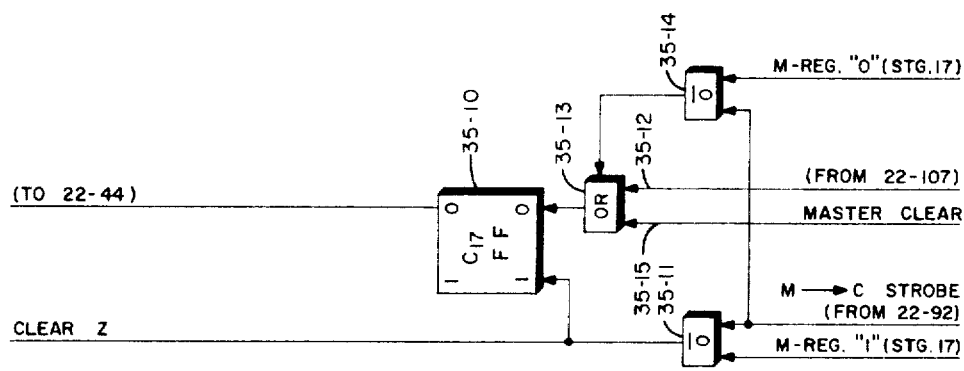
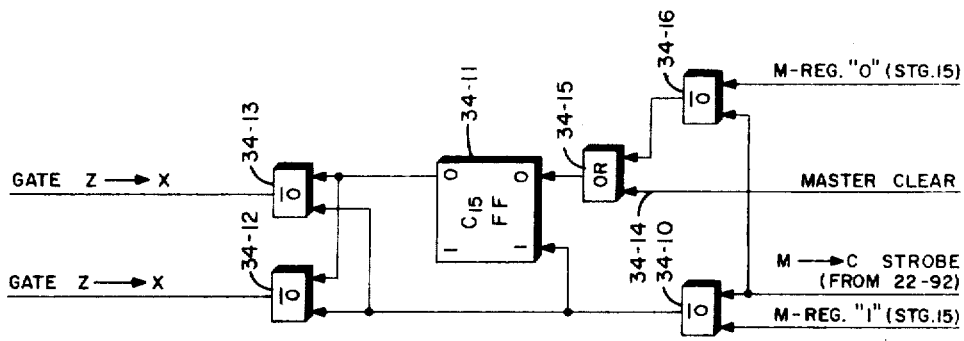

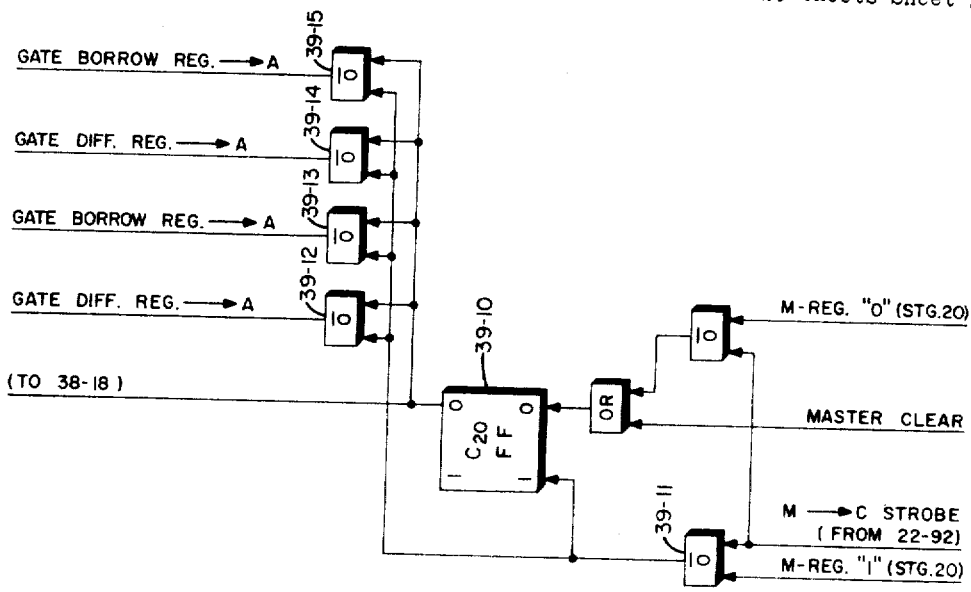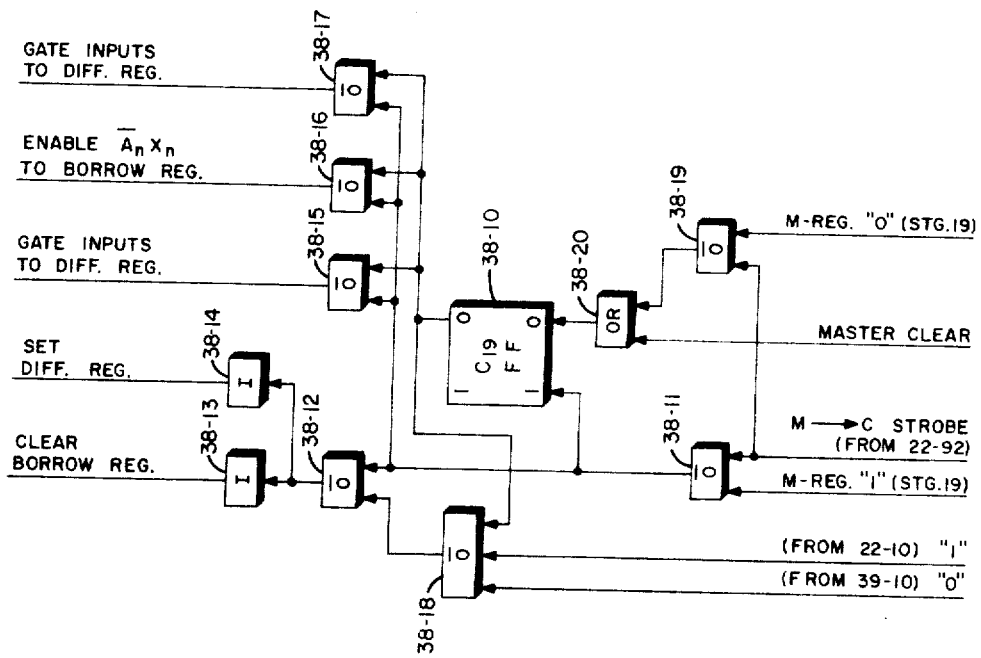

United States Patent Office 3,268,872
Patented August 23, 1966

3,268,872
STORED PROGRAM DATA PROCESSING SYSTEM
Joseph A. Kimlinger, St. Paul, Minn., assignor to Sperry Rand Corporation, New York, N.Y., a corporation of Delaware
Filed Oct. 1, 1962, Ser. No. 227,480
12 Claims. (Cl. 340—172.5)

The present invention relates generally to a stored program data processing system, and more specifically to a system wherein program instructions are executed by manipulating data in accordance with commands or control words also stored in the memory section of the computing system.

As is well known in the art, a digital computer generally consists of four basic sections: (1) the Input-Output section, which provides the means of communication between the computer and the external equipment, (2) the Arithmetic section, in which are performed the arithmetic and logical operations required for the execution of instructions, (3) the Memory section, in which both data and computer instructions are stored, and (4) the Control section, which interprets each instruction and sends the appropriate commands to the other sections of the computer to execute the various operations. The control section also sequences and coordinates these operations. Communication of information between these units and between various registers within these units themselves is by machine language consisting of a word of one or more binary digits, or bits arranged in a particular code or number system, and transmitted in serial or parallel mode on synchronous or asynchronous timing cycles.

The preferred embodiment of the data processing system of this invention performs its own data transfers between units in the parallel mode using asynchronous timing whenever possible to realize the maximum speed available as determined by the memory access time. The Memory section of the computer of this invention stores not only instruction words and data words or operands, but also control words to manipulate, edit, and move data, in the form of binary digits, from place to place within the system. To illustrate, upon initiation of the computer a first designated control word is read out from the Memory and placed in the Control Register. This first control word transferred to the Control Register initiates a designated data transfer needed to achieve the operation called for by the instruction. Generally, the data transferred at this time, serves to extract an instruction word from the memory and to place it in the Memory Exchange Register. Following this operation, a portion of the instruction word is automatically transferred to a control word address register which, through a translator, interprets the transferred portion of this word as a memory address of a first of a series of control words. Subsequently, further control words are transmitted to the control register at memory access time speeds such that gating signals are produced for transferring the instruction word to the Program Control Register, where it is interpreted so that a specified operation can be performed. In performing the specified operation, control words again come into play.

It can be seen, then, that the control words asynchronously initiate the transfer of data within the system while the instruction words, through the utilization of a plurality of formats having a plurality of designators of a selectively definable meaning, initiate a plurality of data transfers and manipulations by designating the control words to be utilized and the source and destination between which operands or data signals are to pass.

It is accordingly a primary object of the present invention to provide a digital data processing system in which control words (termed subcommands or micro-instructions herein) stored in the memory are used to execute a program of computer instructions at a rate dependent only upon the memory access speed of the system.

Another object of this invention is to provide a computing system in which instructions employed therein are comprised of a plurality of binary signals grouped into predetermined orders or designators, one of the designators specifying the address of a location in the memory where the address of a particular series of subcommands for executing the instruction are stored, another designator specifying a source from which data is to be moved and a third designator specifying the location to which this data is to be moved.

The aforementioned instruction word format provides a plurality of logical operations including the transfer of the data from and to several designated areas of the system, logical Jumps and Repeats, as well as Searching and Shifting operations. The main memory, search memory, and shifting circuits are synchronously cycled by timing chains triggered by a two-phase clock. In contrast, the cycle of a memory reference with respect to the Control Word Address Register, the transfer of the addressed control word to the Control Register, and the resulting transfer of the specified data within the system is asynchronously cycled at memory access time speeds.

In accordance with the foregoing, it is another object of this invention to provide a system which utilizes both synchronous and asynchronous timing during the execution of an internally stored program of instructions.

In the computer of this invention, much of the control structure that is normally wired into a computer is stored as a part of the program in the memory instead. Stored logic provides much flexibility since many instruction combinations can be employed.

The data processing system of the present invention functions by effecting the data transfers specified by a plurality of control words which, in turn, are supervised by instruction words. Because the rate at which data transfers take place is determined by the speed of insertion of the subcommands into the Control Register, and because the speed of insertion of the subcommands in the Control Register is limited only by the cycle time of the memory, data transfers, and consequently the function specified by the subcommands, are performed at memory access time speed.

It becomes readily apparent to those skilled in the art that this mode of operation is wholly different from the operation of the general purpose computing system described in the prior art. In prior art systems, the conventional method of operation is by utilizing a plurality of instruction word function codes each of which initiates its own previously established timing chain sequence on a master timing chain, which is established for each function code. In other words, the system of the present invention is more flexible in that the means for executing an instruction are subcommands or control words stored in the memory rather than a pre-wired fixed sequence as in the prior art. In the prior art arrangements, since the same function code operation to be performed may require a wide variety of time sequences under varying conditions, the longest possible time sequence for each operation must be reserved and allowed to expire before the next instruction word or operation may be initiated. In the system of the present invention, by using a subroutine of stored subcommands, only as much time as is required to perform each instruction word operation need be allotted, thus saving time when compared to conventional fixed timing chain type computers.

It is accordingly still another object of the present invention to provide a system whereby the desired operations specified by a stored instruction word are performed at memory access time speeds under the direction of a subroutine of subcommands designated by one of the designators of the aforementioned instruction words.

These and other objects and features of the invention, and the advantages thereof will become more apparent by reference to the following description taken in conjunction with the accompanying drawings wherein:

FIG. 2 illustrates the various instruction word formats recognizable by the system of this invention.

FIG. 3 illustrates the tabular form the translation of the various designators of the instruction word formats of FIGURE 2.

FIG. 4 is a tabulation of the various subcommands which may be performed with the apparatus of this invention.

FIG. 12 through FIG. 15 show in block diagram form the circuits for implementing stages 0 through 3 of the Control Register (C-register).

FIG. 16 illustrates the timing circuits for advancing the count in the PAZ-register.

FIG. 17 and FIG. 18 show in block diagram form the circuits for implementing stages 4 and 5 of the C-register.

Figure 23:
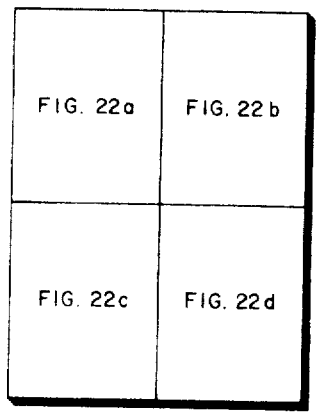

FIGS. 22a through 22d when placed together as illustrated in FIG. 23 illustrate the main timing circuits of the computer.

FIG. 23 illustrates the manner in which FIGS. 22a through 22d should be arranged to provide a composite drawing.

Figure 24:
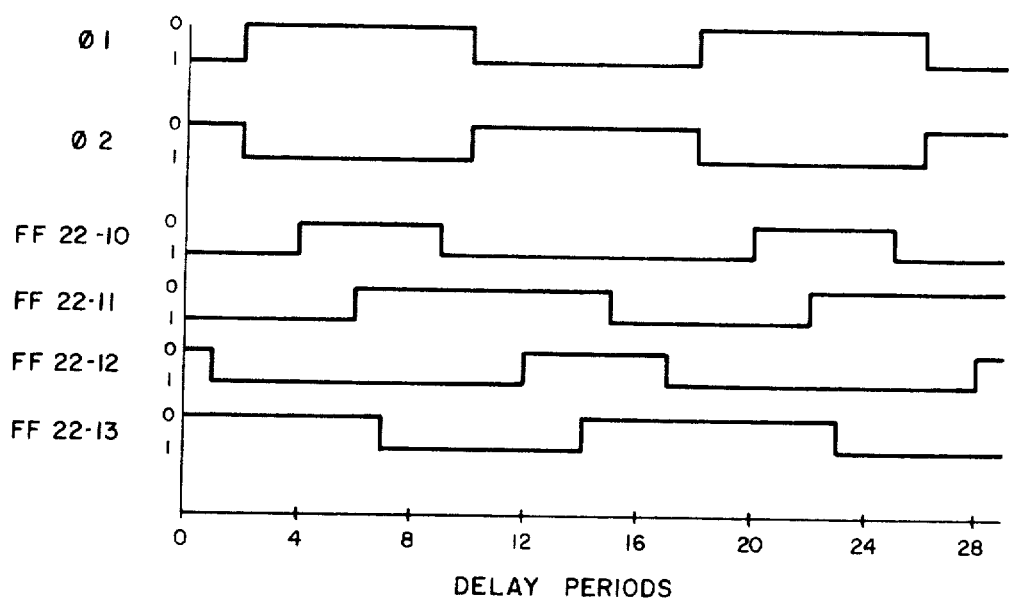

FIG. 24 illustrates the output waveforms as a function of time for the various circuits of FIG. 22.

Figure 25:
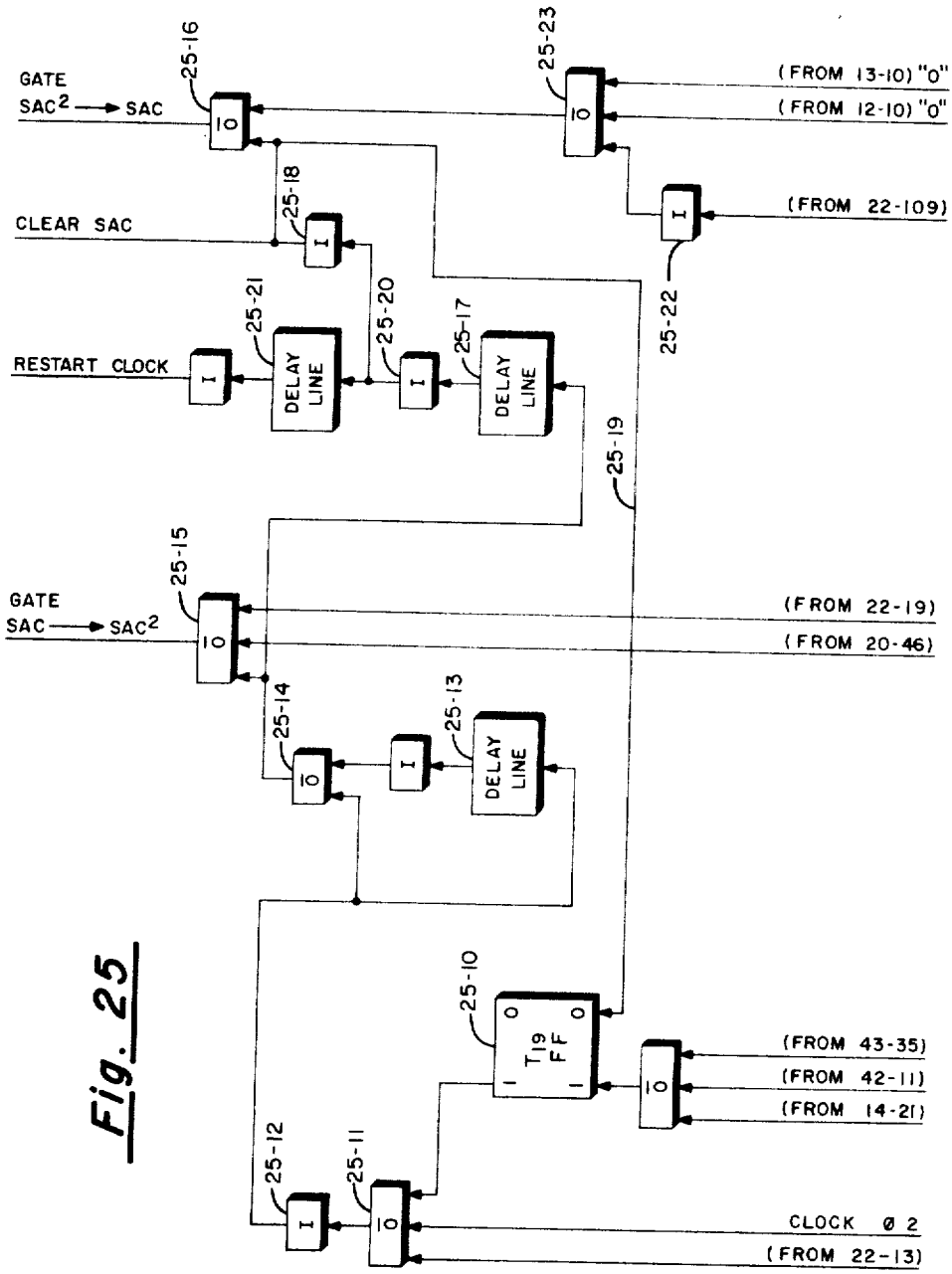

FIG. 25 illustrates the logical arrangement of the timing circuits for advancing the count in the SAC-register.

Figure 26:
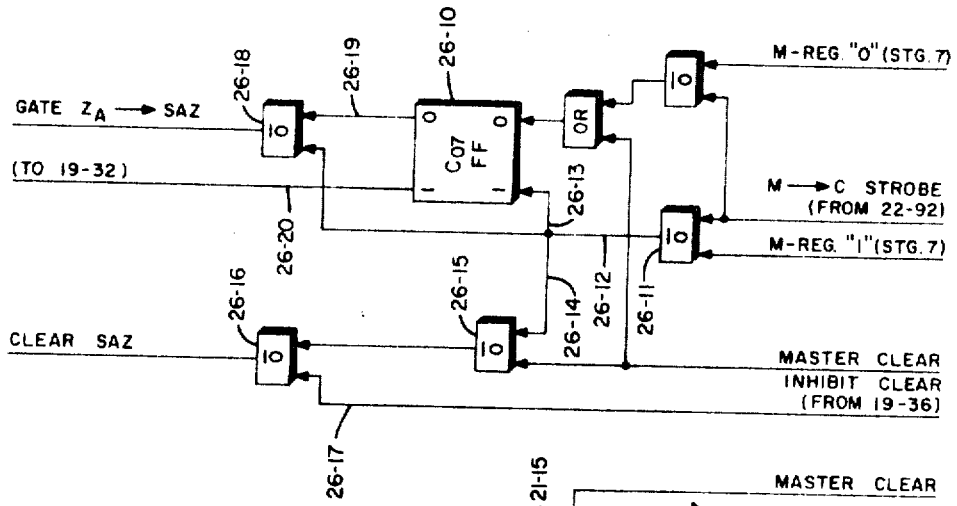

FIG. 26 illustrates stage 7 of the C-register which, when set, effects a transfer of the lower 10 bits of the memory communications register to the SAZ-register.

Figure 27:
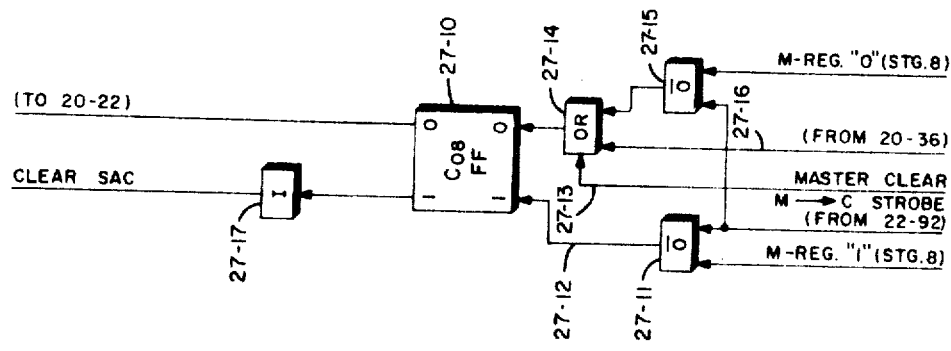

FIG. 27 illustrates stage 8 of the Control Register which, when set, clears the contents of the SAC-register and initiates an automatic "housekeeping" sequence.

Figure 28:
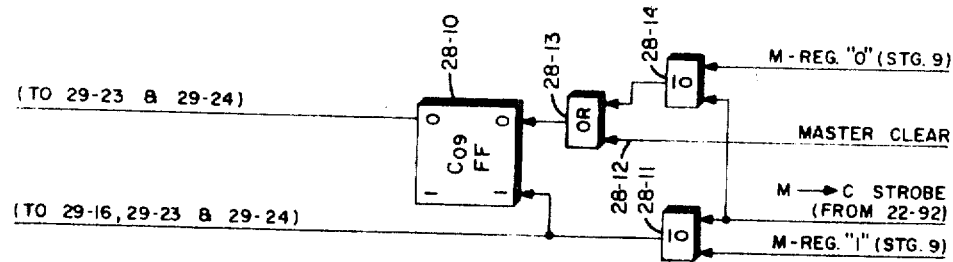

FIG. 28 and FIG. 29 together illustrate the logic circuits for executing subcommands 9 and 16.

FIG. 30 through FIG. 36 show the logic circuits of the C-register for implementing the subcommands 10 through 15, 17 and 18 shown in the table of FIGURE 4.

Figure 37:
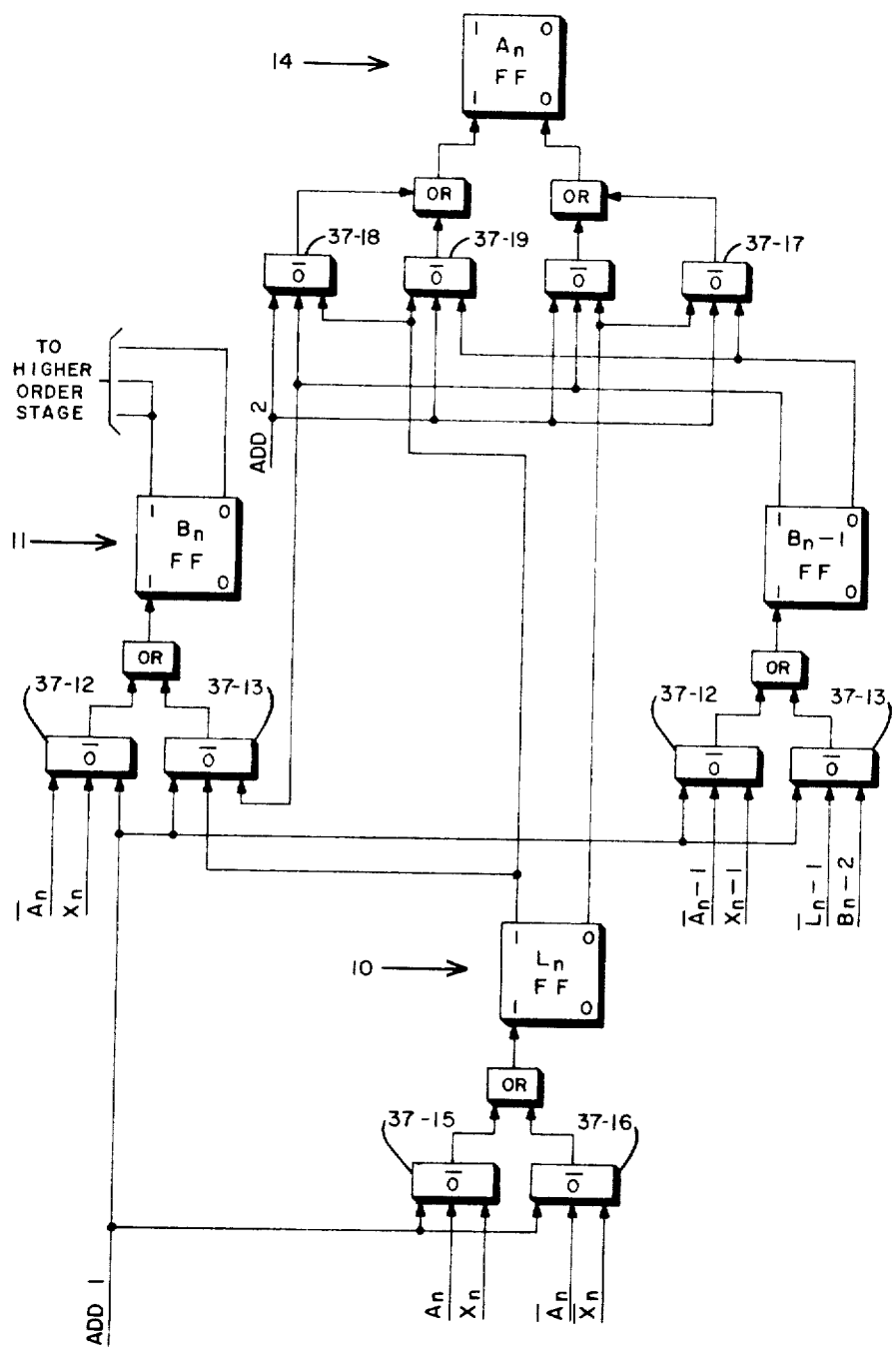

FIG. 37 illustrates a typical stage of the borrow tree adder/subtractor employed in the computer of the present invention.

FIGS. 38 and 39 illustrate stages 19 and 20 of the C-register which are used to generate the ADD I and ADD II pulses for the borrow tree.

Figure 40:
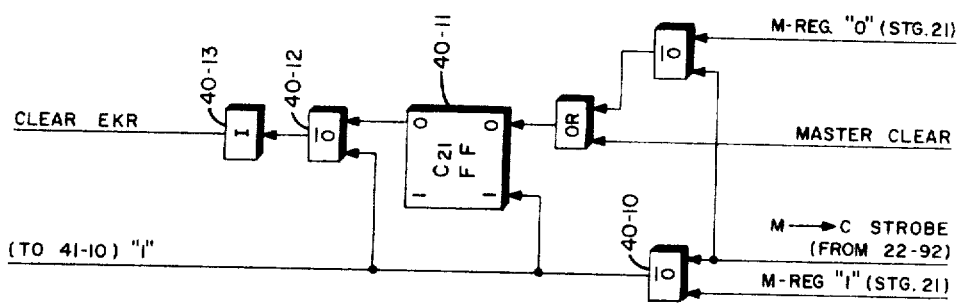

FIG. 40 shows the circuits comprising the stage 21 of the C-register, which when set, causes an interrogation of the search memory for a data word identical to one contained in the Z-register.

Figure 41:
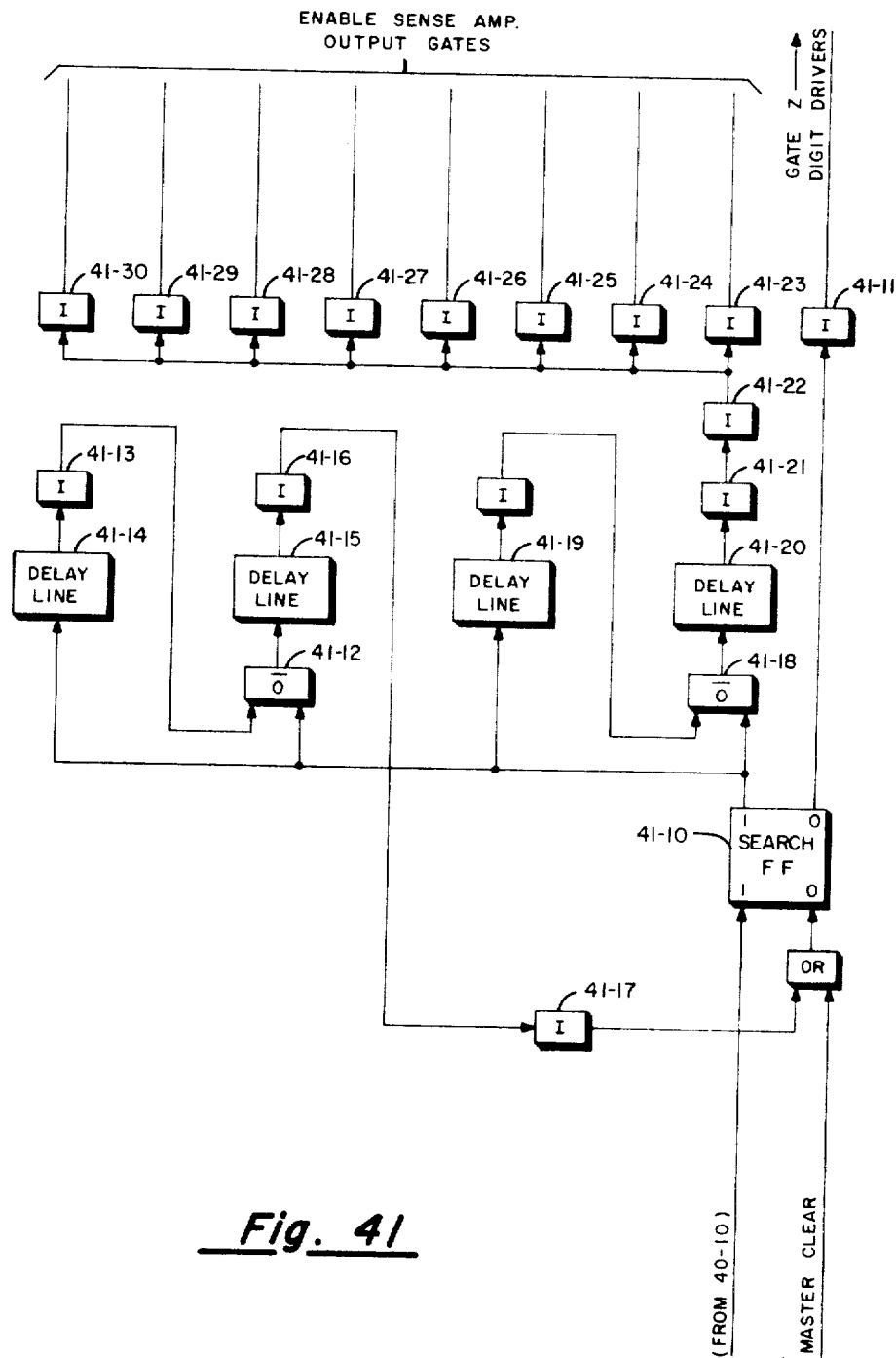

FIG. 41 illustrates the timing circuits for effecting a read-out from the search memory.

Figure 42:
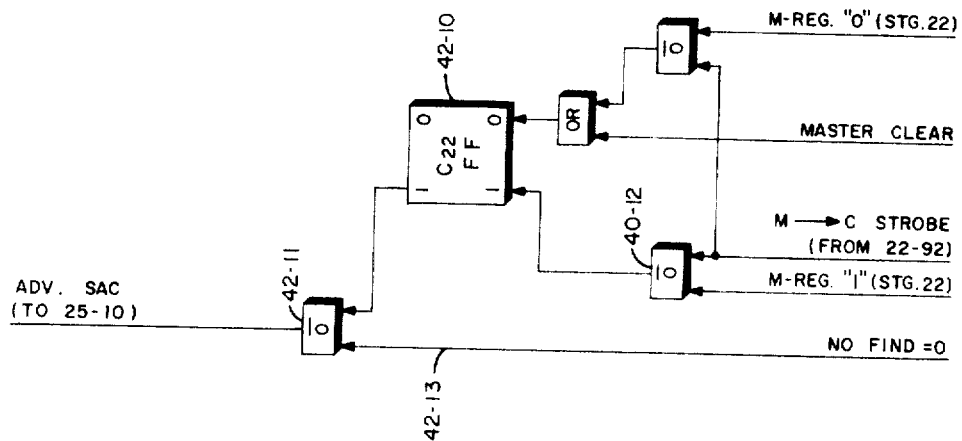
Figure 43A:
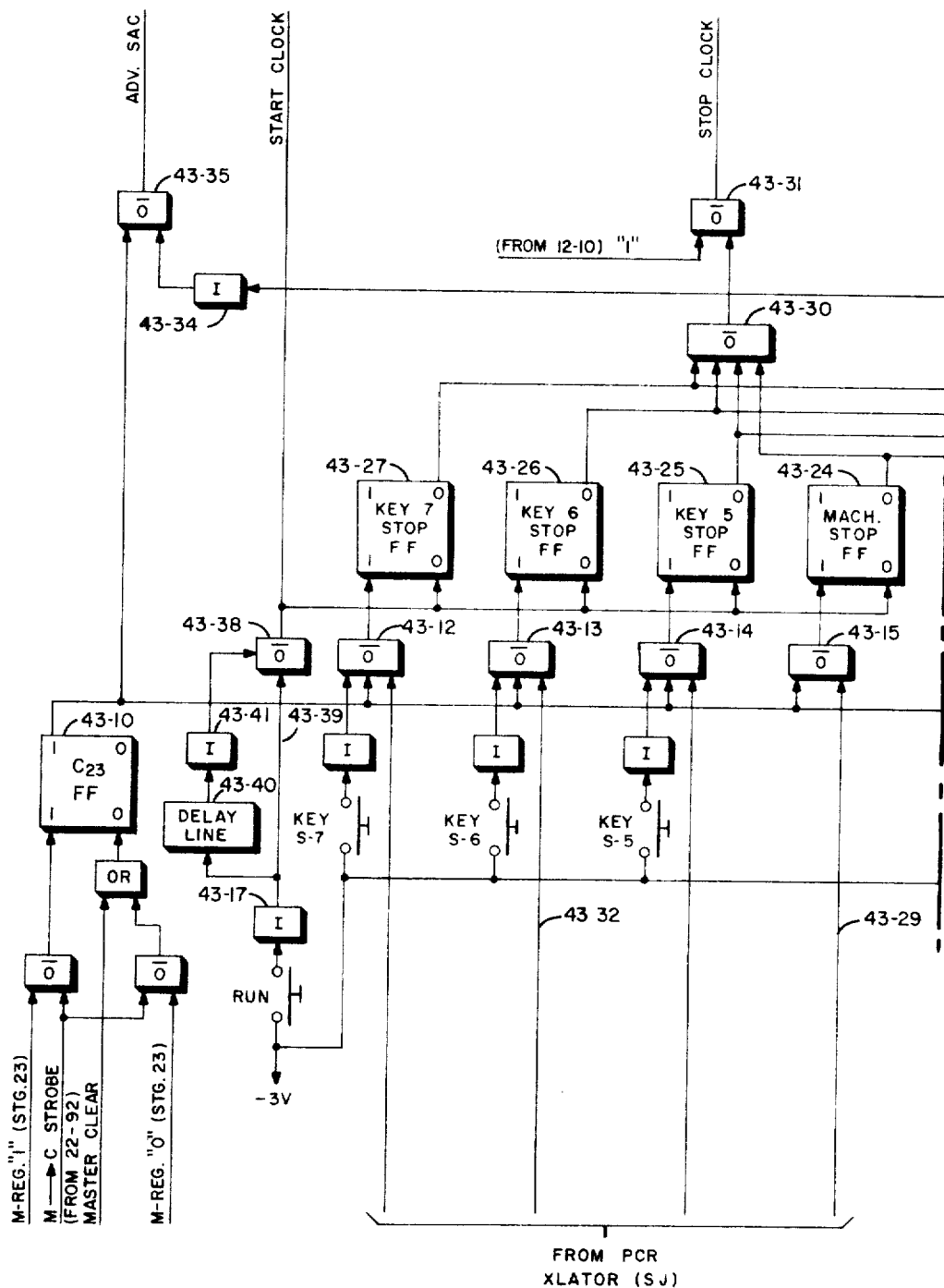
Figure 43B:
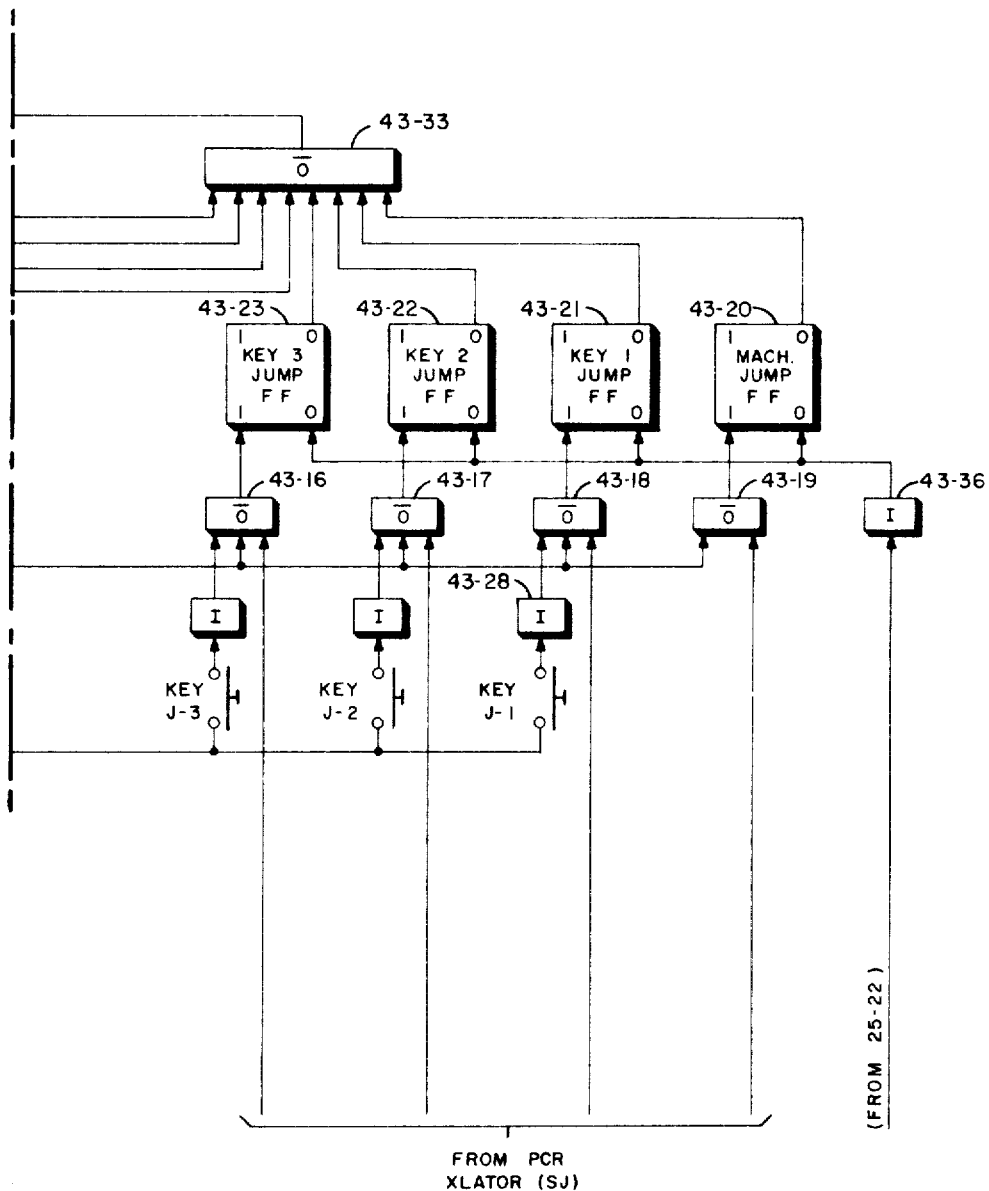

FIG. 42 illustrates stage 22 of the C-register which when active causes a sampling of the Search Register (EKR-register) to determine whether a word was found during the execution of subcommand 21; and FIG. 43 illustrates the circuits for testing the manually settable Stop and Jump conditions.

General layout

Figure 1:
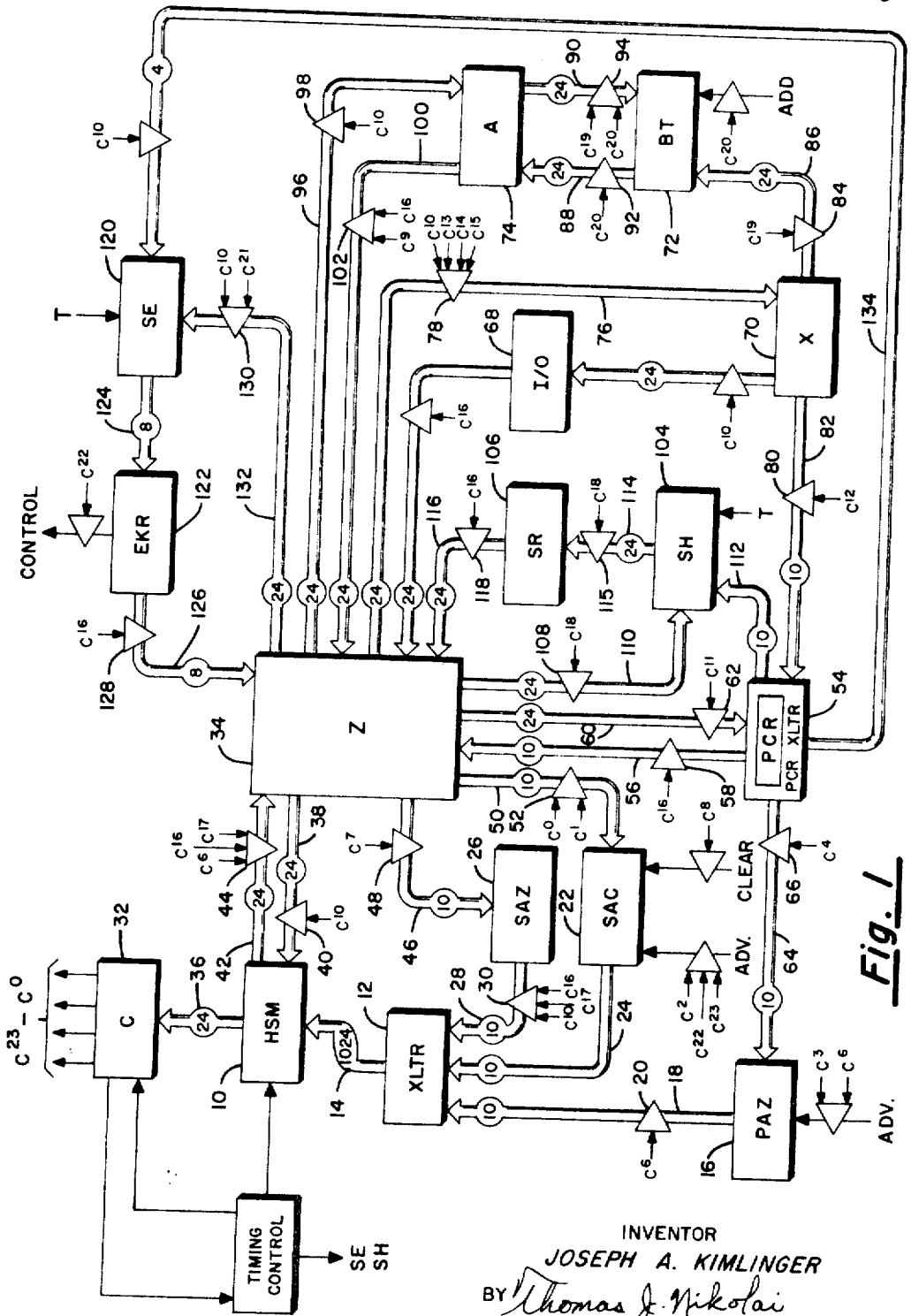
FIG. 1 illustrates in block diagram form the main components of the system of the present invention along with the communication paths over which data transfers may take place.

Referring now to FIG. 1, which shows a block diagram of a preferred embodiment of the data processing system there is shown a high speed memory (HSM) 10 in which information including data (operands), instruction words, and control words may be stored. This memory may be of any well known random access configuration such as that disclosed in the articles entitled, "A Non-Destructive Read-Out Film Memory," by Petschauer et al., appearing on pages 411–423 of the Proceedings of the Western Joint Computer Conference, May 1961. A program of internally stored instruction words is used to manipulate, edit, and move data in a parallel group of binary digits or bits from place to place in the system. The control words asynchronously initiate the transfer of data within the system, while instruction words, through the utilization of a plurality of formats having a plurality of designators of a selectively definable meaning, initiate a plurality of data transfers and manipulations by designating the particular group of or subroutine of control words to be utilized and the logical operation to be performed. A typical memory suitable for use therein may have the capacity of one-thousand twenty-four words, each twenty-four bits in length, and is preferably word organized. The term word-organized means that the words are selected completely by address decoding in a translator with no decoding required in the memory stack itself.

The translator referred to above is identified by the numeral 12 and is connected to the drive circuits (not shown) of the high-speed memory by means of a cable 14.

As illustrated in FIG. 1, the translator is capable of receiving input signals from three separate registers. The first register 16 is a program address counter which is an incrementing type register used to reference instruction (program) words in the high-speed memory 10. This register, which is identified by the logotype PAZ, is connected to the translator by means of a cable 18. Located in the transmission path between the program control register 16 and the translator is a gating device 20.

A second register capable of providing output signals to the translator 12 is a control word address counter 22 identified by the logotype SAC. As will be described more fully hereinbelow when the details of the operation are explained, the SAC-register 22 is also an incrementing register, but is used to reference control words in the high-speed memory 10. Signals from each individual stage of the SAC-register are applied in parallel to the translator by way of the cable 24.

The SAZ-register 26 is the third of the three registers which is capable of supplying address representing signals to the translator 12. The SAZ-register, like the SAC and the PAZ registers, is also an incrementing register, but is used to reference data words in the memory. The output signals from register 26 are applied to the translator by way of the cable 28 under control of the gating means 30.

Only two other registers, namely the control register (C-register) 32 and the memory exchange register (Z-register) 34, are able to communicate directly with the high speed memory. The communication between the memory 10 and the control register 32 is unidirectional and takes place via the cable 36. As will be explained later on, control words, or subcommands read out of the high speed memory pass by way of cable 36 to the C-register 32. Depending upon the contents of the control register, i.e., depending upon which stages thereof are set to their "1" state, various control signals are developed which serve to gate the information and instruction words through the system.

The transmission of information between the high speed memory and the exchange register 34 is bi-directional. More specifically, information contained in the exchange register 34 is able to pass by way of cable 38 and gating means 40 so as to be stored in the high speed memory. Similarly, information read out from the memory is able to pass by way of the cable 42 and the gating means 44 so as to be stored in the exchange register 34.

The basis for the term "exchange register" becomes readily apparent when it is observed that it serves as a temporary holding register for information read out from the memory prior to its transmission to a large plurality of other registers in the system. Likewise, the other registers in the system are capable of transmitting data to the exchange register 34 where it is held until it can be conveniently stored in the high speed memory. As is illustrated, information from the Z-register 34 is able to pass to the SAZ-register 26 by way of cable 46 whenever the gating means 48 is enabled. Likewise, information from the Z-register can pass to the SAC-register 22 by way of the cable 50 when the gating means 52 is enabled.

The program control register (PCR-register) and the program control register translator collectively are identified by the numeral 54. The program control register has a capacity equal to the number of bits in the instruction word, and in the preferred embodiment described herein, is capable of storing 24 bits. This register is used to interpret instructions. As has been mentioned earlier, the instruction word to be used with the apparatus of this invention is comprised of a plurality of separate designators.

Referring momentarily to FIG. 2, which illustrates the various possible instruction word formats, it can be seen that in all cases the instruction word is 24 bits in length. The fields or resignators of each format are designated by a mnemonic code, consisting of a letter, with the number of bits of the word occupied by that particular field or designator designated by a superscript of I. Thus, the F-designator (FROM designator) of the instruction word format of FIG. 2a occupies the three-bit positions identified by $I^{18}$, $I^{17}$, and $I^{16}$. Each instruction word when held in the PCR-register 54 is available to a suitable translating means which interprets each instruction word designator as directing a particular manipulation of data.

Returning now to the description of the general layout of the system illustrated in FIG. 1, the cable 56 connected between the PCR-register and the Z-register 34 provides a means whereby a selected designator of the instruction word may be transmitted to the Z-register when the gating means 58 is enabled. Instruction words read out from the memory to the Z-register may be transferred to the program control register 54 by way of the cable 60, provided that the gating means 62 is enabled. The cable 64 is the transmission path used to convey the address designator of the instruction word ($I^9$–$I^0$) to the program address counter or PAZ-register 16. This transmission occurs whenever the gate 66 is enabled.

Except for the input/output register (I/O-register) 68, the remaining registers illustrated in FIG. 1 are those generally incorporated in the arithmetic section of a computer. For example, the X-register 70 is a 24-bit exchange register, serving as a buffer between the input/output equipment and the other register in the machines. It also serves as a buffer between the memory section of the computer and the arithmetic section. For example, during an ADD operation the X-register 70 is used to hold the addend. In the preferred embodiment of the present invention, the computer employs subtractive logic, the subtraction being performed by a group of circuits called the borrow tree and represented in FIG. 1 by the block 72. Since the basic logic of the machine is subtractive, addition is performed by complementing the addend and subtracting it from the contents of the accumulator.

The accumulator or A-register 74 is the principle arithmetic register and, in general, is a register which has provisions for the addition of another quantity to its contents. For a complete description of the manner in which a borrow tree type adder-subtractor operates, reference is made to the copending G. J. Erickson application, Serial No. 183,462, filed March 29, 1962, and entitled "Segmented Arithmetic Device."

A word of information contained in the Z-register 34 may be transmitted to the X-register 70 by way of the cable 76 whenever the gating means 78 is enabled. As will be explained more fully hereinbelow, this gate is enabled whenever bits 10, 13, 14, or 15 of the C-register 32 are set. Similarly, whenever bit 12 of the C-register is set the gate 80 is enabled and permits the passage of selective bits in the X-register by way of the cable 82 to the PCR-register 54. It is during an ADD operation that bit 19 of the C-register is set to thereby enable the gating means 84 allowing the contents of the X-register to pass by way of cable 86 to the borrow tree 72.

Communications between the borrow tree 72 and the accumulator 74 take place over the cables 88 and 90 under the control of the gates 92 and 94, respectively. When performing an addition or subtraction, the augend may be transmitted from the Z-register 34 to the A-register by way of the cable 96 when the gate 98 is enabled. Similarly, the result of the arithmetic operation may be returned to the Z-register 34 from the accumulator by way of cable 100 controlled by gating means 102. Once the arithmetic results are in the register 34 they can be stored in the high speed memory.

In order to perform other arithmetic operations such as multiplication, division and the like, it is necessary that means be provided for shifting binary numbers a predetermined number of places. In the system of FIG. 1, this means includes the Shift Matrix 104 and the Shift Register 106. When the instruction placed in the PCR-register 54 calls for a shift operation, a predetermined field or designator is examined by the PCR-translator and specifies the shift count, i.e., the number of places binary number is to be shifted. As illustrated in FIG. 2b, bit position $I^{11}$ through $I^{15}$ specifies the shift count. Since the several combinations of five bits can uniquely identify 32 different items, these five bits are more than adequate to allow for shifting a 24-bit number from 0 to 23 places.

When a shift operation is called for, bit 18 of the control register 32 is set so that the gate 108 is enabled. Under this condition a word contained in the Z-register 34 is transmitted by way of cable 110 to the Shift Matrix 104. The word is shifted a number of places specified by a signal coming from the PCR-translator by way of the cable 112. This shifting is done in a parallel fashion and the results are transmitted over cable 114 to the register 106 which holds the shifted results. After the word from the Z-register has been shifted and stored in the Shift Register 106, it may be returned to the Z-register by way of the cable 116 when gate 118 is enabled. As will be explained more fully hereinbelow, the shift operation is synchronously controlled by means of a special timing chain rather than being controlled by the high speed memory timing chain.

In addition to the high speed memory 10, the system forming the preferred embodiment of the invention also includes a search memory 120. The search memory for the system is quite different from the high speed memory 10. The search memory is designed to supply the address of any one of a large plurality of words when the word being sought is applied to its input. For example, assume that a 24-bit word, say

100100100100100100100100 is stored in the search memory at address 100. If this same word were applied to the input of the search memory, a "find" pulse would appear on the output line corresponding to the address 100. If one or more digits of the word being sought is mismatched from any of the words stored in the search memory 120, means are provided in the search memory for inhibiting the registering of a "find" signal. The register 122 which is connected to the search memory by means of a cable 124, is termed an equality count register (EKR) and is used to store the address of a word which has been found in the search memory. This address may be transmitted to the Z-register by way of a cable 126 when gating means 128 is enabled.

A word may be transmitted from the Z-register 34 to the search memory 120 either conditionally or unconditionally. More specifically, when bit 21 of the control register 32 is set, the gate 130 is enabled and permits the transfer of a word contained in the Z-register to take place over the cable 132 unconditionally. Provided the destination designator (bits $I^{13}$–$I^{15}$) is specifying the search memory, the control signals appearing in cable 134 permits the transmission of the word contained in the Z-register 34 to pass by way of gate 130 to the search memory 120. Since this transmission is dependent upon the translation of the designation designator of the instruction word, it may be considered as conditional.

Now that the general layout of the various registers and cmoponents of the system has been described in detail, the general operation of the system will now be considered.

General description of operation

As mentioned previously, the high speed memory 10 employed in the embodiment described herein is preferably of the type described in the foregoing Petschauer et al. publication, and uses vacuum deposited Permalloy films operated in a destructive readout mode. This memory may have a capacity of 1024 words, for example, with 24-bits per word and is preferably "word organized." Additionally, the high speed memory employed herein is preferably of the random access type so that any word in the memory may be selected without any special sequence-of-address requirement.

Stored within the memory at addressable storage locations are instruction words, control words, and data words or operands. The format of the instruction words stored in the memory has already been described in connection with FIG. 2. The control word is simply a 24-bit word consisting of a series of binary "1's" and "0's." When transferred to the C-register 32, a control word causes one or more stages thereof to be set to their "1" state. Depending upon the particular stage of the C-register which is set to its "1" state, certain subcommands or microinstructions are carried out. Referring to FIG. 4, which shows a complete list of the subcommands which can be performed with a 24-bit control register, it can be seen that when the lowest order bit, i.e., bit 0, of the C-register is set to its "1" state the subcommand $Z_N$ to SAC is performed. This symbology means that the N-designator (the contents of the upper four stages of the Z-register) are transferred to the SAC-register 22. Similarly, if it were stage one of the C-register which was set to its "1" state, the address portion or the lowest-order 10 bits of the Z-register would be transferred to the SAC-register.

In operation, it is possible that more than one bit of the C-register can be set at a time. For example, during the execution of an instruction, it often happens that both bits 7 and 11 of the C-register are set. Under this condition, the lowest-order 10 bits of the word in the Z-register are transferred to the SAC-register 26 and, concurrently, the entire word in the Z-register is transferred in a parallel mode to the PCR-register 54. In other words, when bit $C_7$ is set an enabling signal is applied to the gate 48 in the cable 46 to permit the transmission of the lowest-order 10 bits to the SAZ-register 26. Similarly, when bit 11 of the C-register is set an enabling signal is applied to the gate 62 in cable 60 to permit the parallel flow of the word in the Z-register to the PCR-register 54.

The subcommand $M_{PAZ}$ to Z, which is performed when bit 6 of the C-register is set, means that the contents of the memory at the address specified by the current contents of the PAZ-register 16 are read out of memory and transmitted in parallel to the Z-register 34. Each time that a memory reference is made with respect to the PAZ-register the count contained therein is advanced by unity. By examining the table of FIG. 4 it can be seen that a memory reference may be made with respect to the contents of the PAZ-register 16, the SAC-register 22, and the SAZ-register 26.

Except for the subcommands 10, 16, and 23, the remaining subcommands in the table of FIG. 4 are self-explanatory. When the control word read out from the high speed memory 10 over cable 36 to the control register 32 is such that bit 10 thereof is set, the T-designator of the instruction word, i.e., $I^{13}$–$I^{15}$, is examined and depending upon its bit configuration, the contents of the Z-register are transmitted to a particular destination. FIG. 3 illustrates the translation of the T-designator. When the bit pattern of the T-designator is 001 the destination is the high speed memory. Similarly, when the bit pattern is 010, the word in the Z-register is transmitted over cable 132 to the input of the search memory 120. When the T-designator of the instruction word is specifying high speed memory, the word in the Z-register 34 is transmitted to the particular memory address specified by the contents of the SAZ-register 26 at the time that this transfer is taking place.

The execution of the subcommand 16 is much like that of subcommand 10 except that in the subcommand 16 the FROM (F) designator of the instruction contained in the PCR-register 54 is examined and the contents of the particular source specified are transmitted to the Z-register 34. FIG. 3 illustrates the various possible translation of the source or F-designator. When the bit pattern in the F-designator is 001 the source is the high speed memory. The particular word taken from memory at this time is the one contained in the memory location specified by the address currently contained in the SAZ-register 26. It can be seen, then, that by executing a 16 subcommand followed by a 10 subcommand it is possible to take a word from one of a plurality of locations and to transmit it via the Z-register 34 to any one of a plurality of destinations, all at memory cycle time rates.

Bit position 2 of the control register being set specifies a SKIP subcommand. This subcommand tests the contents of the accumulator 74 and the J-designator (bits 11 and 12 of the PCR) in order to determine if the machine is to skip the instruction at the next sequential program address. There are three skip conditions as illustrated in FIG. 3. If the J-designator is 01, the instruction at the next program address will be skipped provided the contents of the accumulator is equal to 0 at this time. Similarly, if the J-designator of the instruction word is 10, the instruction at the next program address will be skipped if the contents of the accumulator is unequal to 0. Finally, if the J-designator is 11 the next instruction will be skipped if the contents of the accumulator is a negative number.

A skip is actually executed by taking the next control word from the next sequential SAC-register address. This word will contain subcommand number 3 to advance the count in the PAZ-register 16. Since the PAZ-register 16 is the one used to reference an instruction word in the high speed memory, by incrementing it, the next following instruction word in the sequence will be skipped.

Explanation of typical program

To aid in the understanding of the overall operation of the system of this invention it has deemed expedient to illustrate a sample program and then explain in a step-by-step fashion the various data transfers and manipulations carried out by the machine in executing this program. The following program is intended to be merely illustrative and it should not be inferred that the machine of this invention is limited to only the steps set forth therein.

TABLE I

| HSM Address (Octal) | Micro-seq. Address (Octal) | Operation |
|---|---|---|
| 0 | 00000010 | Housekeeping. |
| 1 | 00000013 | Constant ⟶ A Reg. |
| 2 | 00000026 | Manual Jump. |
| 3 | 00000016 | (A)+Constant ⟶ A. |
| 4 | 00000031 | Shift (A) by SK⟶ SR. |
| 5 | 00000022 | (A)−Constant ⟶ A. |
| 6 | 00000033 | Search for (A) In SE. |

TABLE II

| HSM Address (Octal) | Control Word Bit(s) Set | Function |
|---|---|---|
| 10 | $C_6$ | Housekeeping. |
| 11 | $C_7$ and $C_{11}$ | |
| 12 | $C_0$ | |
| 13 | $C_{16}$ | Load A-Reg. With Augend. |
| 14 | $C_{10}$ | |
| 15 | $C_8$ | |
| 16 | $C_{16}$ | Add—(A)+Addend Result In A-Reg. |
| 17 | $C_{14}$ | |
| 20 | $C_{19}$ | |
| 21 | $C_8$ and $C_{20}$ | |
| 22 | $C_{16}$ | Subtract—(A)−Constant. |
| 23 | $C_{13}$ | |
| 24 | $C_{19}$ | |
| 25 | $C_8$ and $C_{20}$ | |
| 26 | $C_{23}$ | Manual Jump. |
| 27 | $C_4$ | |
| 30 | $C_8$ | |
| 31 | $C_{16}$ | Shift—Put Result In SR. |
| 32 | $C_8$ and $C_{18}$ | |
| 33 | $C_{16}$ | Search For (SR); If Find Then Address $PCR_T$. |
| 34 | $C_{21}$ | |
| 35 | $C_{22}$ | |
| 36 | $C_{10}$ | |
| 37 | $C_8$ | |

TABLE III

| HSM Address (Octal) | Instruction Word | | | | | | |
|---|---|---|---|---|---|---|---|
| | | N | F | T | J | 0 | A |
| 100 | | 0001 | 0 | 001 | 100 | 00 | 0 | 0011000000 |
| 101 | | 0011 | 0 | 001 | 100 | 00 | 0 | 0011000001 |
| 102 | | 0101 | 0 | 001 | 100 | 00 | 0 | 0011000010 |
| | | N | SJ | | | | NI |
| 103 | | 0010 | 0 | 010 | 0 0 0 0 0 0 | | 0010000101 |
| | | N | F | SK | | | A |
| 104 | | 0100 | 0 | 100 | 00101 | | 0 | 0000000000 |
| | | N | F | T | J | 0 | A |
| 105 | | 0110 | 0 | 101 | 001 | 00 | 0 | 0011000011 |

Table I, Table II and Table III illustrate the high speed memory storage assignments for carrying out a predetermined sequence of machine operations. In Table I at memory address 0 is stored in 24-bit word, the address portion of which specifies the high speed memory address of the first control word of a sequence of control words for performing a desired function. The given function associated with memory address 0 is a so-called "housekeeping" sequence. The "housekeeping" sequence is the means used to procure the next instruction. In other words, the execution of any instruction not only includes the operations of the machine required to perform that instruction, but also any operation necessary to acquire the next instruction. Similarly, at high speed memory address 1 is stored at a twenty-four bit word, the address portion of which specifies the first micro-instruction of a sequence of micro-instructions for reading out a constant from the memory and for placing it in the accumulator register 74.

Table II illustrates in tabular form the high speed memory address assignments for the various control words needed to perform the given function. For example, at memory addresses 10, 11, and 12 (octal) are stored the subcommands needed to acquire the next instruction, i.e., to perform the "housekeeping" function. Similarly, at memory addresses 13, 14 and 15 are stored the subcommands for loading a constant (augend) into the accumulator prior to an adding operation. The remaining addresses illustrated in Table II contains the subcommands for performing the other steps called for in the program.

Table III illustrates the high speed memory address assignments for the instruction words of the program. As mentioned earlier, the N-designator of the instruction word specifies the high speed memory address at which is stored the address of the first of the sequence of micro-instructions required to perform the operations specified by the instruction word itself. The source and destination designators, F and T, specify the location from which an operand is to be taken and the destination to which this operand is to be transmitted, respectively.

In order to have the machine perform an operation called for by the program illustrated in Tables I, II and III, the operator first closes a switch which master clears the machine. This has the effect of clearing out all the registers in the machine so that they are all in a predetermined state. As will be explained more fully hereinbelow when the details of the C-register are set forth, the Master Clear operation clears all stages of the C-register except for the lowest order bit position which is set to a "1." Next, the operator manually inserts the address of the first instruction word into the PAZ-register 16. In the example program it can be seen from Table III that the address loaded into the PAZ-register by the operator at this time is address 100 (octal). Now the machine is ready to go and the operator next presses the "Run Button." When the Run Button is depressed the memory timing chain is initiated. Since bit 0 of the C-register 32 is set, the subcommand $Z_N$ to SAC is performed (see FIG. 4). In other words, when bit 0 of the C-register 32 is set an enabling signal is applied to the gate 52 in the cable 50 which permits the transmission of the upper four bits of the Z-register to the SAC-register 22. Because the Z-register had previously been cleared on the Master Clear step, the SAC-register 22 will contain all 0's at the completion of this transmission.

Referring again to FIG. 4, it can be seen that the execution of subcommand 0 causes an automatic sequence to be performed. The first step in this automatic sequence is to transfer the contents of the memory address specified by the contents of the SAC-register 22 to the Z-register 34. From Table I it can be seen that the contents of memory address 0 is a 24-bit word the address portion of which is 10 (octal). The second step in the automatic sequence is to transfer the address portion, i.e., the contents of the lower 10 bit positions of the Z-register to the SAC-register 22. At the end of the automatic sequence, then, the Z-register contains the word 00000010, the SAC-register 22 contains the word 0010, and the PAZ-register 16 contains the address 100, all numbers being expressed in the octal number system.

Whenever no other operations or data transmissions are being called for by the machine, it automatically loads a new word into the C-register 32. It does this by reading out the contents of the memory register specified by the contents of the SAC-register 22. Symbolically, this can written $M_{SAC}$ to C. Because address 10 had been previously placed in the SAC-register 22, the contents of the memory address 10 are transmitted to the C-register. Referring to Table II, it can be seen that this causes bit 6 of the C-register to be set. From FIG. 4, it can be seen that when bit 6 is set, the subcommand $M_{PAZ}$ to Z is performed and the contents of the PAZ-register 16 is advanced by one. Because the operator initially loaded the address 100 into the PAZ-register 16, the contents of this memory address namely a 24-bit word

000100011000000011000000

(Table III) is read out of the memory and transmitted to the Z-register. This is due to the fact that when bit $C_6$ is set to an enabling signal is applied to the gate 44 in cable 42 and to the gate 20 in cable 18 to permit the contents of the memory register specified by the address in the PAZ-register to be transmitted to the Z-register 34. In other words, the first instruction of the program to be executed is transmitted to the Z-register.

This operation is followed by another memory reference with respect to the address contained in the SAC-register with the word so located being transferred to the C-register. Because upon the execution of a $M_{SAC}$ to C subcommand the count in the SAC-register is incremented, i.e., advanced by one, the word stored at memory address 11 (octal) will be transmitted to the C-register at this time. Following this operation, bits 7 and 11 of the C-register will be set.

Referring to FIG. 4, it can be seen that when bit 7 is set, the operand portion ($Z_A$) of the instruction word is transmitted to the SAZ-register 26. This is so, since when bit 7 is set, gate 48 in cable 46 is enabled. Because bit 11 of the control register is also set, gate 62 in cable 60 is enabled, permitting the transmission of the entire contents of the Z-register 34 to the PCR-register 54. At this time, then, the first instruction itself is placed in the PCR-register 54.

In completing this "housekeeping" sequence used to procure an instruction, the computer makes another $M_{SAC}$ to C reference, which transfers the contents of memory address 12 to the C-register 32. After the completion of this step, bit 0 of the C-register is again set causing the upper four bits of the Z-register ($Z_N$) to be transmitted to the SAC-register via cable 50 and gate 52. Referring to Table III, it will be observed that after the completion of this subcommand, the bits 0001 will be in the SAC-register.

As previously explained, the initiation of subcommand 0 causes an automatic sequence to take place. The first step in this automatic sequence is to transfer to the Z-register the contents of the memory register specified by the address in the SAC-register. In the example under consideration, the contents of the memory at address 0001 is 00000013 (octal). This later binary word is the address of the first of a series of micro-instructions or subcommands needed to execute the instruction presently contained in the program control register 54. The second step in the automatic sequence is to transfer the lower ten bits of the Z-register ($Z_A$) to the SAC-register 22. In other words, the address 13 (octal) is set into the SAC-register. This completed the housekeeping sequence whereby the first instruction was taken out of the memory section of the computer and placed in the program control register where its various designators may be examined and an operation performed in accordance therewith.

With address 13 now in the SAC-register, when the computer performs its next memory reference with respect to the SAC-register and transfers the contents of this memory register to the control register 32, bit 16 of the control register will be set. Referring to FIG. 4, when bit 16 is set the PCR-register translator examines the F-designator of the instruction word. Next, from Table III it can be seen that the F-designator of the first instruction consists of the bit pattern 001. Referring now to FIG. 3, it may be observed that when the F-designator is 001 the source from which a word is to be extracted is the memory. In other words, the execution of subcommand 16 causes a word in the memory to be transmitted to the Z-register 34 whenever the F-designator of the instruction word in the PCR-register 54 is 001. When the translation of the F-designator indicates that the source of the word is the memory, the particular word read out from the memory is the one whose location is specified by the address contained in the SAZ-register 26. Remembering that during the "housekeeping" sequence when bit 7 was set the address portion of the instruction word, that is, the lower ten bits thereof, was transferred to the SAZ-register 26, the word readout from memory is therefore the one stored at memory address 300 (octal).

Upon the immediately preceding $M_{SAC}$ to C control word transfer, the count contained in the SAC-register was advanced by one. Hence, when the computer again performs a $M_{SAC}$ to C reference the contents of memory register whose address is 14 (octal) will be stored in the C-register. As illustrated in Table II the contents of memory address 14 is a control word which when placed in the C-register causes bit 10 thereof to be set. As is indicated in FIG. 4, when bit 10 of the control register is set the T-designator of the program control register is translated by the PCR-register translator. Referring to Table III and to FIG. 3, it can be seen that for a T-designator pattern of bit 100 (decimal 4) the destination designated is the A-register. Hence, gate 98 in cable 96 will be enabled thereby permitting the parallel transmission of the contents of the memory exchange register 34 to the accumulator register 74. It may be recalled that this word was the constant or operand removed from high speed memory address 300.

The next $M_{SAC}$ to C operation causes the control word stored at memory address 15 to be transferred to the C-register 32. The control word stored at address 15 is such that bit 8 of the control register will be set. As illustrated in FIG. 4, this subcommand causes the SAC-register 22 to be cleared and initiates the automatic sequence $M_{SAC}$ to Z, followed by the transfer of $Z_A$ to SAC. Because the SAC-register is cleared, the first step of the automatic sequence mentioned above again causes the contents of the memory address 0 to be transferred to the Z-register. The second step in the sequence causes the lower ten bits of this word to be transferred back into the SAC-register. From Table I it may be observed that the contents of memory address 0 is the starting address for the subroutine of micro-instructions for performing the housekeeping function. This housekeeping sequence is executed in exactly the same fashion as previously described, except that at this time the program address counter (the PAZ-register) 16 now contains the address 101. Hence, the next instruction to be executed will be taken from the address 101 and loaded into the PCR-register 54.

The last step in the housekeeping sequence occurs when bit 0 of the C-register is set. At this time, the new instruction is already loaded into the PCR-register so that the upper four bits ($Z_N$) of the Z-register 34 are transferred via cable 50 and gate 52 to the SAC-register. This has the effect of loading the N-designator of the new instruction word (0011—Table III) into the register 22.

The automatic sequence is again initiated by the execution of the subcommand 0, causing the word stored at memory address 3, i.e., 00000016, to be transferred to the Z-register. The second step of the automatic sequence causes the address portion of this word (0016) to be transferred to the SAC-register 22. It becomes apparent, then, that the N-designator of the instruction word specifies a memory address which contains an address where the first of a series of micro-instructions or subcommands are stored, the subroutine of subcommands consisting of those needed to execute a particular machine operation.

Upon the next $M_{SAC}$ to C reference the control word contained at memory address 16 will be loaded into the control register. This word is of a nature that bit 16 of the C-register will be set. As has already been described, subcommand 16 causes the F-designator of the instruction word to be examined by the program control register. The contents of the particular register specified as the source is thereby transferred to the Z-register. When the translation of the F-designator indicates that the source of the word to be acquired is a memory register, the particular register interrogated is the one specified by the current contents of the SAZ-register 26.

In carrying through the explanation of the sample program illustrated in Tables I to III, it can be seen that the F-designator of the word now in the PCR-register is 001. As indicated in FIG. 3, the translation specified the source as being the high speed memory. Hence, the contents of memory address 301 (octal) is read out from the memory by way of cable 42 and gate 44 to the Z-register. It should be recognized that the constant read out from memory address 301 is the addend for the summing operation.

The next memory reference with respect to the SAC-register takes the control word from memory address 17 and places it in the C-register 32. This word causes bit 14 to be set such that gate 78 is enabled and the complement of the addend in the Z-register is transmitted by way of cable 76 to the X-register 70. As was mentioned earlier, the reason why the addend undergoes complementation is that the machine described herein employs a subtractive accumulator. Therefore, in adding two numbers the complement of the addend is subtracted from the contents of the accumulator. This data transfer having been performed, the machine again places a new control word in the C-register. This control word is the one stored in memory address 20 and when placed in the C-register, causes bit 19 thereof to be set. The execution of an Add operation in the machine described herein requires two separate pulses. The effect of the so called ADD I pulse is to form the logical sum of the addend and augend neglecting the borrow signals. The ADD II pulse is effective to mix in the borrow signals with the logical sum formed on the ADD I pulse such that the true sum is stored in the A-register 74.

When the control word stored at memory address 21 is inserted into the control register both bits 8 and 20 are set. The setting of bit 20 causes the ADD II pulse to be generated, thereby completing the addition step. As before, when bit 8 of the C-register is set, the SAC-register is again cleared and the automatic sequence previously described is executed. It may be recalled that this automatic sequence brings about an execution of the "housekeeping" subcommand for loading a new instruction into the program control register. Since this operation has been fully described above, it is felt to be unnecessary to again go through the steps of the housekeeping sequence.

The next operation to be performed is that of subtracting a constant from the previous sum now contained in the accumulator. Because the operation of subtraction is substantially the same as that of additions as far as the data manipulations and control operations are concerned, it is deemed unnecessary to go through each subcommand used to perform the subtraction. The only difference to be noted is that following the transmission of the appropriate constant to the Z-register, bit 13 of the C-register is set rather than bit 14, as was the case in the addition operation. Bit 13 being set causes a direct transmission of the constant from the Z-register 34 to the X-register 70 rather than a complemented transmission. Since the accumulator is subtractive in nature, when the ADD I and the ADD II pulses are produced by the setting of bit 19 and 20 in the C-register, the number contained in the X-register is subtracted from that in the accumulator.

The setting of bit 8 in the control register at the completion of the subtract operation places the machine in the housekeeping mode again so as to acquire a new instruction. In other words, the housekeeping sequence previously described takes the instruction stored in the high speed memory address 103 and transfers it to the PCR-register 54.

While the instruction contained at address 103 is still 24 bits in length its format is somewhat different from the general format employed with the instructions previously considered. The upper four bits are still the operation code designators (N) and specify a memory address at which is stored a starting address for a sequence of subcommands needed to execute the desired function. In bit positions $I^{16}$ through $I^{18}$ is the Stop-Jump designator (SJ) and when translated defines which of the particular Jump or Stop is to be recognized by the machine. Referring to FIG. 3, the word "key" refers to a selection of manually operable push buttons on the operator's maintenance console numbered 1, 2, or 3 for Jumps and 5, 6, or 7 for Stops. If the SJ-designator translation is 0 an automatic or unconditional jump to an instruction not necessarily defined by the current contents of the PAZ-register takes place and if the translation is a 4 an automatic stop takes place. If the translation is such that a particular key is indicated, a jump will or will not occur depending upon whether the specified key is opened or closed. For example, if the SJ-designator is 010 and key number 2 has been previously depressed by the operator, the machine will jump to a new sequence of instructions. However, had the SJ-designator been 010 and had key 2 not been depressed, the machine would continue in its normal operational sequence. By providing manually operable selection keys in addition to the automatic sequencing circuits added flexibility of the overall system is achieved.

Returning now to the discussion of the exemplary program illustrated in Tables I through III, with the instruction at address 103 loaded in the PCR-register the computer performs a memory reference with respect to the contents of the SAC-register and reads out the control word contained at address 26 in the memory to the C-register. As shown in Table II, this causes bit 23 in the C-register to be set. Reference to FIG. 4 of the drawings shows that when bit 23 is set the SJ-designator is examined by the PCR-register translator and a test is made to determine whether the Jump key specified by this designator had previously been operated.

Assuming first that it has been operated, the count contained in the SAC-register would not be advanced and, hence, the next subcommand, i.e., the one stored at memory address 27 will be executed. When the word stored at address 27 is placed in the C-register, bit 4 thereof is set causing the lower ten bits contained in the PCR-register to be transmitted parallel to the PAZ-register. Stored in bit positions $I^0$ through $I^9$ of the Jump instruction now in the PCR-register is the address of the first instruction in the new subroutine of instructions to be performed subsequent to the jump operation. It can be seen then that the execution of subcommand 4 alters the address contained in the program address counter (PAZ-register) 16, so that instead of performing the next instruction in the normal sequence, a jump is made to a new sequence of instructions specified by the NI-designator of the jump instruction. Therefore, when the housekeeping sequence is initiated by the setting of bit 8 in the C-register on the next memory reference with respect to the SAC-register, the first instruction of a new sequence of instructions will be loaded into the PCR-register. The last instruction in the new sequence of instructions may be another jump instruction for returning the program back to the normal sequence.

The foregoing discussion was based on the premise that the appropriate keys specified by the SJ-designator of the jump instruction had been set. However, if the operator had not set the specified key, the execution of the subcommand 23 would have caused the count 27 contained in the SAC-register to be advanced by one, so that the new address now in the SAC-register would be 30 (octal). It is obvious then, that upon the next memory transfer to the C-register, the word contained in memory address 27 will not be utilized and, hence, there will be no transmission of the address portion of the instruction word to the PAZ-register 16. Instead, the control word at address 30 will be loaded into the control register causing bit 8 thereof to be set. As previously explained, the setting of bit 8 causes the SAC-register to be cleared and the automatic sequence for initiating the housekeeping routine to be set into motion.

During the next housekeeping sequence, the instruction stored in high speed memory address 104 is transferred to the PCR-register 54. Reference to Table III shows that the format of this instruction is also different from that of the general format used for addition and subtraction and the special format used for a Jump instruction. The execution of this instruction causes a word located in a register specified by the F-designator to be transferred to the shift matrix 104 where it undergoes a shift, the number of places being determined by the shift count (SK) designator of the instruction word. The word, as shifted, is then transmitted in parallel via cable 114 and gate 115 to the shift register 106, where it is held.

In carrying out this shifting operation, the N-designator of the instruction word specified the address in memory at which is stored a 24-bit word, the address portion of which specifies the starting address for a sequence of micro-instructions for executing the instruction. The N-designator being 0100 (decimal 4) causes the word stored at memory address 4 (Table I) to be read out to the Z-register. Subsequently, but still during the housekeeping sequence, the address portion of this word is transferred to the SAC-register. Upon the occurrence of the next $M_{SAC}$ to C memory reference, the control word stored at memory address 31 is placed in the C-register. From Table II it can be seen that after this step is performed, bit 16 of the C-register will be set. As has been noted earlier, when bit 16 is set, the PCR-register translator examines the F-designator of the instruction word and causes the word stored at the location defined by the translation of the F-designator to be transferred to the Z-register. In the example being described, the F-designator is 100 (decimal 4).

Referring to FIG. 3, a translation of the F-designator equal to 4 specifies that the source for the word is the accumulator register 74. The word contained in the accumulator therefore passes by way of cable 100 and gate 102 to the Z-register 34.

The next word to be transferred to the C-register is the one stored at memory address 32. This word causes both bits 8 and 18 of the C-register to be set. When bit 18 is set, the word contained in the Z-register is transferred by way of cable 110 to the shift matrix. As will be explained more fully when the details of the shift matrix are considered, signals appear in the cable 112 indicative of the SK-designator. When applied to the shift matrix these signals cause the word to be shifted by the number of places specified by the SK-designator. Because bit $C^{18}$ is set, gate 115 is enabled and the shifted word passes by way of cable 114 to the shift regular 106. The setting of bit 8 in the C-register clears the SAC-register and initiates the automatic two-step sequence for acquiring the next instruction word.

The next machine operation to be considered is the SEARCH function. During the "housekeeping" sequence initiated at the completion of the previous instructions, the instruction stored at memory address 105 is loaded into the PCR-register 54. When in the PCR-register, the N-designator of the instruction word is translated and is used to acquire an address when the first subcommand in a sequence of subcommands is stored for performing the search operation. The manner in which this table lookup is performed has been completely described before and will not be repeated here. At any rate, memory address 33 will be loaded into the SAC-register 22. Subsequently, the computer performs a memory reference with respect to the SAC-register, causing the control word stored at memory address 33 to be transferred to the C-register 32. This causes bit 16 thereof to be set. When bit 16 is set, the PCR-register translator examines the F-designator of the instruction word and effects a data transfer from the location specified by it to the Z-register. From Table III it can be seen that the F-designator is 101. When translated, it specifies that the present contents of the shift register 106 is the information to be sought in the search operation. Subcommand 16 allows the information in register 106 to pass through gate 118 and by way of cable 116 to the Z-register. When the next control word in the sequence, i.e., the one stored at memory location 34, is placed in the C-register, bit 21 is set. This enables gate 130 permitting the information in the Z-register to pass by way of cable 132 to the search memory 120. Provided that an identical word is stored somewhere in the search memory 120, the address of the location where it is stored will be transferred over cable 124 to the equality count register (EKR) 122.

Next, subcommand 22 is initiated which checks the register 122 to determine whether there is an address stored therein. Assuming that there is no address contained in the EKR register, subcommand 22 causes the count contained in the SAC-register to be advanced by one. Hence, subcommand 8 will be the next one to be executed rather than subcommand 10. Subcommand 8, of course, clears the SAC-register and forces the machine into its housekeeping sequence to acquire the next instruction. Now assume that upon the execution of subcommand 22 the EKR-register 122 has an address therein. Under this condition the SAC-register will not be advanced and the next subcommand to be performed is that located at memory address 36. Hence, bit $C^{10}$ will be set and the T-designator of the instruction word will be examined. As illustrated in Table III, the T-designator is 001, indicating the destination is to be the high speed memory 10. The word contained in the Z-register at this time is the word which was previously sought in the search memory. With bit 10 set, gate 40 is enabled and the word in the Z-register passes by way of cable 38 and is stored in the memory location specified by the address portion of the instruction word. In the example under consideration this word will be stored in memory address 303 (octal).

Thus, it can be seen, that the computer of this invention is unlike other instruction-organized machines in that it does not have wired instruction sequences. Instead, the computer described herein employs stored logic sequence called micro-subroutines or subcommands to accomplish the execution of instructions. Also, the computer of this invention contains no clock, that is, generally understood as a clock in most machines. The output from memory to the control register 32 is the "clock" for all of the logic in the machine. The only portion of the computer of this invention that is clocked (as a clock is generally understood) is the high speed memory timing cycle, the search timing cycle, and the shift timing cycle. These three timing chains all employ a two-phase clock and the remainder of the machine is controlled by a memory to C reference.

Logic module

Before getting into the description of the details of the various circuits and registers which are shown in block diagram form in FIG. 1, consideration will be given to the standard logical building block employed in these circuits.

The computer which is the preferred embodiment of the present invention, employs an OR-INVERTER or NOR circuit as a standard logic package. The logic package has at least one output and one or more inputs. The output is positive when either one or any combination of its inputs is negative. The same circuit can be used to perform AND function since its output is negative only when all of its inputs are simultaneously positive. Rather than using the term positive and negative to define the conditions of the inputs and outputs, a negative signal will be defined herein as a logical "one" and a positive signal will be defined as a logical "zero."

Figure 5:
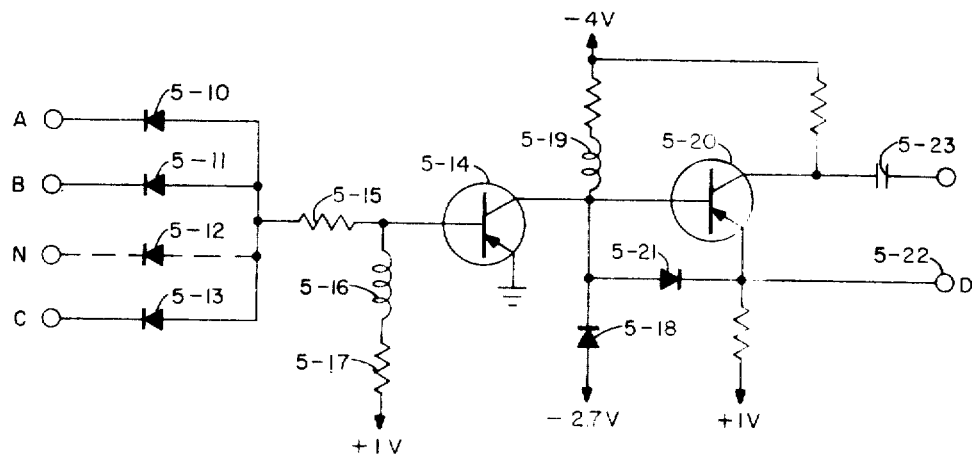
FIG. 5 is a circuit schematic of a preferred NOR logic block for use in implementing the present invention.

A preferred circuit for performing this NOR logic function is illustrated in FIG. 5. The input portion of the circuit including the diodes 5–10 through 5–13, the transistor 5–14 and the associated components 5–15, 5–16, and 5–17 performs the NOR function. The inductor 5–16 in series with the transistor 5–17 allows energy to be stored for turn-off and turn-on overdrive during the steady state period, thereby eliminating transients during switching. The collector of the transistor 5–14 is clamped at a fixed voltage by a diode 5–18 to reduce the range of output voltages under various load conditions. The inductor 5–19 is included to compensate for the total parasitic capacity of the output conductor of transistor 5–14 under no external load conditions.

The output portion of the circuit including transistor 5–20 and its associated components, supplies the necessary current gain to provide maximum fan-out to similar circuits. The output circuit including the transistor 5–20 is an emitter-follower arrangement biased to remain in the linear region for all acceptable loading conditions. The diode 5–21 provides a by-pass around the emitter-base diode of transistor 5–20 to the transistor 5–14 for stray output capacity discharging current during saturation conditions. This by-pass arrangement helps to maintain uniformity between rise and fall times at the output terminal 5–22 under various load conditions. The capacitor 5–23 provides a separate path for output ground current during transition, thereby preventing regenerative current coupling across the ground lead inductance back to the input. If desired, a second emitter-follower stage can be added to the standard arrangement shown in FIG. 5 in parallel with the first emitter-follower to provide double the usual maximum number of fan-outs with no appreciable increase in rise, fall, delay or storage time.

In operation, when each of the input terminals has a logical "0" applied thereto (they all have a positive potential applied thereto) the base terminal of transistor 5–14 will be maintained positive with respect to its emitter. Hence, a high impedance is presented between the emitter electrode and the collector electrode of the transistor 5–14. Hence, the base of transistor 5–20 is maintained at a negative potential with respect to its emitter and the transistor 5–20 is therefore highly conductive. When the output transistor 5–20 is conductive, the output terminal 5–22 too is maintained at a negative potential (a logical "1").

Should one or more of the input terminals have a negative signal applied thereto, the base of transistor 5–14 goes negative with respect to its emitter and, hence, this input transistor is rendered conductive. When conducting the collector electrode of the transistor 5–14 is at approximately ground potential which tends to turn off the emitter-follower stage transistor 5–20. This causes the output terminal 5–22 to go more positive, representing a "0" signal.

Figure 6:
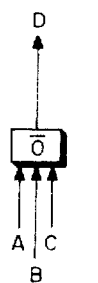
FIG. 6 illustrates the symbol employed herein to represent the NOR circuit of FIG. 5.

For the sake of simplicity in the drawings, the circuit of FIG. 5 is represented by the symbol shown in FIG. 6. The output D is a "0" when either terminal A, B, or C (or any combination) has a "1" applied thereto. Similarly, the output D is a logical "1" only when all of the input terminals A, B, and C have logical "0's" applied thereto.

Figure 7:
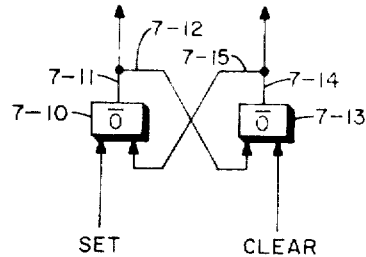
FIG. 7 illustrates the manner in which two of the NOR circuits of FIG. 5 may be interconnected to provide a bit storage device or flip-flop.

FIG. 7 illustrates a manner in which two of the standard building blocks of FIG. 6 may be interconnected to provide for the storage of binary digits. $\overline{O}$ 7–10 has its output terminal 7–11 connected by means of a conductor 7–12 to a first input terminal of $\overline{O}$ 7–13. Similarly, the output terminal 7–14 of $\overline{O}$ 7–13 is connected by means of a conductor 7–15 to a first input terminal of $\overline{O}$ 7–10. When a "1" signal is applied to the SET terminal on $\overline{O}$ 7–10 a "0" signal appears on the conductor 7–12. Hence, if no CLEAR signal is being applied to $\overline{O}$ 7–13 a "1" signal appears on its output 7–14 and is applied to the input of $\overline{O}$ 7–10. Hence, the "1" signal applied to the SET terminal can be removed from 7–10 and the output from $\overline{O}$ 7–13 will maintain the status quo. To change the state of the bistable circuit of FIG. 7 a "1" signal must be applied to the CLEAR terminal on $\overline{O}$ 7–13. When this happens the output signal on conductor 7–14 and 7–15 is a "0" signal. In the absence of a SET signal, then, the output from $\overline{O}$ 7–10 will be a logical "1" signal, which, when applied by way of conductor 7–12 to the input of $\overline{O}$ 7–13, maintains the circuit in the cleared condition.

Figure 8:
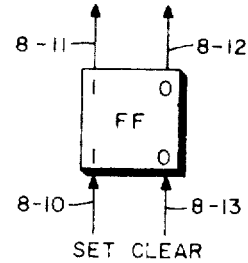
FIG. 8 illustrates the symbol used herein to represent the flip-flop of FIG. 7.

Again, in order to simplify the logical drawings, the bistable circuit or flip-flop of FIG. 7 will be represented by the symbol shown in FIG. 8. In this arrangement, a logical "1" signal applied to the set terminal 8–10 causes the output terminal 8–11 to assume its logical "0" condition and the output terminal 8–12 to assume a logical "1" condition. Similarly, when the flip-flop is cleared by a logical "1" signal applied to the input terminal 8–13, the output terminal 8–11 will have a logical "1" signal and output terminal 8–12 will have a logical "0" signal.

Memory and memory addressing circuits

Figure 9:
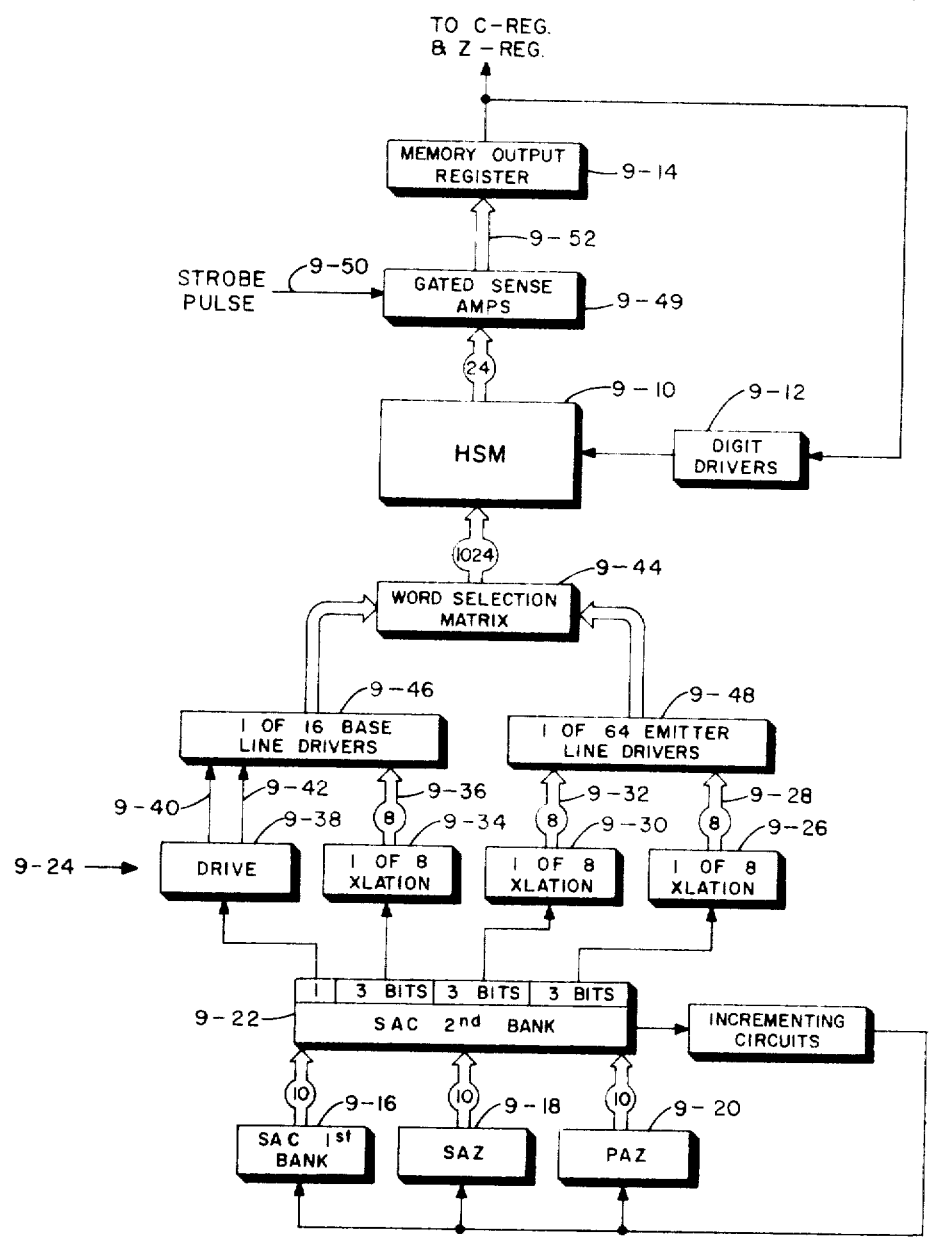
FIG. 9 illustrates in block form the arrangement of the memory and memory addressing circuits.

FIG. 9 illustrates diagrammatically the various circuits required to either read out from the memory of the computer any one of a plurality of 24-bit words or to write a 24-bit word into any one of the possible memory registers. As is fully described in the aforementioned Petschauer et al. article, the high speed memory 9–10 may be comprised of a large plurality of vacuum deposited permalloy films which may be operated in a semi-destructive read-out mode. The particular memory described herein may have a capacity of 1,024 words and is preferably word-organized. The memory is also of the (random access) type. The information stored in any single bit location in this memory is determined by the orientation of the magnetization of the particular film associated with the location. When a set of films are formed, they have a natural or preferred axis of magnetization usually referred to as the "easy" direction. The axis which is at an angle of 90° to the "easy" axis known as the "hard" axis. The magnetization prefers to align itself with the "easy" axis. Ideally, if an external magnetic field displaces the magnetization vector away from the "easy" axis by less than 90°, the vector will fall back in the original direction when the applied field is removed. However, if a vector is displaced more than 90°, it will fall back into the opposite position when the applied field is removed, but will still lie on the "easy" axis. The detection or sensing of the information stored in a bit depends upon the rapid rotation of the magnetization vector so that the resulting flux change will give rise to a voltage in the sense winding which links the film.

In order to write information into a particular memory register, a bi-polar pulse is passed down the selected word line and the digit driver 9–12 is activated to apply a pulse of current on a digit line. The polarity of the digit drive pulse determines what will be stored in that particular bit position of the selected word. The polarity is determined by the contents of the memory output register 9–14 which temporarily holds the word that is to be written into the memory. The word line carries the "address-select" pulse during the write operation. During the "read" operation, a pulse applied to the selected word line produces an output from those memory elements associated with the selected word line produces an output from those memory elements associated with the selected word line that are storing binary "1" signals. The "read" current pulse applied to the selected word line is a bi-polar pulse and the negative portion thereof restores the word which has just been read out by the positive portion of the pulse.

As was described in connection with the discussion of the overall block diagram in FIG. 1, the SAC-register 9–16, the SAZ-register 9–18, the PAC-register 9–20 are the three storage address registers which may be used to access a particular word or word register in the high speed memory.

Upon receipt of a command enable from the memory timing circuits (FIG. 22), the address contained in any one of these three registers is transmitted in parallel to the second rank of the SAC-register 9–22. Once contained in the SAC$^2$-register, the address representing signals are available to the high level translator indicated generally by numeral 9–24. The portion of the translator labeled 9–26 examines the lowest-order three-bit of the SAC$^2$-register and produces an output signal of a predetermined type on one of the eight lines in the cable 9–28, determined by the particular pattern of these three bits. Similarly, the next higher-order three bits (bits 3, 4, and 5) of the SAC$^2$-register are examined by the portion of the translator labeled 9–30 to produce an output signal on one of the eight lines in the cable 9–32. Bit positions 6, 7, and 8 of the SAC$^2$-register are examined by the portion of the translator labeled 9–34 such that a signal is produced on one of the eight lines in cable 9–36. The highest-order bit of the SAC$^2$-register is applied to the translator segment 9–38, and depending upon whether the bit being examined is a "one" or a "zero" a signal is produced on either line 9–40 or 9–42.

Figure 10:
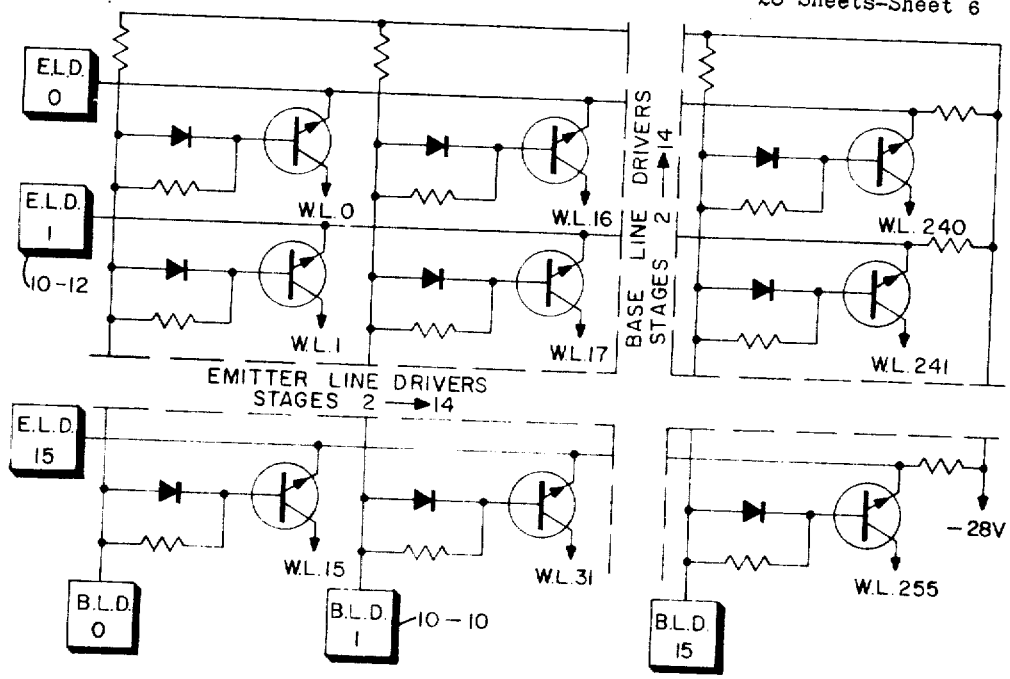
FIG. 10 is a circuit schematic showing how the word selection matrix in FIG. 9 may be implemented.

The means employed to select one of the 1,024 possible word lines in the high speed memory is the word selection matrix 9–44. Referring momentarily to FIG. 10, there is shown the circuit for uniquely selecting one out of 256 possible word lines in the high speed memory. Additionally, three substantially identical circuits are provided so that it is possible to select any one of 1,024 such word lines. Each matrix has 16 emitter line drivers (ELD), 16 base line drivers (BLD), and 256 selection transistors. Normally the bias voltage levels on all base and emitter lines are such that all selection transistors are in their non-conductive state. In order to select a desired word, the appropriate base line driver is switched to reduce the reverse bias on all the selection transistors of the column to 0 bolts. Subsequently, a pulse of the required amplitude for operating the memory is driven into the appropriate row by an emitter line driver. The base electrodes of all selection transistors in the row, except the one at the intersection of the previously selected column, are sufficiently reversed biased to prevent turn-on. However, the selected transistor will turn-on conducting a drive pulse into the desired word line. The diode in series with the base of the selection transistor acts to reduce the large capacitance of the transistor and stores charge to allow the transistor to recover before the diode, at turn-off. The resistor in parallel with the diode provides the steady state reverse biasing current for the unselected transistors in the matrix.

In order to illustrate the operation of the word selection matrix of FIG. 10, assume that it is desired to energize memory word line 17. The base line driver 10–10 is first turned on to reduce the normal reverse bias to 0 volts on all of the transistors in the column to which base line driver 10–10 is connected. Then, a pulse of the required amplitude for rotating the magnetization of the memory elements is driven into the appropriate row by the emitter line driver 10–12. Since the only transistor in this row, which has this reverse bias reduced to 0, is transistor 10–14, it is the only one in the row which will pass this signal from its emitter electrode to its collector-electrode to which word line 17 is connected. The remaining transistors in the row being sufficiently reversed biased will not conduct the pulse from the emitter line driver 10–12.

The base line drivers of FIG. 10 are represented in FIG. 9 by a block labeled 9–46. Similarly, the emitter line drivers are represented by the block labeled 9–48. Because the translator segments 9–26 and 9–30 together can uniquely select one out of 64 emitter line drivers, and since the translator segments 9–34 and 9–38 can uniquely select one out of 16 base line drivers, it is apparent that any one of 1,024 transistors in the word selection matrix can be rendered conductive. Thus, any one of the 1,024 words in the high speed memory 9–10 can be selected for either reading or writing operations.

During a readout operation, the 24 bits of the selected word are read out in a parallel fashion and amplified by the gated sense amplifier 9–49. In order to increase the signal to noise ratio of the memory system, the readout is made to occur at a time when the signals induced in the sense lines of the memory by the switching of various bits of the selected word are at a maximum. To achieve this result, the timing and control circuits (FIG. 22) produce a strobe pulse at the proper time. It is applied by way of the conductor 9–50 to enable the gated sense amplifiers so that the word may be transmitted over cable 9–52 to the memory output register 9–14. Once the information is available in the memory output register, it can be transmitted to the other registers in the computer either through the memory exchange register of Z-register or directly to the C-register.

Figure 11:
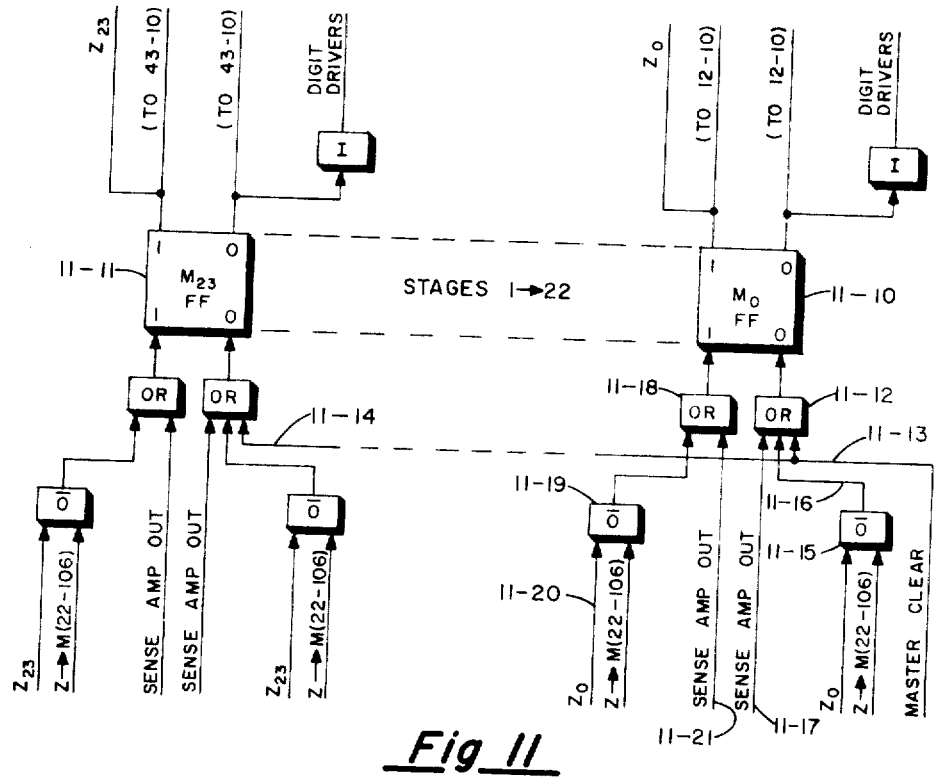
FIG. 11 is a block diagram representation of the Memory Output Register.

FIG. 11 illustrates the high speed memory output register. For the sake of simplicity, only two stages 11–10 and 11–11 thereof are shown, the remaining 22 stages being represented by the dashed lines. Because the inputs to each stage are substantially identical consideration will be given only to the inputs of the lowest order stage 11–10. Connected to the CLEAR terminal of this stage is an OR circuit 11–12. The OR circuit 11–12 has three inputs. A logical "1" signal applied to the conductor 11–13 when the "Master Clear" button is depressed, passes through this OR circuit to clear the flip-flop 11–10 to its "0" state. Similarly, this same Master Clear signal is applied to all of the stages in the register by way of bus 11–14. A second input to the OR circuit 11–12 comes from the output of the sense amplifier used to amplify and shape the signals read out from the high speed memory. The third input to the OR circuit 11–12 comes from the output of $\overline{O}$ 11–15 by way of conductor 11–16. $\overline{O}$ 11–15 has two inputs. The first input comes from the "0" side of the C-register flip-flop stage 0. The second input comes from the memory timing chain FIG. 22 and is the command enable TRANSFER Z to HSM. It can be seen that if the C-register stage "0" is cleared logical "0" signals will be applied to both inputs of $\overline{O}$ 11–15 so that a logical "1" signal appears on the conductor 11–16 and passes through OR circuit 11–12 to clear stage 0 of the memory output register. Similarly, if the sense line threading the selected lowest order bit detects a "0" signal, a "1" signal appears on the conductor 11–17 and passes through the OR circuit 11–12 to also clear the flip-flop 11–10.

Connected to the SET terminal of flip-flop 11–10 is the output of OR circuit 11–18. This OR circuit has two inputs, the first coming from a sense amplifier and the second coming from the output of $\overline{O}$ 11–19. $\overline{O}$ 11–19 also has two inputs. The first comes from the "1" side of the lowest-order stage of the Z-register by way of conductor 11–20. The second input comes from the high speed memory timing chain and is the command enable TRANSFER Z to HSM. If stage 0 of the Z-register is set, "0's" are applied to both of the inputs of $\overline{O}$ 11–19 so that a "1" signal passes through OR circuit 11–18 to set the stage 0 flip-flop of the memory output register. Similarly, if the sense amplifier in question is detecting a logical "1," a "1" signal passes by way of the conductor 11–21 through the OR circuit 11–18 to also set the lowest order stage of the memory output register.

The connections to the highest order stage 11–11 are identical in function to those described in connection with the lowest order stage, the only difference being that the $\overline{O}$ inputs come from stage 23 of the Z-register rather than stage 0 thereof.

This completes the description of the high speed memory and its associated addressing and selection circuits. Consideration will next be given to the details of the control register.

Control register

It may be recalled from the general description already given that when a control word is taken from memory and placed in the control register one or more bits of the control register are set. Depending upon which bit in the 24-bit C-register is set, the computer of this invention performs the various functions, termed subcommands, itemized in the chart of FIG. 4.

Referring now to the lowest order stage of the control register shown in FIG. 12, there is shown a bistable circuit or flip-flop 12–10. Connected to the SET terminal thereof is an OR circuit 12–11 having a pair of input lines 12–12 and 12–13. The line 12–12 is connected to the distribution network (not shown) associated with the Master Clear button. When this button is depressed a logical "1" signal is applied to the conductor 12–12 and passes through the OR gate 12–11 to set the lowest order stage to its "1" state. It should be noted at this point, that the Master Clear signal sets the $C^0$ flip-flop, but is applied to the CLEAR terminal of the remaining C-register flip-flops. In other words, when the Master Clear button on the operator's console is depressed, all of the control register flip-flops are cleared to their "0" state except for stage 12–10, which is set to its "1" state.

The other input for OR circuit 12–11 comes from the junction point 12–14 by way of conductor 12–13. The junction 12–14 is connected to the output of $\overline{O}$ 12–15 by means of conductor 12–16. NOR circuit 12–15 has two inputs. The first input appearing on line 12–17 comes from the "1" side of stage 0 of the memory output register. The second input to $\overline{O}$ 12–15 appears on conductor 12–18 and comes from the main timing and control circuits of FIG. 22, namely from $\overline{O}$ 22–92. A signal appears on this line only at the time when a transfer of information is to be made between the high speed memory and the control register. The signal appearing on the line is termed the M to C strobe pulse. The exact manner in which this signal is developed will be described later on when the details of FIG. 22 are considered.

It can be seen that it is only when stage 0 of the memory output register contains a binary "1" signal that $\overline{O}$ 12–15 is fully enabled to output a logical "1" signal on the conductor 12–16. Hence, only if stage 0 of the memory output register is set, will the flip-flop 12–10 be set.

Connected to the CLEAR terminal of flip-flop 12–10 is an OR circuit 12–19. A first input to this OR circuit comes from $\overline{O}$ 12–20 by way of conductor 12–21. $\overline{O}$ 12–20 has two inputs. The first comes from the "0" side of the lowest-order stage of the memory output register by way of conductor 12–22. The signal on conductor 12–23 is maintained at a logical "1" level except for during the time at which the M to C strobe pulse is applied thereto, when it goes to its "0" level. Only if stage 0 of the memory output register is cleared at the time that the M to C strobe appears will $\overline{O}$ 12–20 be fully enabled to output a pulse for clearing the flip-flop stage 12–10. As will be explained more fully hereinbelow when the computer timing circuits are described in detail, the signal appears on conductor 12–24 at the completion of the automatic library lookup sequence. This logical "1" signal passes through OR circuit 12–19 to clear the flip-flop 12–10 so that normal operation of the machine may resume.

The output from the "1" side of flip-flop 12–10 appears on conductor 12–25 and is the signal used to initiate the timing chain for performing the special or library lookup sequence.

The output from NOR circuit 12–15 when both of its inputs are at their logical "0" level not only sets the flip-flop 12–10, but also appears on conductor 12–16 and is applied directly to the CLEAR terminal of stage 0 through 3 of the SAC-register. The effect of this signal is to clear these four stages to their "0" state, thus preparing them for the subsequent receipt of the N-designator of the instruction word. The gating signal itself for allowing the transmission of the upper four bits of the Z-register ($Z_N$) to the SAC-register appears at the output of $\overline{O}$ 12–26 when either of its inputs 12–27 or 12–28 are maintained at the "1" level.

It may be seen that when the lowest-order stage of the C-register is set various circuits are enabled for allowing the N-designator to be transmitted in parallel to the SAC-register and for initiating the library lookup automatic sequence illustrated in the table of FIG. 4.

$Z_A$ to SAC

FIG. 13 illustrates that portion of the C-register for performing subcommand 1 shown in FIG. 4. Flip-flop 13–10 when set, causes the transmission of the lower ten bits of the Z-register to the SAC-register. The manner in which the circuit of FIG. 13 operates to perform this function will now be described.

Flip-flop 13–10 can be set in one of two ways. First, when $\overline{O}$ 13–11 has both of its inputs at the "0" level, a "1" signal appears on its output conductor 13–12 and at junction 13–13. From this junction the signal can pass by way of conductor 13–14 and through OR circuit 13–15 to the SET terminal of flip-flop 13–10. The input signals to $\overline{O}$ 13–11 come from the "1" side of stage 1 of the memory output register by way of conductor 13–16, and from the output of the M→C strobe timing circuit 22–92 by way of conductor 13–17. In other words, if stage 1 of the memory output register is set at the time that the strobe signal appears, $\overline{O}$ 13–11 will be fully enabled and will output a "1" signal to set flip-flop 13–10 to its "1" state. The other way in which flip-flop 13–10 can be set is by way of a "1" signal appearing on the conductor 13–18, connected to a second input of OR circuit 13–15. The signal on line 13–18 is a "1" during the execution of the second part of the automatic "library lookup" sequence mentioned previously and initiates the $Z_A$ to SAC subcommand.

Bit 1 of the control register, i.e., flip-flop 13–10 may be cleared either by a Master Clear signal being applied to the conductor 13–19 or by a signal of the output conductor 13–20 of $\overline{O}$ 13–21. $\overline{O}$ 13–21 produces a logical "1" output when both of its inputs are at their logical "0" level. A first input to this $\overline{O}$ comes from the "0" side of stage 1 of the memory output register by way of conductor 13–22 and is a logical "0" only when this last mentioned flip-flop is cleared. The second input to $\overline{O}$ 13–21 is a M to C strobe signal produced by the high speed memory timing chain and enters the circuit of FIG. 13 by way of conductor 13–23. In other words, if the memory output register stage 1 is cleared at the time that a M to C strobe signal appears, $\bar{Q}$ 13–21 will be fully enabled and a "1" signal appearing on conductor 13–20 will pass through the OR gate 13–24 to clear flip-flop 13–10, if it is not already in its "0" state.

The signal used to clear the SAC-register immediately prior to the receipt of the lower ten bits of the Z-register ($Z_A$) is developed at the output of $\bar{O}$ 13–25. Since this signal is applied directly to the CLEAR terminal of the SAC-register flip-flops it must be a logical "1" signal to effect a clearing thereof. For the output of $\bar{O}$ 13–25 to be a "1", its input must be a "0" signal. The input to this $\bar{O}$ comes from the output of $\bar{O}$ 13–26 by way of conductor 13–27. $\bar{O}$ 13–26 has three inputs, any one of which carrying a logical "1" signal will cause $\bar{O}$ 13–26 to output a "0" signal. The first input to this $\bar{O}$ comes by way of conductor 13–28 from the timing circuits of FIG. 22 whenever the computer is performing its automatic library lookup sequence. It should be recalled at this point that whenever bit 0 or bit 8 of the C-register is set, an automatic two-step sequence is executed wherein the contents of the memory register specified by the address in the SAC-register is first transferred to the Z-register, and secondly, the lower ten bits ($Z_A$) is transferred to the SAC-register. The timing circuits provide the signal during this sequence to cause $\bar{O}$ 13–26 to output a "0" signal, thereby preparing the SAC-register for a subsequent receipt of the lower ten bits from the Z-register. The second input to $\bar{O}$ 13–26 comes by way of conductors 13–29 when the "Master Clear" button on the operator's console is depressed. The remaining input to $\bar{O}$ 13–26 comes by way of conductors 13–30 and 13–31 from junction point 13–13. As has already been mentioned, the signal at junction 13—13 is a "1" signal whenever the memory output register contains a binary "1" in stage 1 thereof at the M to C strobe time. In other words, the same signal which is used to set the flip-flop 13–10 also passes to $\bar{O}$ 13–26 for producing the signal which clears the SAC-register.

The "0" side of flip-flop 13–10 is connected by means of conductor 13–32 to a first input $\bar{O}$ 13–33. The other input to this last mentioned $\bar{O}$ comes by way of the conductor 13–30 from junction 13—13. Whenever flip-flop 13–10 is set or when $\bar{O}$ 13–11 is outputting a "1" signal, $\bar{O}$ 13–33 outputs a "0" signal on conductor 13–34 which is connected to the $\bar{O}$ gates associated with the SAC-register for permitting the transfer of a information stored in the lower ten bits of the Z-register to pass to the SAC-register and to be stored therein.

*Slip subcommand*

FIG. 14 illustrates that portion of the control register for executing subcommand 2 as set forth in the table of FIG. 4. This subcommand examines the contents of the accumulator register 74 and the J-designator (bit $I^{11}$ and $I^{12}$) of the PCR-register in order to determine if the machine is to skip the instruction stored in the next sequential program address. The table of FIG. 3 illustrates the three skip conditions produced upon the translation of the J-designator.

The skip is actually executed by taking the next control word from the next sequential SAC-address. This next control word stored in the memory contains subcommand 3 to advance the count in the PAZ-register, which is the program address counter. When conditions are such that no skip is to be performed even though the third stage of the control register is set, a signal is produced for advancing the count contained in the SAC-register so as to skip over the "Advance PAZ" subcommand so that the computation proceeds in a normal fashion.

Flip-flop 14–10 when set, causes subcommand 2 to be executed. This flip-flop can be set only by a "1" signal on conductor 14–11 which is connected to the output of $\bar{O}$ 14–12. In order to have a "1" signal on this conductor both of the inputs to $\bar{O}$ 14–12 must be at their "0" level. A first comes from the "1" side of stage 2 of the memory output register, and when this stage is set the signal on conductor 14–13 is a "0". At the time in the memory cycle that the M to C strobe signal is produced the signal on line 14–14 is also a "0" so that the flip-flop 14–10 is set.

This flip-flop may be cleared in two ways. First, a Master Clear signal on conductor 14–15 can pass through OR circuit 14–16 to the CLEAR terminal of flip-flop 14–10. Similarly, when $\bar{O}$ 14–17 is fully enabled by having both of its inputs at the "0" level, a "1" signal is produced at its output, which also passes through OR circuit 14–16 to clear the flip-flop. $\bar{O}$ 14–17 has a first input thereof connected to the "0" side of stage 2 of the memory output register and the other connected to the M to C strobe circuits 22–92. Hence, if stage 2 of the memory output register does not contain a "1" signal flip-flop 14–10 will be cleared if not already in the cleared state.

The output from the "1" side of the flip-flop 14–10 is connected by means of conductor 14–18 to a $\bar{O}$ 14–21 so that this $\bar{O}$ can output a "1" signal only if the flip-flop is set. A "1" signal at the output of $\bar{O}$ 14–21 causes the count contained in the SAC-register to be advanced.

The series of $\bar{O}$ 14–23, 14–24, and 14–25 is the means employed to examine the J-designator of the instruction word to determine the condition the accumulator register must be in to have the skip command fully executed. More specifically, $\bar{O}$ 14–23 receives a first input from the "1" side of the stage 11 of the PCR-register by way of conductor 14–26 and a second input from the "0" side of stage 12. Provided that stage 11 of the PCR-register is set and stage 12 is cleared, $\bar{O}$ 14–23 will be fully enabled and will output a "1" signal which is inverted by $\bar{O}$ 14–27 so that a "0" signal appears on the output line 14–28 of this last mentioned circuit. This signal is applied to a first input to the gate 14–29. If the other inputs to this last mentioned gate are at their "0" level, it will output a "1" signal to $\bar{O}$ 14–21 causing the output thereof to become a "0" signal. This "0" signal when applied to the Advance SAC Control flip-flop, is incapable of initiating the count sequence and, hence, the next sequential subcommand (ADVANCE PAZ) will be used on the next memory transfer to the C-register.

The $\bar{O}$ 14–30 through 14–33 have their input lines connected to the "0" side of the accumulator flip-flop for stages 0 through 22. Provided that the accumulator contains all "0's," the inverters 14–34 through 14–37 will all output logical "0" signals to the remaining input terminals of gate 14–29 and to the input terminals of $\bar{O}$ 14–38. Gate 14–29 will output a "1" signal only upon the condition that the accumulator register is cleared and the J-designator is equal to 01. Referring to FIG. 3, it can be seen that this is a proper skip condition. NOR circuit 14–21 will therefore output a "0" signal and the next sequential subcommand will be taken. As mentioned previously, the subcommand programmed at the sequential address following the Skip command is the command to advance the count in the PAZ-register. Because the word in the PAZ-register specifies the address of the next instruction to be taken, the effect of the execution of the Skip command is to skip the next sequential instructionl. Had the contents of the accumulator been "0" and the J-designator been 10 rather than 01, the input to $\bar{O}$ 14–23 on conductor 14–26 would have been a logical "1" such that the output of inverter 14–27 would also be a "1" signal to disable the gate 14–29. Hence, gate 14–29 would output a "0" signal instead of a "1" signal. The "1" signal appearing on conductor 14–26 would also be applied to an input terminal of $\bar{O}$ 14–24 so that the inverter 14–39 would output a "1" signal on the conductor 14–40. Under the assumptions made, $\overline{O}$ 14–41 would therefore output a "0" signal to the remaining terminal of gate 14–21. It can be seen that gate 14–21 would be fully enabled, i.e., all of its inputs would be at the "0" level, and hence, would output a "1" signal to advance the count contained in the SAC-register so as to skip over the command which is used to advance the count in the PAZ-register.

As a second example for illustrating the operation of the circuits employed to implement the Skid command, assume that the contents of the accumulator is something other than "0" and that the J-designator is 10. With the contents of accumulator unequal to 0, at least one of the $\overline{O}$ circuits 14–30 through 14–33 will have one of its inputs at the "1" level and, hence, this particular $\overline{O}$ circuit will output a "0" signal. Assuming that bit 8 of the accumulator is set to its "1" state, $\overline{O}$ 14–31 will output a "0" signal. This "0" signal will be inverted by $\overline{O}$ 14–35 causing a "1" signal to be applied to one of the inputs to the gate 14–29, thereby forcing it to output a "0" signal to one of the input terminals of gate 14–21. The "1" output from inverter 14–35 is also applied to an input terminal of the $\overline{O}$ 14–38. This circuit therefore is forced to output a "0" signal to the input terminal of $\overline{O}$ 14–41.

With the J-designator equal to 10 only gate 14–24 will be fully enabled, gates 14–23 and 14–25 being disabled by logical "1" signals at least one of their inputs. $\overline{O}$ 14–24 therefore outputs a logical "1" signal which is inverted by circuit 14–39 causing a "0" signal to appear on the conductor 14–40 which is connected to a second input of the gate 14–41. If bit 23 of the accumulator is cleared, indicating that a positive number is stored therein, the conductor 14–44 will have a "0" signal applied thereto and gate 14–41 will be fully enabled. The resulting logical "1" output from this last mentioned $\overline{O}$ when applied to the gate 14–21 causes a logical "0" to appear at its output. As mentioned previously, this logical "0" is unable to initiate the "advance SAC" circuits, and hence, the command "Advance PAZ" will be executed in the normal order. Had the J-designator been other than 10, the gate 14–41 would not be fully enabled and, hence, would output a "0" signal to gate 14–21. This would fully enable gate 14–21 causing it to output a "1" signal advancing the count in the SAC-register to skip over the command which advances the count in the PAZ-register.

The third skip condition illustrated in the table of FIG. 3 is when the accumulator contains a negative number and the J-designator is equal to 11 (decimal 3). Bit 23 of the accumulator is the sign bit and when it is a logical "1," it is indicative of a negative number. As had already been shown, whenever the accumulator contains a number other than zero $\overline{O}$ 14–21 receives at least one logical "1" input thereto, causing it to output a "0" signal to $\overline{O}$ 14–21. With a J-designator of 11, only $\overline{O}$ 14–25 is fully enabled to output a "1" signal. The gates 14–23 and 14–24 are, at this time, only partially enabled and, hence, output "0" signals. The resulting logical "1" signals appearing on conductors 14–28 and 14–40 insure that the gates 14–41 and 14–29 will produce only "0" outputs. However, the "1" input applied to inverter 14–42 causes a "0" signal to appear on the conductor 14–43 leading to a first input of the gate 14–44. Gate 14–44 is therefore partially enabled. The other input to this gate comes by way of the conductor 14–45 from the "1" side of the stage 23 of the accumulator register. It can be seen, that if the accumulator contains a negative number, a "0" signal will appear on conductor 14–45 to fully enable gate 14–44. Hence, a "1" signal appears on line 14–46. This signal inhibits gate 14–21 forcing it to output a "0" signal. It may be recalled that "0" signal output from $\overline{O}$ 14–21 prevents the count in the SAC-register from being advanced. Had either the accumulator contained a positive number or the J-designator been different from 11, gate 14–44 would not have been fully enabled so that a "0" signal would have appeared on conductor 14–46 instead of a "1" signal. This "0" signal would serve to fully enable the gate 14–21 causing it to output a "1" signal for advancing the count in the SAC-register, thereby preventing the skip operation from being performed.

This completes the description of a major circuit employed to implement the Skip subcommand. The next subcommand to be considered is number 3 of FIG. 4, "Advance PAZ."

*Increment program address register*

FIG. 15 illlustrates stage 3 of the C-register and the associated circuits employed to effect an incrementation of the count contained in the PAZ-register. In order to execute subcommand 3, it is necessary to utilize a special clocked sequence. The normal memory cycle must be stopped at this time to prevent the second rank of the SAC-register from advancing the address in the particular register being referenced. The timing chain employed for performing this special clocked sequence is illustrated in FIG. 16.

As illustrated in FIG. 15, flip-flop 15–10 of the C-register has an OR circuit 15–11 connected to its CLEAR terminal. The first way in which the flip-flop 15–10 may be cleared is by way of a Master Clear signal on the conductor 15–12. Similarly, when the output on conductor 15–13 is a "1" signal, OR circuit 15–11 passes this signal to the CLEAR terminal. In order to have a "1" signal on conductor 15–13, both of the inputs to $\overline{O}$ 15–14 must be "0" signals. A first input to $\overline{O}$ 15–14 comes from the "0" side of stage 3 of the memory output register by way of conductor 15–15. Whenever this stage of the memory output register is cleared, $\overline{O}$ 15–14 will be partially enabled. It is not until the time that the M to C strobe pulse is generated by the memory timing circuits that the signal on conductor 15–16 goes to its "0" level to fully enable $\overline{O}$ 15–14 to provide the output required to clear flip-flop 15–10.

The stage 3 flip-flop of the control register is set whenever stage 3 of the memory output register is set at the M to C strobe time. More specifically, conductor 15–17 connects the output of the "1" side of the stage 3 memory output register flip-flop to an input terminal of $\overline{O}$ 15–19. When this flip-flop is set, a "0" signal appears on this input and at the M to C strobe time a "0" signal is applied by way of conductor 15–18 to the other terminal of $\overline{O}$ 15–19. $\overline{O}$ 15–18 is therefore fully enabled and outputs a "1" signal on the conductor 15–20 to set the flip-flop 15–10.

The signal appearing on the conductor 15–20 which sets the C-register flip-flop is also applied to the timing chain of FIG. 22 to stop the clock, i.e., disable the main memory timing chain. Additionally, this signal is applied to the "Advance PAZ" timing circuit of FIG. 16. The output from the "0" side of flip-flop 15–10 is also applied to the same circuits as the output from NOR circuit 15–19. Hence, the desired operation is initiated when $\overline{O}$ 15–19 is fully enabled, and this condition is maintained by the setting of the flip-flop 15–10 to its "1" state. In other words, the desired operation is started by the output from $\overline{O}$ 15–19 and held in this condition by the setting of flip-flop 15–10. The manner in which the main memory timing chain is stopped during the "advance PAZ" sequence is described below in connection with FIG. 16.

Referring to FIG. 16, the "1" output from $\overline{O}$ 15–19 is applied by way of conductor 16–10 to a first input terminal of $\overline{O}$ 16–11. The second input to $\overline{O}$ 16–11 comes from the "0" side of flip-flop 15–10 by way of conductor 16–12. A "1" signal on either one of these input lines causes $\overline{O}$ 16–11 to output a "0" signal to the gate 16–13. As will be explained more fully hereinbelow, the "stop-clock" signal previously mentioned causes the memory timing chain to stop in a condition wherein the signal appearing on conductor 16–14 is also a logical "0" signal. Under this condition, $\overline{O}$ 16–13 is fully enabled and outputs a "1" signal to the inverter 16–15.

The $\overline{O}$ 16–15 is one of the components of a pulse generator which further includes $\overline{O}$ 16–16, the delay line 16–17, and the inverter 16–18. A logcal "1" input to $\overline{O}$ 16–15 causes it to output a "0" signal to the $\overline{O}$ 16–16. This last mentioned circuit therefore has a "1" output, as least for a predetermined time. The "0" signal output from $\overline{O}$ 16–15 is also applied to the inverter 16–18, but is delayed a predetermined time interval by means of the delay line 16–17. At the completion of the predetermined delay period the inverter 16–18 outputs a "1" signal to the $\overline{O}$ 16–16, causing its output to revert back to the "0" level. The short logical "1" output pulse from $\overline{O}$ 16–15 is applied by way of conductor 16–19 to a first input terminal of $\overline{O}$ 16–20, causing its output to temporarily revert to the "0" level. This signal is applied to gating circuit associated with the SAC²-register and as a result, the information contained in the PAZ-register is transferred thereto.

While this gating operation is taking place, the "1" signal of predetermined duration appearing at the output of $\overline{O}$ 16–16 is passing through a second delay line 16–21. The delay of this element is such that the gating function is completed before the output signal from delay 16–21 becomes effective on the $\overline{O}$ 16–22 to which it is connected. After a period of time established by the delay element 16–21, the "1" signal appearing at the output of $\overline{O}$ 16–16 is applied by way of conductor 16–23 to a first input terminal of $\overline{O}$ 16–22. This same signal also appears on conductor 16–24. Conductor 16–24 is connected to the "0" side of all of the PAZ-register flip-flops and serves to clear them out prior to the receipt of any new information signals. Because of the inherent delay presented by the NOR circuit 16–22, the PAZ-register is cleared out prior to the time that the logical "0" signal appears on the output conductor of NOR circuit 16–22 to gate the contents of the SAC²-register, as incremented, back to the PAZ-register.

It may be noted that NOR circuits 16–20 and 16–22 each have a second input. More specifically, the conductor 16–25 is connected to the output from $\overline{O}$ 22–50 of the main memory timing chain. A logical "1" signal thereon causes a gating of the information from the PAZ-register to the SAC-register during the execution of the other subcommands requiring this data transfer. Similarly, a logical "1" output signal appearing on conductor 16–26 causes $\overline{O}$ 16–22 to output a logical "0" signal to gate the contents of the SAC²-register plus one back to the PAZ-register. This operation occurs, for example, during the execution of subcommand 6, which is listed in the table of FIG. 4.

$PCR_A$ to $PAZ$

FIG. 17 illustrates the circuits of the C-register employed to perform subcommand 4. As is illustrated in FIG. 4, subcommand 4 causes the address portion (the lower ten bits) of an instruction word contained in the PCR-register to be transferred to the PAZ-register. Stage 4 of the C-register includes a flip-flop 17–10 and its associated input and output circuits. This flip-flop may be cleared to its "0" state by a Master Clear signal appearing on the conductor 17–12. The "Master Clear" signal is a logical "1" and passes through the OR circuit 17–13 to the CLEAR terminal of the flip-flop. Also, if stage 4 of the memory output register is cleared at the time that the M to C strobe pulse occurs, both of the input lines 17–14 and 17–15 will have "0" signals thereon. The $\overline{O}$ 17–16 will be fully enabled and will output a "1" signal. It passes through the OR gate 17–13 to the CLEAR terminal of flip-flop 17–10.

If the memory output register stage 4 is set at the time the M to C strobe pulse occurs, the line 17–17 and 17–18 will have "0" signals thereon and $\overline{O}$ 17–19 will be fully enabled. This last mentioned circuit therefore outputs a "1" signal to the junction point 17–20. Because junction 17–20 is connected by means of conductor 17–21 to the SET terminal of flip-flop 17–10, the flip-flop will be switched to its "1" state.

The output signal appearing at junction 17–20 for setting the flip-flop 17–10 also passes by way of the conductor 17–22 to junction point 17–23. This last mentioned junction is connected by means of conductor 17–24 to a first input terminal of a $\overline{O}$ 17–25. Therefore, when $\overline{O}$ 17–19 is outputting a "1" signal, $\overline{O}$ 17–25 produces a logical "0" output. This signal serves as an input to an inverter 17–26. The output from inverter 17–26 is connected to the "0" side of each of the flip-flops comprising the PAZ-register. When this output is a "1" signal, it is effective to clear out the previous contents of the PAZ-register, preparing it for a subsequent receipt of a new set of information bits. It may also be noted that a conductor 17–27 is also connected as an input to the $\overline{O}$ 17–25. Conductor 17–27 is connected to the "Master Clear" circuits so that when the Master Clear button on the operator's console is manually depressed a "1" signal appears thereon. At this time, $\overline{O}$ 17–25 outputs a "0" signal which is inverted by circuit 17–26 to produce the required "1" signal for clearing the PAZ-register.

When the output from $\overline{O}$ 17–19 is a "1" signal it is applied as an input to a $\overline{O}$ 17–28 by means of conductor 17–22. This last mentioned circuit therefore outputs a "0" signal at this time which serves as an enabling signal for the gates associated with the PAZ-register. When these particular gates are enabled the information contained in the lower ten bits of the PCR-register are transferred in parallel to the PAZ-register.

A second input to $\overline{O}$ 17–28 comes from the output of the "0" side of the flip-flop 17–10. It may be seen that when the output from NOR circuit 17–19 sets flip-flop 17–10, the signal appearing at the output from the "0" side is a "1" signal and when applied to $\overline{O}$ 17–28 creates the "0" enabling signal previously described. Hence, the signal which initially sets flip-flop 17–10 also initiates the enabling of the required gates. Subsequently, the setting of flip-flop 17–10 holds the output from $\overline{O}$ 17–10 at this "0" level so that the gating function may be completed even though the M to C strobe signal is removed.

Repeat subcommand

FIG. 18 illustrates the portion of the control register which controls the Repeat operation. When the flip-flop 18–10 is set, various circuits are rendered operative, causing the next subsequent instruction programmed immediately after the Repeat instruction to be executed a predetermined number of times. Flip-flop 18–10 may be cleared either by the application of a "Master Clear" signal to the conductor 18–11 or by fully enabling the $\overline{O}$ 18–12. In either case, a logical "1" signal appears at the output of OR circuit 18–13 which is connected to the CLEAR terminal of stage 5 of the C-register. To fully enable the $\overline{O}$ 18–12, the signal appearing on conductor 18–14 at the time that the M to C strobe signal appears on line 18–15 must be a "0". Conductor 18–14 is connected to the "0" side of the stage 5 of the memory output register and, hence, carries a "0" signal whenever this stage of the register is cleared.

To set flip-flop 18–10 NOR circuit 18–16 must be fully enabled. When this is the case, a "1" signal appears at the junction 18–17 which is connected by means of a conductor 18–18 to the SET terminal of flip-flop 18–10. The first input of $\overline{O}$ 18–16 is connected by means of conductor 18–19 to the "1" side of stage 5 of the memory output register. When this stage of the memory output register is set, a "0" appears on this line. Hence, when the M to C strobe signal appears on the conductor 18–20, $\overline{O}$ 18–16 is fully enabled and the flip-flop 18–10 is set.

Figure 19:
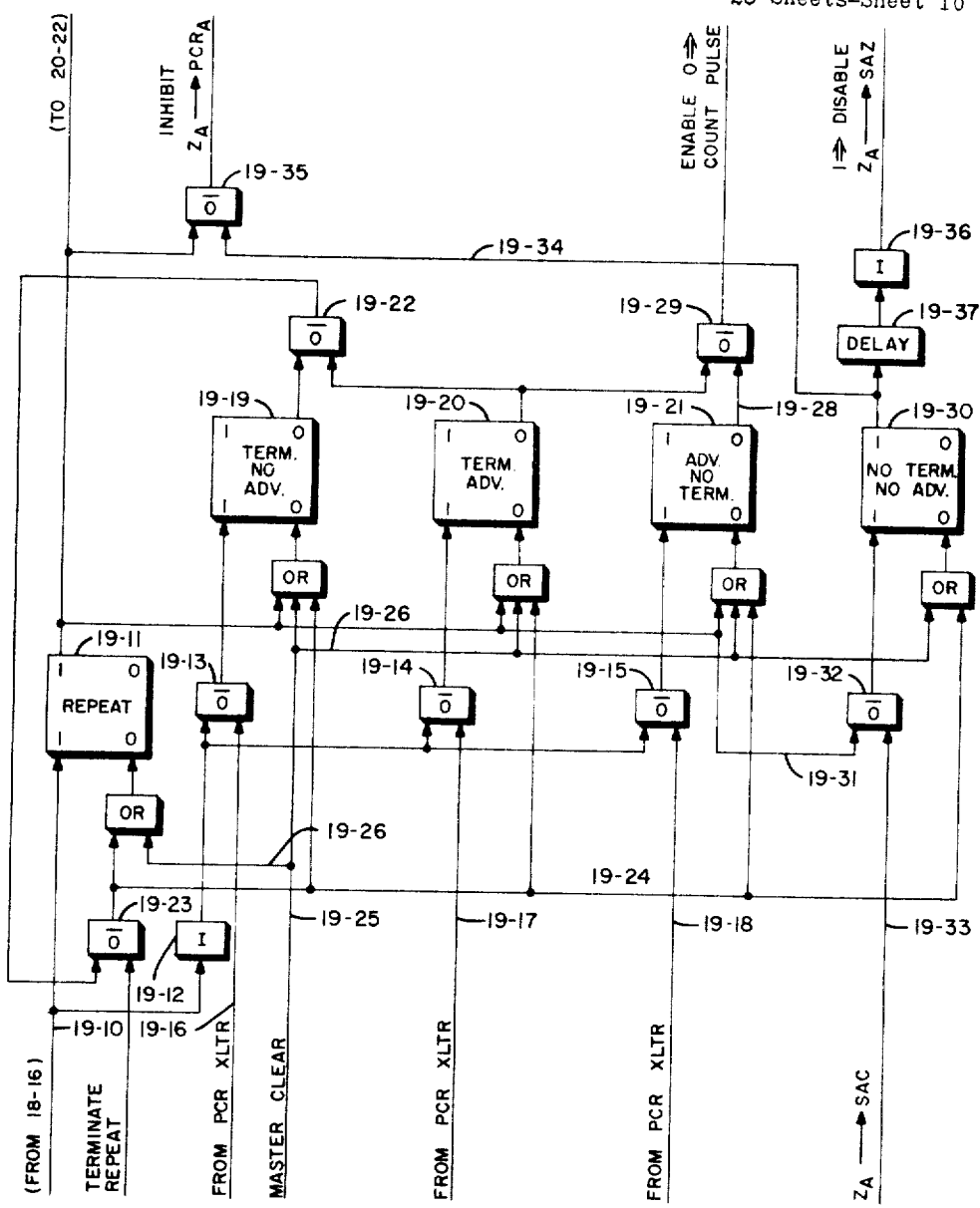
FIG. 19 illustrates the timing circuits for effecting a Repeat operation.

This logical "1" output signal from $\overline{O}$ 18–16 also appears on the conductor 18–21 which is connected to the Repeat timing circuits of FIG. 19. Referring momentarily to FIG. 19, the signal on conductor 18–21 is applied by way of conductor 19–10 to the SET terminal of the Repeat flip-flop 19–11. When this flip-flop is set a Repeat operation occurs on the next instruction, the type of repeat being specified by the R-designator of the Repeat instruction. As illustrated in FIG. 2c, bits $I^{11}$ and $I^{12}$ of the Repeat instruction form the Repeat designator, R. Bits $I^0$ through $I^9$ specify the Repeat Count, or in other words, the number of times that the following instruction is to be repeated.

The primary purpose of the Repeat mode of operation is to execute a given instruction more than once without having to include the instructions to be repeated more than once in a program of sequential instructions. This tends to keep the memory storage at a minimum.

When the R-designator is 00, the next instruction is repeated a number of times determined by the Repeat Count designator, RK, and is automatically terminated when this count is reached. Also, with the designator having this value, no advance is made in the address of the register being referenced. When the R-designator is 01, indicating a "terminated advance," the same instruction is repeated a predetermined number of times and the operand assumes successive address. When the R-designator is 10 or 11 the Repeat is not automatically terminated upon the completion of a predetermined number of steps, but continues until some external operation stops the computer and the Repeat flip-flops are cleared by a "Master Clear" signal.

Upon the completion of the "Housekeeping" sequence which calls the Repeat instruction from memory into the PCR-register, the computer performs an M to C transfer which causes bits 16 of the C-register to be set. The Repeat Instruction is programmed such that the F-designator (bits $I^{16}$ through $I^{18}$) is 111 (decimal 7). The execution of subcommand 16 causes a test to be made of the F-designator and then the contents of the particular register specified by the F-designator is transferred to the Z-register. An examination of FIG. 3 shows that when the F-designator is 111 the source for the data to be transferred is the lower ten bits of the program control register (PCR$_A$). In other words, the execution of subcommand 16 causes the Repeat Count RK to be transferred to the Z-register.

Upon the next M to C transfer bit 14 of the control register is set. The execution of this subcommand causes the complement of RK now in the Z-register to be transferred to the X-register.

The next subcommand to be performed in the sequence of the subcommands for effecting repeatable operation is subcommand 5 which is effective to set the Repeat conditions defined by the R-designator. The same signal which sets bit 5 of the C-register also sets the Repeat flip-flop 19–11. A logical "1" signal which appears on conductor 19–10 to set this last mentioned flip-flop is also applied to an inverter 19–12, the output of which partially enables the gates 19–13, 19–14 and 19–15. The second input to this last mentioned series of gates comes from the translator associated with the PCR-register. This translator examines bits 11 and 12 of the PCR-register (R-designator) and depending upon the bit configuration thereof, produces a "0" signal on one of the conductors 19–16, 19–17 or 19–18. If the R-resignator is 00 it will be conductor 19–16 which has a logical "0" thereon so that only gate 19–13 will be fully enabled to output a "1" signal for setting the "Terminated No-Advance" flip-flop 19–19. Similarly, if the R-designator is 01 conductor 19–17 will have a "0" signal thereon so that gate 19–14 is fully enabled to set the flip-flop 19–20. This last mentioned flip-flop is the "Terminated Advance" flip-flop, and when set, causes the next instruction to be repeated a predetermined number of times with the operand portion of the next instruction being advanced by unity upon each execution thereof. When the R-designator is 11, gate 19–15 is fully enabled and the flip-flop 19–21 is set. This is the "Non-Terminated Advance" flip-flop. When neither flip-flop 19–19, 19–20 nor 19–21 is set the repeat is a "Non-Terminated No Advance" type corresponding to an R-designator of 10.

The output from the "0" side of the flip-flop 19–19 and 19–20 are ORed together in NOR circuit 19–22. Hence, when either of these two flip-flops is set a "1" signal is applied to the $\overline{O}$ 19–22 causing it to output a "0" signal. This signal is applied as a first input to the gate 19–23. The second input to gate 19–23 comes from a gate associated with stage 9 of the PCR-register. When the lower ten bits of the PCR-register become all "1's," corresponding to a negative "0," a "0" output is obtained from this gate which passes to the gate 19–23 to fully enable it. The resulting output therefrom passes by way of the bus 19–24 to the CLEAR terminal of the Repeat mode flip-flops 19–19 through 19–21 to clear them to their "0" state. This terminates the Repeat operation. On the other hand, a Non-Terminated Repeat operation continues indefinitely until the machine is stopped and the Repeat flip-flops are cleared by the application of a "Master Clear" signal to the input line 19–25 which is connected by means of a bus 19–26 to the CLEAR terminals of all the flip-flops in FIGURE 19.

The output from the "0" side of flip-flops 19–20 and 19–21 are connected by means of the conductors 19–27 and 19–28 to the input terminals of $\overline{O}$ 19–29. Hence, if either one of these two flip-flops are set, a "1" signal is applied to $\overline{O}$ 19–21 causing it to output a "0" signal. This signal enables a timing chain (FIG. 20) which causes the count contained in the SAZ-register to be advanced by one. Whenever the R-designator specifies the Advance condition one or the other of flip-flops 19–20 and 19–21 will be set.

Once the repeat count RK has been placed in the lower ten bits of the PCR-register by the execution of subcommand 16 in the Repeat sequence, the $Z_A$ to PCR$_A$ transfer with its accompanying clear pulse must be blocked to prevent destruction of this count. Similarly, once the address portion of the instruction to be repeated has been transferred to the SAZ-register by the execution of subcommand 7 in the Repeat sequence, no new address is allowed in the SAZ-register. The flip-flop 19–30 provides the requisite inhibiting signals. More specifically, when the Repeat flip-flop 19–11 is set a logical "0" signal appears on conductor 19–31 to partially enable the $\overline{O}$ 19–32. The other input to this circuit comes by way of conductor 19–33 from the "1" side of bit 7 of the C-register. When bit $C_7$ is set, the transfer $Z_A$ to SAZ is effected. Hence, when the signal on conductor 19–33 is a logical "0" it is indicative of the fact that a first $Z_A$ to SAZ has occurred subsequent to the setting of the Repeat flop-flop, and the resulting output from gate 19–32 sets flip-flop 19–30.

When this last mentioned flip-flop is set a "0" signal appears on the conductor 19–34 and is applied as a first input signal to the gate 19–35. The second input to this gate comes from the "1" side of the Repeat flip-flop 19–11. Hence, it can be seen that gate 19–35 is fully enabled at this time and outputs a "1" signal which is applied to the input gates of the PCR-register associated with stages 0 through 9. Being a "1" signal these gates are inhibited. Subsequent to the inhibiting of the PCR$_A$ stages, the inverter 19–36 outputs a "1" signal to disable the $Z_A$ to SAZ data transfer. The time interval between the inhibiting of the PCR$_A$ gates and the SAZ gates is determined by the delay line 19–37 which is interposed between the output from flip-flop 19–30 and the input to inverter 19–36.

Figure 20:
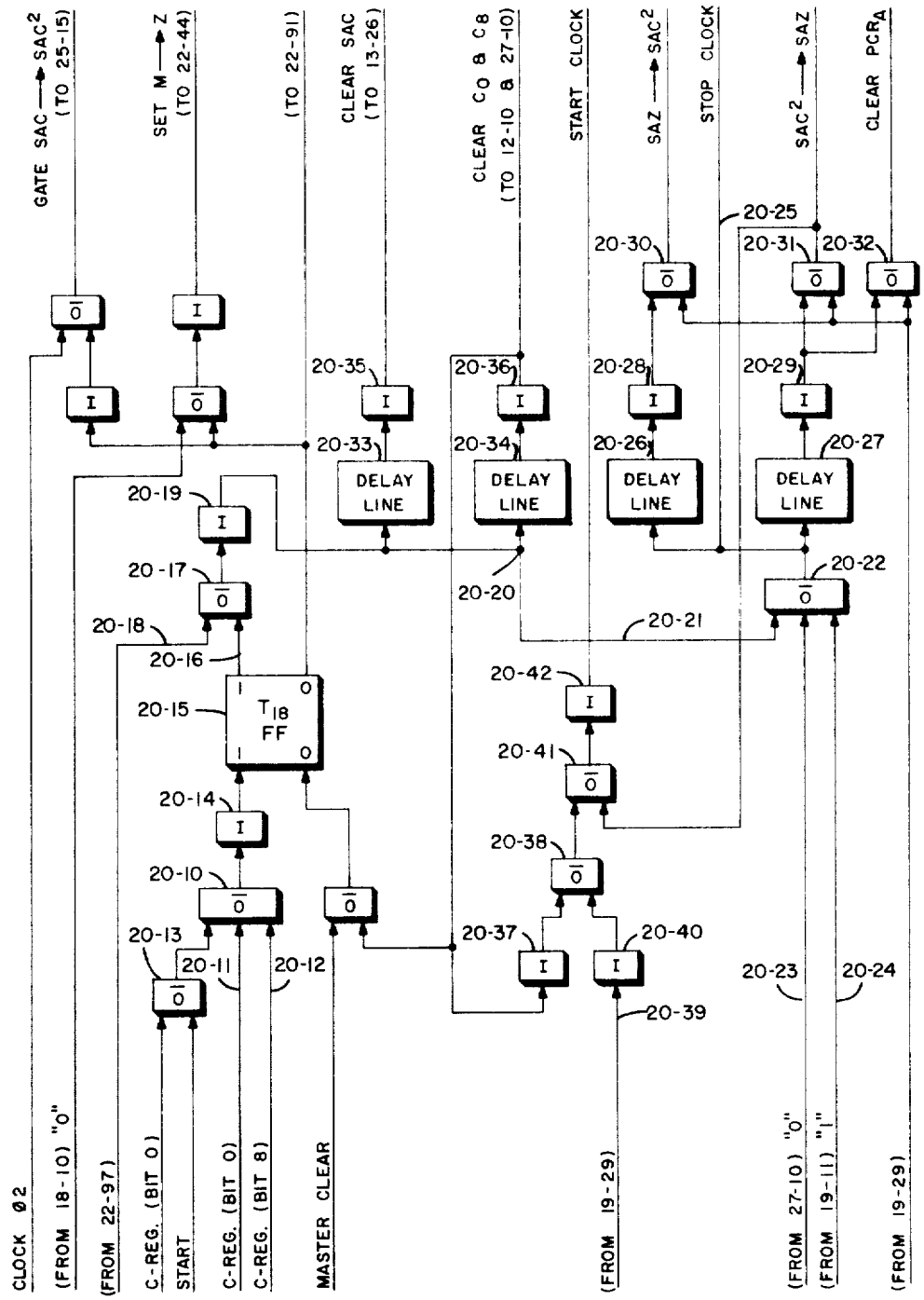
FIG. 20 illustrates the timing circuits for advancing the count in the $PCR_A$-register and the SAZ-register during the execution of the Repeat Instruction.

FIG. 20 illustrates these timing circuits employed to advance the count contained in the $PCR_A$ register and the SAZ-register during the execution of a Repeat instruction. As is shown in the legend of FIG. 4, when bit $C_5$ is set, the count contained in the PAZ-register is preserved by an inhibit signal which prevents it from counting. This, in return, prevents the referencing of any other but the next instruction, i.e., the one to be repeated. Also, the count contained in the $PCR_A$-register is advanced each time that subcommand "0" is executed. In other words, the Repeat Count is increased by one each time the instruction to be repeated is executed. However, it is only when one of the terminated modes of operation is called for by the R-Designator that the Repeat operation is terminated when the count in the $PCR_A$-register reaches a predetermined count.

The signals calling for the execution of the automatic housekeeping routine are ORed together in a $\bar{O}$ 20–10. That is, the signal which sets bit $C_0$ is applied by way of a first input line 20–11. The signal which sets bit $C_8$ is applied by way of conductor 20–12 to a second input of $\bar{O}$ 20–10. Finally the output of AND circuit 20–13 is connected at a third input. If either of the inputs to $\bar{O}$ 20–10 is a "1" signal it will output a "0" signal which will be inverted by circuit 20–14 so as to apply a "1" signal to the SET terminal of the Count Control flip-flop 20–15. The output from AND circuit 20–13 is a "1" signal when the computer is first turned on since a first input thereto comes from the Start Control circuit by way of conductor 20–16, and the other input thereto comes from the "1" side of stage 0 of the C-register which is set at this time.

The output from the "1" side of the Count Control flip-flop 20–15 is connected by way of conductor 20–16 to a first input terminal of AND circuit 20–17. The other input thereto comes by way of conductor 20–18 from the main timing circuit of FIG. 22 and momentarily carries a "0" signal whenever the count in the PCR-register or the SAZ-register is to be advanced. At this time, then, AND gate 20–17 outputs a "1" signal which is inverted by the inverter 20–19 so as to cause a "0" signal to appear at the junction 20–20. This "0" signal is applied by way of conductor 20–21 to a first input of AND gate 20–22. A second input to this last mentioned AND gate comes from the "0" side of stage $C_8$ so that if bit 8 is set, the gate is disabled. However, if bit 8 is cleared at the time in question, a "0" signal appears on the conductor 20–23 and does not disable gate 20–22. The third input to gate 20–22 comes from the "1" side of the Repeat flip-flop 19–11. It should be recalled that this flip-flop is set when the Repeat subcommand is executed. Assuming that the Repeat sequence is called for, a "0" signal appears on the conductor 20–24 to fully enable the gate 20–22 causing it to output a "1" signal. This "1" signal passes by way of conductor 20–25 to a control circuit which controls the operation of the main timing chain of FIG. 22. When conductor 20–25 carries a logical "1" signal the main timing chain is disabled thereby preventing the count contained in the PAZ-register from being advanced.

Additionally, the "1" output signal from gate 20–22 during the Repeat sequence passes through a pair of delay lines 20–26 and 20–27 and a pair of inverters 20–28 and 20–29 to a series of gates 20–30 through 20–32. A second input to this last mentioned series of gates comes from the $\bar{O}$ 19–29 which outputs a "0" signal whenever the R-designator calls for an advance. The "1" output from gate 20–30 is the signal which causes the count contained in the $PCR_A$-register to be incremented by one. The "1" output signal from gate 20–31 first of all passes directly to the CLEAR terminal of the SAZ-register flip-flops causing this register to be cleared. Also, the output from gate 20–31 passes through certain control circuits for allowing the count contained in the SAZ-register to be advanced. It may be recalled from the introductory description of this circuit operation that an Advance takes place by gating the contents of the register to be incremented through the second rank of the SAC-register and then gating the contents of the $SAC^2$-register back down through the incrementing circuit to the register from which the count to be advanced was originally taken. The output from gate 20–32 is applied to the CLEAR terminal of stage 0 through 9 of the PCR-register and is effective to clear out the stages when the conditions for gate 20–32 are satisfied. The delay lines 20–26 and 20–27 are included to insure that these operations take place in the appropriate order.

The "0" signal which appears at the junction 20–20 during the Repeat sequence also passes through the delay lines 20–33 and 20–34 to the inverters 20–35 and 20–36. The output from inverter 20–35 is used to set stage $C_1$ so that the subcommand $Z_A$ to SAC can be executed. The output from inverter 20–36 is used to clear bits 0 and 8 of the C-register so that normal operation of the machine may resume and is also used to clear the flip-flop 20–15.

The logical "1" output signal from inverter 20–36 is also employed to reinitiate the main timing chain circuits. More specifically, the output from this inverter is applied to inverter 20–37 and the resulting "0" output thereof is applied to a first input terminal of a gate 20–38. A second input to this gate comes from the $\bar{O}$ 19–29 by way of conductor 20–39. It may be recalled that the gate 19–29 outputs a "0" signal whenever the R-designator is such as to indicate address advancing. When no advance is to occur the signal on conductor 20–29 is a logical "1." This signal is inverted by circuit 20–40 and applied to the second input terminal of gate 20–38. This last mentioned gate is thereby fully enabled providing a "1" signal to circuit 20–21. The output from this circuit is again inverted by $\bar{O}$ 20–42 and the resulting output is employed to restart the timing chain illustrated in FIG. 22.

Thus, it can be seen how the circuitry of FIGS. 19 and 20 can be employed to cause an instruction to be repeated either a certain number of times or indefinitely on a single address or on successive address.

$M_{PAZ}$ to $Z$

Figure 21:
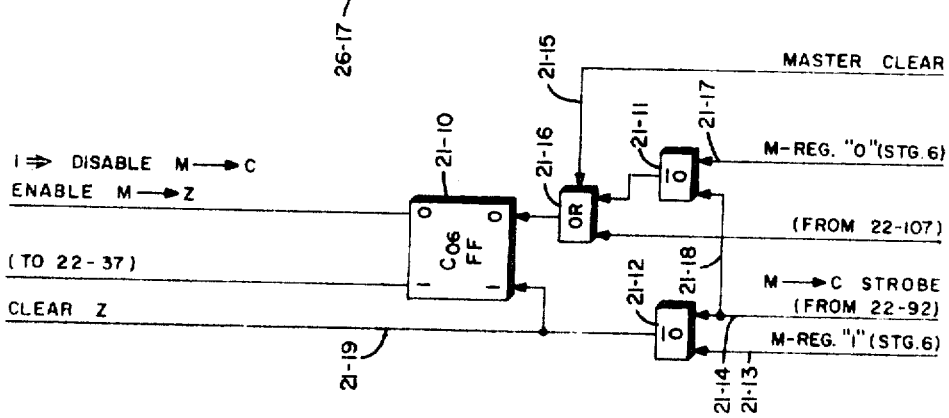
FIG. 21 shows in block diagram form the circuits for implementing stage 6 of the C-register.
Figure 22A:
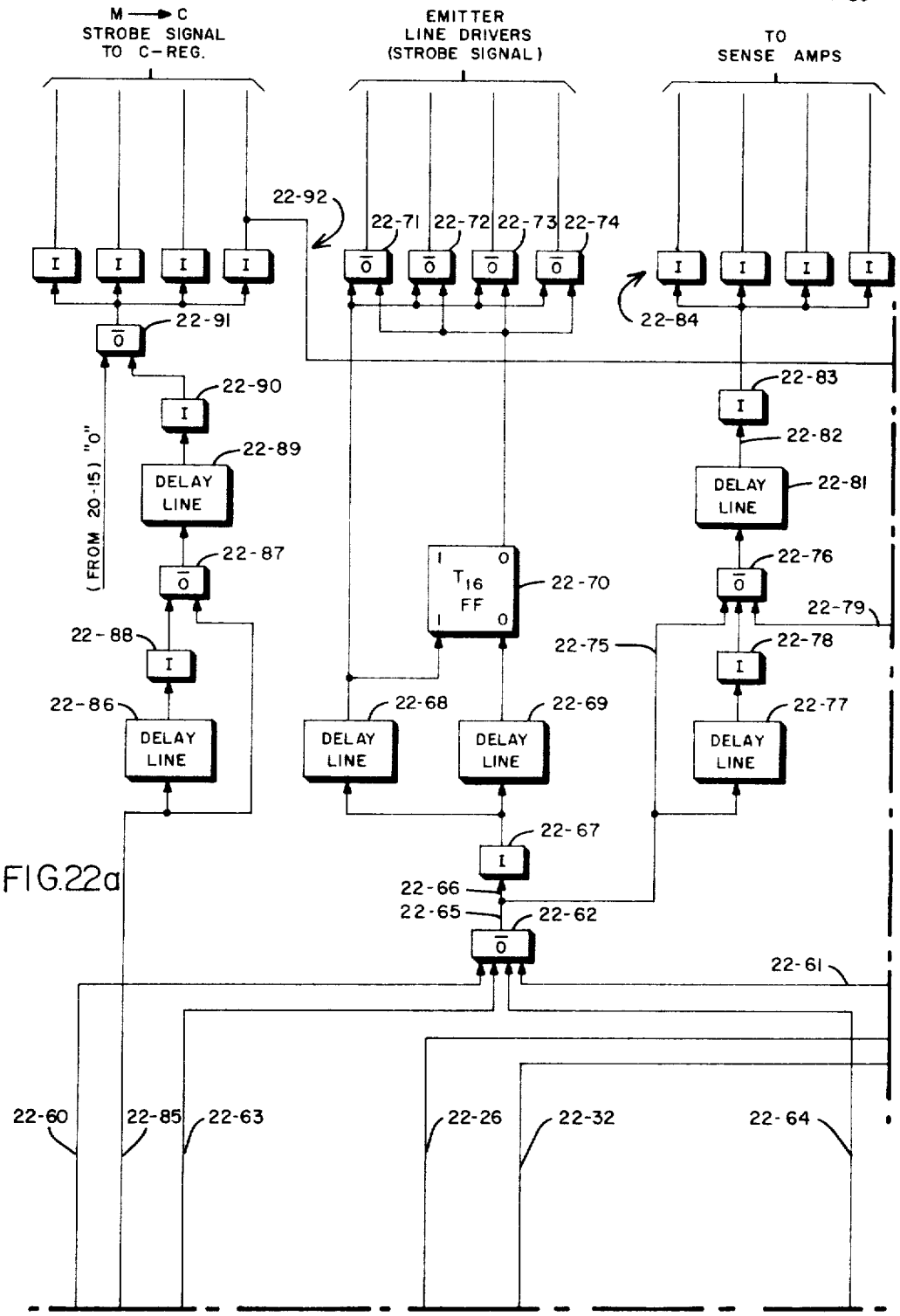
Figure 22B:
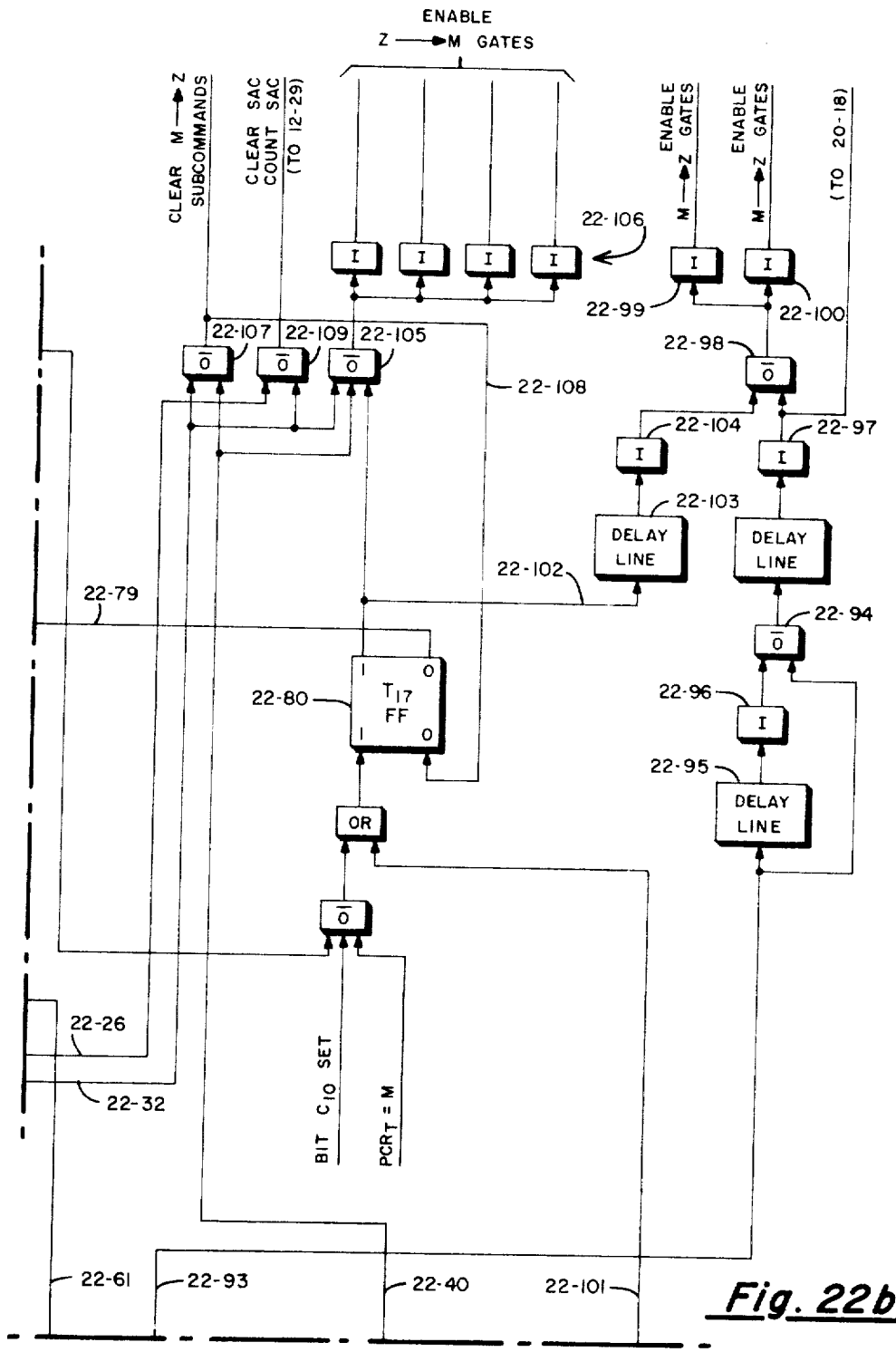
Figure 22C:
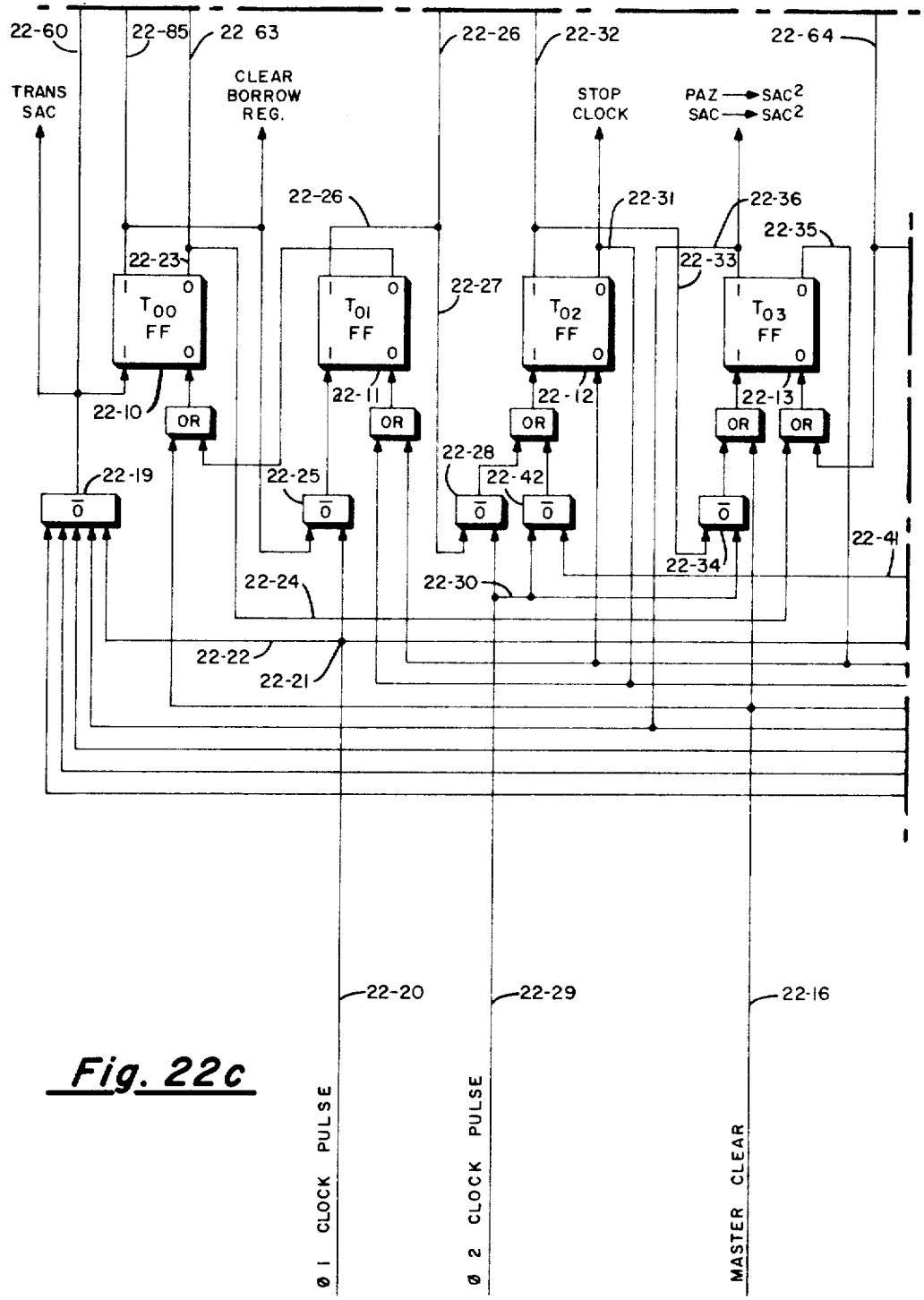
Figure 22D:
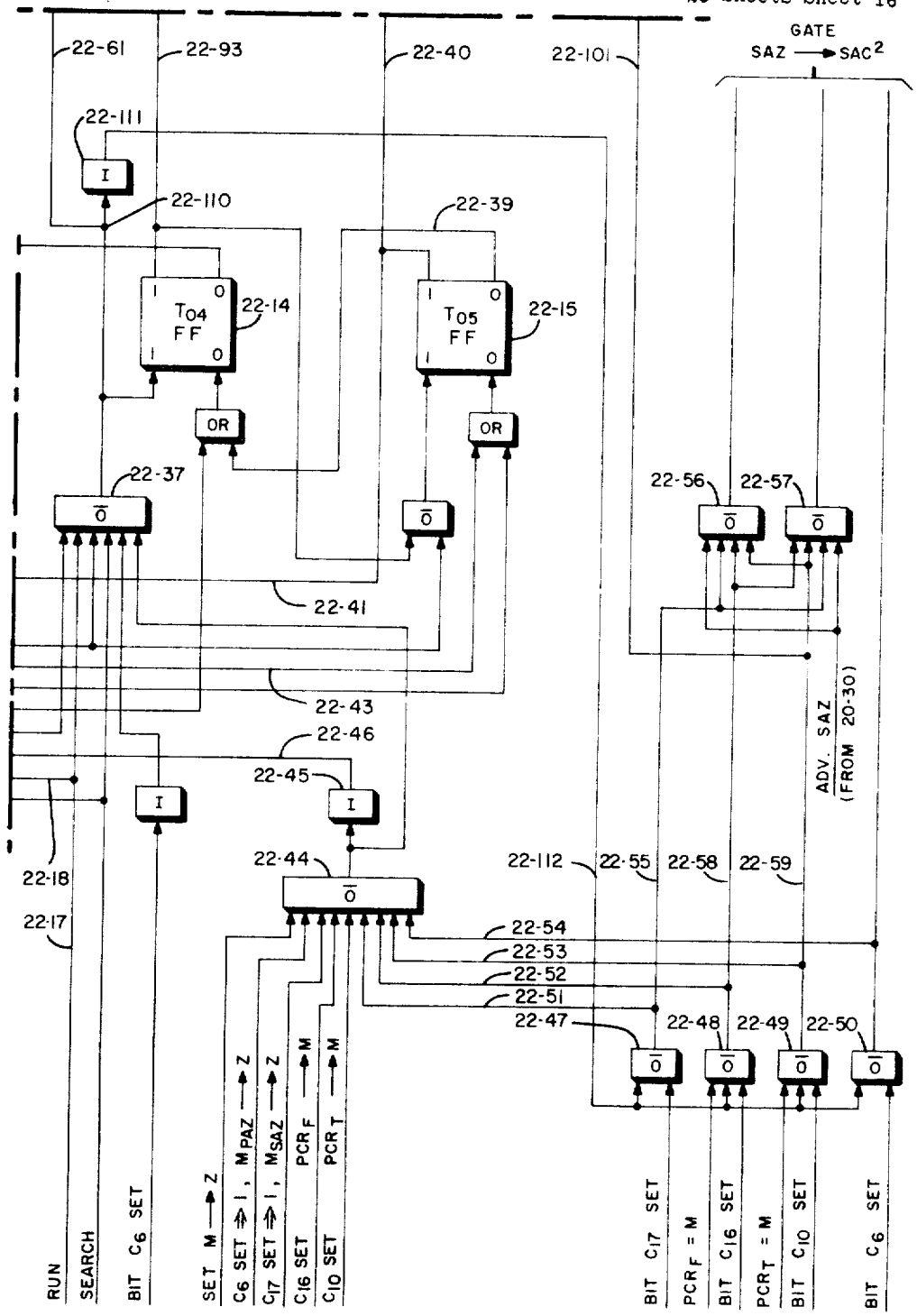

The next subcommand to be considered is subcommand 6. As can be seen from FIG. 4, this subcommand causes a word stored in the memory at an address specified by the contents of the PAZ-register to be read out into the Z-register. Following this operation the count contained in the PAZ-register is automatically advanced by one. FIG. 21 shows stage 6 of the C-register. Stage 6 includes a flip-flop 21–10 along with a pair of gates 21–11 and 21–12 used for controlling the clearing and setting of this flip-flop, respectively. If at the time during the memory cycle that the M to C strobe pulse occurs stage 6 of the memory output register is set, a "0" signal appears on both the conductors 21–13 and 21–14 to fully enable gate 21–12. Hence, this gate outputs a "1" signal which is applied to the SET terminal of the flip-flop 21–10.

Once the flip-flop 21–10 is set it may be cleared by any one of three signals. The first of these signals comes by way of a conductor 21–15 from a Master Clear circuit and passes through the OR circuit 21–16 to the CLEAR terminal of flip-flop 21–10. Secondly, the flip-flop will be cleared if at the time the M to C strobe pulse occurs, bit 6 of the memory output register is also cleared. Under these conditions, "0" signals appear on both conductors 21–17 and 21–18 so that the gate 21–11 is fully enabled. A "1" signal then passes by way of OR circuit 21–16 to the CLEAR terminal of the flip-flop.

A third input to the OR circuit 21–16 comes from $\bar{O}$ circuit 22–107 in the main memory timing circuits of FIG. 22 and this signal is a logical "1" whenever a M to C subcommand is to be cleared. In addition to setting the flip-flop 21–10 the output from $\overline{0}$ 21–12 also passes by way of a conductor 21–19 and through suitable circuitry to the CLEAR terminals of all of the stages of the Z-register. The signal on conductor 21–19 therefore clears out the previous contents of the Z-register such that the new information to be read out from the memory can be stored therein without confusion with the previous contents.

Main timing chain

FIGS. 22a through 22d, when arranged as shown in FIG. 23, illustrate the main memory timing chain of the preferred embodiment of the present invention. The heart of this timing chain consists of the six flip-flops 22–10 through 22–15. This timing chain is driven by a two-phase clock which supplies underlapped positive going pulses to the timing chain. Since various circuits are available for supplying the desired type of clock pulse, it is felt to be unnecessary to describe a particular circuit in detail. The flip-flops 20–10 through 22–15 change these two phase underlapped positive going clock pulses to four phase overlapped pulses when the machine is running. The timing chain of the present invention operates in the following manner.

When the machine is stopped and the Master Clear button is depressed, a "1" signal appears on the conductor 22–16 which sets the flip-flop 22–13 to its "1" state. When the Run button is depressed by the operator a "0" signal is applied by way of conductor 22–17 and 22–18 to the AND gate 22–19. At the time in the cycle when the output from the two-phase clock goes positive at the time $\phi1$ a "0" signal appears on the conductor 22–20 and is applied to the junction 22–21. From here the "1" signal passes over conductor 22–22 to another input of the gate 22–19 to fully enable it, causing it to output a "1" signal which sets the flip-flop 22–10. The output from the "0" side of this flip-flop becomes a "1" signal at this time and passes by way of the conductors 22–23 and 22–24 to the CLEAR terminal of the flip-flop 22–13 to again clear this flip-flop to its "0" state. The output from the "1" side of the flip-flop 22–10 is ANDed together with the "1" output from the clock at the gate 22–25. The "1" output thereof appearing at this time is used to set the flip-flop 22–11 to its "1" state.

The next step in the timing chain depends upon clock pulse $\phi2$. The logical "0" output from the "1" side of the flip-flop 22–11 is applied by way of conductors 22–26 and 22–27 to a first input of gate 22–28. At $\phi2$ time, a logical "0" signal appears on the conductor 22–29 and passes by way of the conductor 22–30 to the second input of gate 22–28. Gate 22–28 is therefore fully enabled and outputs a "1" signal to the SET terminal of the flip-flip 22–12. When this flip-flop is set, its "0" side outputs a "1" signal which passes by way of the conductor 22–31 to again clear the flip-flop 22–11.

The "0" output from the "1" side of flip-flop 22–12 passes by way of conductors 22–32 and 22–33 to a first input of gate 22–34. The $\phi2$ clock signal appearing on conductor 22–29 passes along the conductor 22–30 to a second input terminal of this last mentioned gate. Hence, the gate becomes fully enabled to output a "1" signal for setting flip-flop 22–13. As before, the logical "1" output signal from the "0" side of this flip-flop is used to again clear the flip-flop 22–12 after the flip-flop 22–13 is set. This "1" signal passes by way of the conductor 22–35.

FIG. 23 illustrates the waveforms produced by the timing chain flip-flops 22–10 through 22–13. It should be noted it is not necessary that all four of the timing chain flip-flops be set for the same length of time since the flip-flops 22–11 and 22–13 are dependent upon the clock frequencies employed.

Flip-flop 22–10 and 22–11 are set during the first two timing periods whenever the machine is doing a M to C memory reference. Whenever the machine is to make a M to Z reference, the flip-flops 22–14 and 22–15 are set during the first two timing periods. The setting and clearing of flip-flops 22–14 and 22–15 is similar to that previously described in connection with flip-flops 22–10 and 22–11. That is, the output from the "1" side of flip-flop 22–13, appearing when the Master Clear signal on conductor 22–16 is set, passes by way of the conductor 22–36 to fully enable the gate 22–37 when a M to Z reference is called for. The output from this gate sets flip-flop 22–14 and the output from the "0" side thereof passes by way of conductor 22–38 to clear out flip-flop 22–13. The "0" output from the "1" side of flip-flop 22–14 is ANDed together with a $\phi1$ signal to set the flip-flop 22–15. As before, the output from the "0" side of this last mentioned flip-flop passes by way of conductor 22–39 to clear flip-flop 22–14. The output from the "1" side of the flip-flop 22–15 passes by way of conductors 22–40 and 22–41 to a first input of a gate 22–42, the output of which is connected to the SET terminal of flip-flop 22–12. The other input to this last-mentioned gate comes from the two phase clock and at time $\phi2$ following the setting of flip-flop 22–15, the gate 22–42 is fully enabled. When flip-flop 22–12 is set the "1" signal appearing at the output of its "1" side passes along the conductor 22–31 and 22–43 to again clear flip-flop 22–15.

The circuit which determines whether or not a M to C or M to Z reference is to be made is the $\overline{0}$ 22–34. This circuit ORs together all conditions requiring the M to Z reference. If the OR condition is satisfied, the "0" output therefrom enables the gate 22–37 which causes the flip-flop to be set. The "0" output from the $\overline{0}$ 22–34 is complemented by the inverter 22–45 and the resulting "1" output therefrom appearing on conductor 22–46 serves to disable the gate 22–19, preventing the flip-flop 22–10 from being set. If none of the OR conditions for circuit 22–44 are present, this circuit outputs a "1" signal which inhibits the gate 22–37 and the inverted output appearing on conductor 22–46 enables the gate 22–19 allowing the M to C string to run.

The conditions for which the output of gate 22–44 is a "0" for initiating the M to Z string of the timing chain are marked on the input lines for this gate. Other inputs to the gate come from the output of gates 22–47, through 22–50 by way of conductors 22–51 through 22–54, respectively. The gate 22–47 outputs a logical "1" signal for initiating the M to C string whenever bit 17 of the memory output register is set at the memory strobe time. The gate 22–48 ANDs together the M to C strobe signal, bit 16 of the memory output register and the translation of the F-designator of the instruction word. Similarly, the gate 22–50 outputs a "1" signal when bit 6 of the memory output register is set at the memory strobe time. When the F-designator is such as to indicate the source of a word to be the memory, this gate is satisfied and outputs a "1" signal. In a similar manner, the gate 22–49 ANDs together the M to C strobe signal, the output from the "1" side of bit 10 of the memory output register, and the translation of the T-designator. When the T-designator is such as to indicate that the destination is to be the memory, gate 22–49 is fully enabled and outputs a "1" signal for initiating the M to Z string.

Because the control word to be placed in the C-register is first stored in the memory output register before it is actually transmitted to the C-register, the output signal from the gates 22–47 through 22–50 serve to initiate the M to Z timing chain, but in the meantime the contents of the memory output register is actually transferred to the control register thereby holding or maintaining the M to Z portion of the timing change operative. After the proper bit in the C-register is set, the inputs to the gates 22–47 through 22–50 from the memory output register may be removed.

To control a read from memory, the timing chain must provide the following signals:

(1) Address register (SAC, PAC, SAZ) to translator (SAC²) gate pulse.

(2) Initiate emitter line strobe signal.
(3) Sense amplifiers strobe signal.
(4) M to Z or M to C gate pulse.

In addition to initiating the M to Z portion of the timing chain, a logical "1" output from one of the gates 22–47 through 22–49 results in the transmission of the contents of the SAZ-register to the SAC²-register, i.e., translator. More specifically, when gate 22–47 becomes fully enabled and outputs a "1" signal, it passes by way of a conductor 22–55 to one input terminal of both of the $\overline{O}$ 22–56 and 22–57. The resulting "0" output from these last mentioned circuits go through the gates associated with the SAC²-register, thereby permitting the transmission of the contents of the SAZ-register to the SAC²-register. The same thing happens when either gate 22–48 or 22–49 is fully enabled so as to output "1" signals on their respective output lines 22–58 and 22–59. In addition to acting as a translator the SAC²-register is employed during the count sequence to increment the contents of one of the registers, PAZ, SAZ, or SAC. When incrementing the count in the SAZ-register a "1" signal coming from the gate 20–30 of FIGURE 20 is applied to the $\overline{O}$ 22–56 and 22–57, allowing the contents of the SAZ-register to be transferred to the SAC²-register. Subsequent to this transmission, the circuit of FIGURE 20 gates the contents of the SAC²-register back to the SAZ-register and in doing so one is added to the count previously contained in the SAZ-register.

The "1" output signal from gate 22–50, in addition to initiating the M to Z timing chain, also provides the signal for gating the contents of the PAZ-register to the SAC²-register. The exact manner in which this function is carried out has been described in detail in connection with FIGURE 16.

When all of the inputs to $\overline{O}$ 22–44 are at the "0" level, indicating that the machine is not to do a M to Z reference, the inverter 22–45 outputs a "0" signal which fully enables gate 22–19. As previously described, this sets the flip-flops 22–10 and 22–11 (the M to C string). When the gate 22–19 outputs the "1" signal for setting flip-flop 22–10, this same signal is applied to the gate 25–15 in FIG. 25 causing the contents of the SAC-register to be transmitted to the translator. Hence, upon completion of the memory cycle, the word contained at the address as specified by the contents of the SAC-register will be read out from the memory.

When the SET signal from gate 22–19 or 22–37 appears, it is applied by way of conductor 22–60 or 22–61 to the input terminals of $\overline{O}$ 22–62. Hence, the output of this last mentioned circuit goes to the "0" level. Because of the inputs thereto from the "0" side of flip-flop 22–10 by way of conductor 22–63 and from the "0" side of flip-flop 22–14 by way of conductor 22–64, the output of $\overline{O}$ 22–62 will remain at its "0" level until these two flip-flops are cleared.

The "0" output from NOR circuit 22–62 is applied by way of conductors 22–65 and 22–66 to the input of an inverter 22–67. The resulting logical "1" output therefrom is applied in parallel to a pair of delay lines 22–68 and 22–69. The delay line 22–68 has a substantially shorter period than does delay line 22–69. Hence, the output from delay line 22–68 momentarily sets the flip-flop 22–70 to its "1" state. The signal which sets this flip-flop is also applied to a first terminal of a set of $\overline{O}$ 22–71 through 22–74. Once the flip-flop 22–70 is set, the "1" output from the "0" side thereof is applied to these circuits and holds them in the same condition. Subsequently, the pulse appearing at the output of the delay line 22–69 passes to the CLEAR terminal of flip-flop 22–70 and clears it to its "0" state. The "0" signals appearing at the output of $\overline{O}$ 22–71 through 22–74 when flip-flop 22–70 is set are used to activate the particular Emitter Line Drivers (see FIGURES 9 and 10) as determined by the translation of the contents of one of the address registers. The difference in the delay periods between delay lines 22–68 and 22–69 is adjusted such that the word drive line signal is provided for a proper length of time.

The output from $\overline{O}$ 22–62 appearing on conductor 22–65 also is used to generate the signal for controlling the sense amplifiers associated with the memory for allowing the selected word to be read out from the memory and to pass to the memory output register. More specifically, when the output from $\overline{O}$ 22–62 changes from a "1" to a "0," the "0" signal appearing on conductor 22–65 passes immediately by way of conductor 22–75 to a first input terminal of gate 22–76. Because of the delay line 22–77 this same "0" signal is not immediately applied to the inverter 22–78 and, hence, the inverter is momentarily outputting a "0" signal to the gate 22–76. Providing then, that the memory strobe signal is not inhibited by the presence of a "1" signal on the conductor 22–79, coming from the "0" side of the Z to M control flip-flop 22–80, the gate 22–76 will be fully enabled and will output a "1" signal which passes through the delay line 22–81 and along a conductor 22–82 to the input of inverter 22–83. This inverter therefore outputs a "0" signal which is applied as an input to a series of inverters indicated generally by numeral 22–84. The output from these inverters is employed to strobe the sense amplifiers associated with the memory at the proper time in the readout cycle when the output from the storage elements are at a maximum.

After the time interval determined by delay line 22–77 has elapsed, the "0" signal appearing on conductor 22–65 is applied to the inverter 22–78 causing a "1" signal to be applied to the gate 22–76. This "1" signal serves to disable the gate and remove the strobe pulse from the sense amplifiers.

Assuming that the condition appearing at the input terminals of gates 22–44 are such that a M to C reference is called for, at the time that the flip-flop 22–10 is set a "0" signal appears on the conductor 22–85 and is applied first to a delay line 22–86, and secondly to a gate 22–87. The gate 22–87 is fully enabled for the time period determined by the delay line 22–86, but when this period has ended a "0" which had been passing through the delay line is inverted by inverter 22–88 whose output disables the gate 22–87. During the interval that the gate is fully enabled, it outputs a "1" signal which is delayed by delay line 22–89 before it is applied to an inverter 22–90. The output from inverter 22–90 is applied to a first terminal gate 22–91. The second input thereto comes from the "0" side of flip-flop 20–15. Provided that this flip-flop is cleared, as it is when a M to C reference is to take place, gate 22–91 is fully enabled and outputs a "1" signal. This "1" signal is inverted by the series of inverters indicated generally by numeral 22–92. The output signals from these inverters are the M to C strobe signals. These signals are applied to the gates connected to the individual stages of the C-register for controlling the transmission of the contents of the memory output register to the C-register.

If one of the inputs to the $\overline{O}$ 22–44 is a "1" signal, gate 22–37 rather than gate 22–19 will be fully enabled. Hence, flip-flop 22–14 will be set. This selects the M to C string of the memory timing chain. Once flip-flop 22–14 is set, a "0" signal appears on its output conductor 22–93 and is applied to a first input terminal of a gate 22–94 and also to the input of a delay line 22–95. Because of the effect of the delay line 22–95 and the inverter 22–96, gate 22–94 will be fully enabled for a predetermined period of time determined by the circuit constants of the delay line 22–95. The resulting "1" output, which momentarily appears at the output of gate 22–94, is delayed by the delay line and applied to inverter 22–97.

Gate 22–98 will be fully enabled and will output a "1" signal to the input of inverters 22–99 and 22–100, provided that flip-flop 22–90 is not set. The resulting "0"

output signals from these gates go to gates at the input to the Z-register flip-flops and enable the transmission of the contents of the memory output register to the Z-register.

When bit $C_{10}$ is to be set and the T-designator of the instruction word in the PCR-register is of a value indicating that the destination of a word of data is to be the memory, the output from gate 22–49 appearing on conductor 22–59 passes along conductor 22–101 to set the Z to M flip-flop 22–80. As was indicated above, the setting of this flip-flop causes a "0" signal to appear at the output from the "0" side thereof. The signal passes by way of conductor 22–102 to the input of a delay line 22–103. The output of the delay line is connected through an inverter 22–104 to the inhibit terminal of the M to Z gate 22–98. This inhibiting signal prevents the M to Z data transfer. The output from the "0" side of the flip-flop 22–80 is a "1" signal at this time and passes by way of conductor 22–79 to disable the gate 22–76. This prevents the generation of the sense amplifiers strobe signals.

With the Z to M flip-flop 22–80 set, at the time in the cycle that both the flip-flops 22–15 and 22–12 are set, gate 22–105 is enabled to thereby output a "1" signal to the inverters indicated generally by the numeral 22–106. The outputs from these inverters go to the gates associated with the memory output register and enable them so that the contents of the Z-register may be transferred thereto.

At the time in the cycle that both flip-flops 22–12 and 22–15 are set the gate 22–107 outputs a "1" signal which passes to the CLEAR terminal of stages 6, 10, 16 and 17 of the C-register to clear out the M to Z subcommands. The output signal from this gate also passes by way of conductor 22–108 to clear the Z to M flip-flop 22–80.

At the time during the M to C transfer that both flip-flops 22–11 and 22–12 are set, a gate 22–109 becomes fully enabled and outputs a "1" signal which passes to the C-register for producing a control signal for clearing of the SAC-register. The output from gate 22–109 is also employed to initiate the Count SAC sequence so that the count contained in the SAC-register is incremented upon each M to C data transfer. This operation will be more fully explained when the circuits of FIG. 25 are considered.

Now that the circuit construction and operation of the main timing chain of the computer of this invention has been described, the explanation of the execution of subcommand 6 ($M_{PAZ} \rightarrow Z$) can now be completed with the aid of FIG. 16, which illustrates the timing circuits employed to advance the count contained in the PAZ-register each time a memory reference with respect to the address contained in the PAZ-register is performed.

As has already been mentioned, when bit 6 of the C-register is set, the $\overline{0}$ 22–44 outputs a "0" signal which is applied to one of the inputs of the gate 22–37. Provided that the other inputs to this gates are also "0's", it outputs a "1" signal for setting the M to Z string flip-flops 22–14 and 22–15. The output from this gate appearing at the junction 22–110 to which the conductor 22–61 is connected, is also applied through an inverter 22–111 and a conductor 22–112 to one input of each of the $\overline{0}$ 22–47 through 22–50. The signal appearing on conductor 22–112 is the M to C strobe signal referred to previously. Provided that bit 6 of the memory output register is set at this time, the gate 22–50 will be fully enabled and will output a logical "1" signal which passes by way of a conductor 16–9 to a first input of a $\overline{0}$ 16–15. The other input to the $\overline{0}$ 16–15 comes from the output of a gate 16–13. The $\overline{0}$ 16–13 also has two inputs. A first input to it comes from the "1" side of flip-flop 22–13 and carries a logical "0" signal whenever this flip-flop is set. The other input to $\overline{0}$ 16–13 comes from the output of a $\overline{0}$ 16–11 and carries a logical "0" signal whenever one of the inputs to it is a "1" signal. The inputs to $\overline{0}$ 16–11 come from the "0" side of bit 3 of the C-register (flip-flop 15–10) and the other input comes from the output flop 15–19. It can be seen then that when flip-flop 15–10 is set, the gate 16–11 outputs a "0" signal which is ANDed together with the output from the "1" side of flip-flop 22–13 in gate 16–13. By referring to the table of FIGURE 4, it can be seen that when bit 3 of the C-register is set, the subcommand "Advance PAZ" is performed. In other words, the same circuits that were employed to cause the count contained in the PAZ-register to be advanced are rendered operative during the execution of subcommand 6 so that upon each memory reference with respect to the PAZ-register, the count contained in this register is advanced by one to give the next sequential address. The logical "1" signal appearing on the conductor 16–9 forces the output from circuit 16–15 to the "0" level and this signal is applied first to one input of a gate 16–16. The output from $\overline{0}$ 16–15 is also applied through a delay line 16–17 and an inverter 16–18 to a second input of the gate 16–16. As has been shown before, this arrangement of a delay line and inverter causes the gate 16–16 to output a "1" signal for a period of time determined by the constants of the delay line 16–17. During the interval that the $\overline{0}$ 16–16 is outputting a "1" signal the inverter 16–20 is outputting a "0" signal. The "0" outputs from this inverter is applied to the gates associated with the SAC²-register and allows the passage of the contents of the PAZ-register to the SAC²-register.

A momentary logical "1" output from $\overline{0}$ 16–16 also passes by way of conductor 16–19 to a delay line 16–21. After a period of time fixed by the constants of the delay line 16–21 the inverter 16–22 outputs a "0" signal thereby causing the contents of the SAC²-register to be gated back down to the PAZ-register. In the process, one is added to the number contained in the SAC²-register. To do this, the output from the inverter 16–11, which is a "1" signal, is applied to the Clear terminal of the PAZ-register flip-flops to clear out the previous contents. This clearing operation is followed shortly by the transmission of the "0" outputs from the inverter 16–22 to the gates associated with the PAZ-register stages, which permit the passage of the contents of the SAC²-register thereto.

FIG. 25 illustrates the timing circuits employed for incrementing the SAC-register. It may be recalled that when subcommand 1 is executed and the SKIP conditions are met, it is necessary to advance the address in the SAC-register by one. As will be shown more fully hereinbelow, the address in the SAC-register is also incremented when subcommand 22 is executed, if there is no address contained in the EKR-register. Also, during the execution of subcommand 23, none of the JUMP keys are set and the address is incremented.

The state of flip-flop 25–10 controls the incrementing circuitry. As is illustrated, this flip-flop may be set by a "1" signal coming from $\overline{0}$ 14–21, from $\overline{0}$ 42–11, or from $\overline{0}$ 43–35. These last mentioned circuits output "1" signals for the three conditions set forth above. When this flip-flop is set the "1" signal appearing at the "0" side thereof is applied to a $\overline{0}$ circuit which outputs a signal for stopping the main memory timing chain.

The gate 25–11 ANDs the conditions that the clock is stopping on $\phi 2$ with the Advance SAC-register signal. If these conditions are satisfied a "1" signal is applied to the inverter 25–12 which forms a part of the short pulse generator. A delay line 25–13 controls the width of the pulse generated by $\overline{0}$ 25–14. The momentary "0" output from $\overline{0}$ 25–15 is applied to a set of gates connected to the input of the SAC²-register flip-flops allowing the contents of the SAC-register to be transmitted thereto. The "1" signal output from gate 25–14 is also delayed, inverted twice and used to drive the inverter 25–16 thereby transferring the contents of the SAC²-register, augmented by 1, back to the SAC-register. The delay line 25–17 controls the time between the transfer up and transfer down pulse. The logical "1" output signal from inverter 25–18 is applied to the "0" side of the SAC-register flip-flops and clears them prior to the receipt of the incremented address from the SAC²-register. Additionally, the "1" signal output from inverter 25–18 passes by way of the conductor 25–19 to the CLEAR terminal of the Advance SAC-Control flip-flop 25–10. The output from the inverter 25–10 is delayed by delay line 25–21 long enough for the Advance sequence to terminate and is used to restart the clock.

It may also be observed that the gate 25–15 has a second input which comes from gate 22–19. The output from gate 22–19 is a "1" signal during a normal memory reference with respect to the SAC-register. The output from gate 25–15, therefore, initiates the Advance sequence during a normal memory reference. During a normal memory reference $\overline{0}$ 22–109 outputs a "1" signal which is inverted by circuit 25–22. The "0" output from this inverter is ANDed together with a signal from the "0" side of flip-flops 13–10 and 12–10 in the gate 25–23. Therefore when these two flip-flops are cleared at the time that the flip-flops 22–11 and 22–12 of the memory timing chain are set, $\overline{0}$ 25–23 will be fully enabled and will apply a "1" signal to $\overline{0}$ 25–16. The output from this last mentioned circuit gates SAC² back to the SAC-register.

$Z_A$ to SAZ

In FIG. 26 there is illustrated a circuitry employed to implement subcommand 7, $Z_A$ to SAZ. This subcommand effects a transfer of the address portion, i.e., the lower ten bits of the Z-register to the SAZ-register. In order to set the flip-flop comprising stage 7 of the C-register, i.e., flip-flop 26–10, it is necessary that the gate 26–11 be fully enabled. Gate 26–11 has two inputs. The first input comes from the "1" side of stage 7 of the memory output register and the other comes from the output of inverters 22–92 and is the M to C strobe signal. If stage 7 of the memory output register is set at the time that the strobe signal occurs, gate 26–11 outputs a "1" signal which passes by way of conductor 26–12 and 26–13 to set the flip-flop 26–10. The logical "1" output signal on conductor 26–12 also passes by way of conductor 26–14 to a first input of the $\overline{0}$ 26–15, causing it to output a "0" signal to a first input of the gate 26–16. The second input to this last mentioned gate comes from the circuit 19–36 which, when the machine is operating in the Repeat mode, carries a "1" signal after the first memory reference so as to inhibit the subsequent clearing of the SAZ-register. Assuming that the machine is not operating in a Repeat mode, this signal appearing on conductor 26–17 is a "0" signal such that the gate 26–16 is fully enabled. The gate therefore outputs a "1" signal which passes to the CLEAR terminal of each stage of the SAZ-register effecting a clearing out of the previous contents thereof. The signal appearing on conductor 26–12 which serves to set the flip-flop 26–10 also is applied to a $\overline{0}$ 26–18. Being a "1" signal, $\overline{0}$ 26–18 outputs a "0" signal which is applied to the gates associated with the SAZ-register and permits the transfer of the lower ten bits of he Z-register ($Z_A$) to the SAZ-register. After the flip-flop 26–10 is set, the logical "1" output appearing at the '0" side thereof on conductor 26–19 serves to maintain he output of circuit 26–18 at its "0" level.

The "0" output appearing at the "1" side of a flip-flop 26–10 when it is set is applied by way of conductor 26–20 o the gate 19–32. It may be recalled when the details of FIG. 19 were discussed, when the gate 19–32 is fully enabled the flip-flop 19–30 is set. The output from the one side of this flip-flop was then delayed and inverted and used to disable the $Z_A$ to SAZ data transfer after the irst reference with respect to this register has been made.

Clear SAC

FIG. 27 illustrates by means of a logical block diagram the circuitry of stage 8 of the C-register, which when set, effects a clearing of the contents of the SAC-register as well as the initiation of the automatic housekeeping sequence previously described in connection with the description of subcommand 0. As was the case with the other stages of the C-register, the flip-flop 27–10 will be set if stage 8 of the memory output register is also set at the time that the M to C strobe signal from circuit 22–92 occurs. Once the flip-flop 27–10 is set, it may be cleared in any one of three ways. First of all, a Master Clear signal applied by way of conductor 27–13 will pass through the OR circuit 27–14 to the Clear terminal of the flip-flop. Secondly, if stage 8 of the memory output register is cleared at the time the M to C strobe signal from circuit 22–92 occurs, the gate 27–15 will output a "1" signal which passes through the gate 27–14 to the CLEAR terminal of the flip-flop 27–10. Finally, if the signal on conductor 27–16 is a "1" signal, the flip-flop 27–10 will be cleared. The signal on this conductor comes from the inverter 20–36. It may be recalled that this inverter outputs a "1" signal during the Repeat sequence and is used to clear bits 0 and 8 of the C-register, so that normal operation of the machine may resume upon completion of the repeated cycle.

When stage 8 of the C-register is set, a "0" signal appears at the "1" side thereof. This signal is inverted by circuit 27–17. The "1" output signal from inverter 27–17 at this time is applied to the CLEAR terminal of stages 0 through 9 of the SAC-register and causes it to be reset.

The signal from gate 27–11 which is effective to set stage $C_8$ also passes by way of conductor 27–18 to the input of gate 20–10 by way of conductor 20–12. As was fully described in connection with FIG. 20, this input to gate 20–10 initiates the execution of the automatic "housekeeping" routine. It should be noted that the output from inverter 27–17 lasts for the duration of the cycle, thus differing from the logical clear associated with information transfers, which are only the width of the M to C strobe pulse.

A to Z

The contents of the accumulator register are transferred to the Z-register whenever bit 9 of the C-register is set. This is one of the two possible ways in which this data transfer may be effected. The other is when the F-designator of the instruction word specifies the source as being the accumulator during the execution of subcommand 16. In implementing subcommand 9 use was made of the circuitry associated with subcommand 16.

The flip-flop 28–10 comprising the stage 9 of the C-register is set when the gate 28–11 if fully enabled. This occurs whenever the memory output register is set at the time in the cycle that the M to C strobe signal from circuit 22–92 occurs. Once the flip-flop 28–10 is set, it may be cleared in any one of two ways. First of all, a Master Clear signal on the conductor 28–12 will pass through the OR circuit 28–13 to perform this function. Secondly, if gate 28–14 is fully enabled, it will produce a logical "1" output signal which will also pass through the OR circuit to clear flip-flop 28–10. The gate 28–14 becomes fully enabled provided stage 9 of the memory output register is cleared at the time that the M to C strobe signal occurs.

In order to fully understand the operation of the circuitry for implementing subcommand 9, it becomes necessary to examine the circuits associated with stage 16 of the C-register. These circuits are illustrated in FIG. 29. When stage 16 of the C-register is set, the transfer of information to the Z-register from any one of several sources in the machine is carried out. The flip-flop 29–10 is set in the usual manner. That is, if stage 16 of the memory output register is set at the time that the M to C strobe signal occurs, a gate (29–11) is enabled and outputs a signal which sets the flip-flop. Similarly, once the flip-flop 29–10 is set, it may be cleared in any one of three ways. First, if stage 16 of the memory output register is in a cleared condition at the time that the M to C strobe signal occurs, the gate 29–12 is fully enabled and outputs a "1" signal which passes through the OR gate 29–13 to clear the flip-flop. Finally, a Master Clear signal on the conductor 29–14 will also pass through the OR gate 29–13 to clear the flip-flop.

The "1" signal which is used to set the stage 16 flip-flop also passes by way of conductor 29–15 to one of the inputs of $\overline{O}$ 29–16. With a "1" signal applied thereto, this circuit will output a "0" signal to the inverters 29–17 and 29–18. This causes their output to be forced to the "1" level and these 1 signals are applied to the Clear terminal of each stage of the Z-register to clear out the contents thereof prior to a receipt of new information.

$\overline{O}$ 29–16 also outputs a "0" signal when a Master Clear signal is present on conductor 21–19 and when circuit 21–12 is outputting a "1" signal. It may be recalled that circuit 21–12 outputs a "1" signal whenever subcommand 6 is initiated for selecting a word in the high speed memory at the address specified by the contents of the PAZ-register. As will be described more fully later on, the $\overline{O}$ 29–16 also has a logical "1" signal applied thereto when a signal is generated for setting bit 17 of the C-register for transferring the word specified by the contents of the SAZ-register from memory to the Z-register. This signal is applied to the $\overline{O}$ 29–16 by way of conductor 21–20.

Once the Z-register is cleared in the above described manner, it is ready to accept new information. The source of this information is determined by a translation of the F-designator of the instruction word. Referring momentarily to FIG. 3, it can be seen that when the F-designator equals 100, the source specified is the accumulator or A-register. With this combination of bits, a "0" signal appears on the conductor 29–21 and is applied to a first input terminal of gate 29–22. The other input to this gate comes from the "1" side of the flip-flop 29–10 and when this flip-flop is set, it carries a "0" signal. The gate 29–22 is therefore fully enabled, outputting a "1" signal to the $\overline{O}$ 29–23 and 29–24. Each of these circuits then outputs a "0" signal which enables the gates on the Z-register for allowing the transmission of the contents of the A-register to the Z-register.

This same gating function is achieved when bit 9 of the C-register is set. The "1" signal appearing at the output of flip-flop 28–10 is applied by way of conductor 29–25 to a second input of the $\overline{O}$ 29–23 and 29–24. The signal which was used to set the flip-flop 28–10 which was generated at the output of gate 28–11 passes by way of conductor 29–26 first to an input of $\overline{O}$ 29–16 to effect a clearing of the Z-register and secondly, to a third input terminal of the $\overline{O}$ 29–23 and 29–24. The effect of this "1" signal is therefore to first clear out the contents of the Z-register and to subsequently allow the transmission of the contents of the accumulator to the Z-register.

When the F-designator of the instruction word is 111, the translator associated with this register outputs a "0" signal on the conductor 29–27 to partially enable the gate 29–28. This gate is fully enabled when the bit 16 flip-flop 29–10 is set. Being fully enabled, it outputs a "1" signal which is inverted by circuit 29–29 to produce the gating signal for allowing the transmission of the contents of the lower 10 bits of the PCR-register (PCR$_A$) to the Z-register. The gates 29–30 and 29–31 are used in a similar manner to produce the required gating signals for allowing the transmission of the equality count register (EKR) and the search register (SR) to the memory communications register or Z-register.

If the F-designator is 001, the source for the word to be transferred to the Z-register is the high speed memory. Under this condition the translator outputs a "0" signal on conductor 29–32 which is applied to a first input of gate 29–33. The other input to this gate is from the "1" side of the flip-flop 29–10 and when this flip-flop is set, the gate 29–33 is fully enabled and outputs a "1" signal which is applied to $\overline{O}$ 22–44 in the memory timing chain. This gates the contents of the SAZ-register to the second rank of the SAC-register (SAC$^2$) and starts a normal memory reference with respect to the SAZ-register.

Z to PCR$_T$

In order to transfer a word of data stored in the Z-register to some other location in the machine, the flip-flop 30–10 must be set. In a manner similar to the operation occurring when subcommand 16 is executed, a portion of the instruction word contained in the PCR-register is translated to specify the particular destination for the word of data. When executing subcommand 10, however, it is the T-designator rather than the F-designator which is translated. It may be recalled that the T-designator occupies bit positions $I^{13}$, $I^{14}$ and $I^{15}$ of the instruction word contained in the PCR-register.

The flip-flop 30–10 is set at the M to C strobe time, provided that the stage 10 of the memory output register is also set. Under these conditions, the gate 30–11 is fully enabled and outputs a "1" signal to the SET terminal of flip-flop 30–10. When the flip-flop 30–10 is set, the output from the "1" side thereof is applied to the gates 30–12, 30–13 and 30–14 to partially enable them. If the T-designator is 100, the destination so specified is the accumulator and a logical "0" signal appears at the output of the translator and is applied by way of the conductor 30–15 to the other input terminal of the gate 30–12 and to an inverter 30–16. The resulting "1" signal from inverter 30–16 is applied to the "0" side of each stage of the accumulator and serves to clear out the previous contents prior to the receipt of a new data word. The logical "0" signal applied to the other input of gate 30–12 fully enables it, causing it to output a "1" signal to the inverters 30–17 and 30–18. The resulting "0" outputs from these two inverters are applied to the gates associated with stages 0 through 23 of the A-register and permit the transmission of the contents of the Z-register thereto.

When the T-designator is 011 (decimal 3) the translator associated with the PCR-register causes a "0" signal to be applied to the conductor 30–19. This "0" signal is applied to an inverter 30–20 and the output therefrom is used to clear out the previous contents of the X-register. The logical "0" signal on conductor 30–19 is ANDed together with the "0" output from the "1" side of flip-flop 30–10 in the gate 30–13 and the resulting "1" signal is applied to a circuit associated with subcommand 13 for gating the contents of the Z-register to the X-register. The exact manner in which this gating function is performed will be explained more fully hereinbelow when the details of subcommand 13 are explained.

If the T-designator is 001, the information contained in the Z-register is stored in the particular memory location whose address is given by the contents of the SAZ-register. In this case the C-register is by-passed in order to get the address into the translator sooner. The signal from the memory, the translation of PCR, and the M to C strobe signals are "ANDed" together to generate the strobe for transferring the contents of the SAZ-register to the SAC$^2$-register. More specifically, with a T-designator equal to 001, a "0" signal is applied by way of conductor 30–21 to the second input terminal of gate 30–14. When the flip-flop 30–10 is set, this gate is fully enabled and outputs a "1" signal, which is applied to the $\overline{O}$ 22–44 of the main memory timing chain. The effect of this signal is to cause circuit 22–44 to output a "0" signal for enabling the Z to M string of the timing chain and for disabling the M to Z string. This operation has already been described in connection with the discussion of the operation of the timing chain of FIG. 22.

The "0" output appearing on the conductor 30–22 is used for writing a word of data into the search memory. The manner in which this is accomplished will be described more fully hereinbelow when the search memory timing chain of FIG. 41 is described in detail.

Once the flip-flop 30–10 is set, there are four ways in which it can be reset or cleared to its "0" state. The first is by way of a Master Clear signal on the conductor 30–23, which passes through the OR circuit 30–24 to the Clear terminal of flip-flop 30–10. Secondly, if the memory output register stage 10 is cleared at the time that the M to C strobe signal occurs, the gate 30–25 will be fully enabled and will output a "1" signal which also passes through the OR circuit 30–24 to the CLEAR terminal of flip-flop 30–10. The flip-flop is also cleared upon the completion of a Z to M memory reference when the output from $\bar{O}$ 22–107 outputs a "1" signal. This signal is applied to the OR gate 30–24 by way of conductor 30–26. Finally, upon the completion of a search-write operation, a "1" signal is applied by way of the output from a gate in the search/write timing chain to the conductor 19–27. This signal passes through the OR circuit 19–24 to clear stage 10 of the C-register.

Z to PCR

Figure 31:
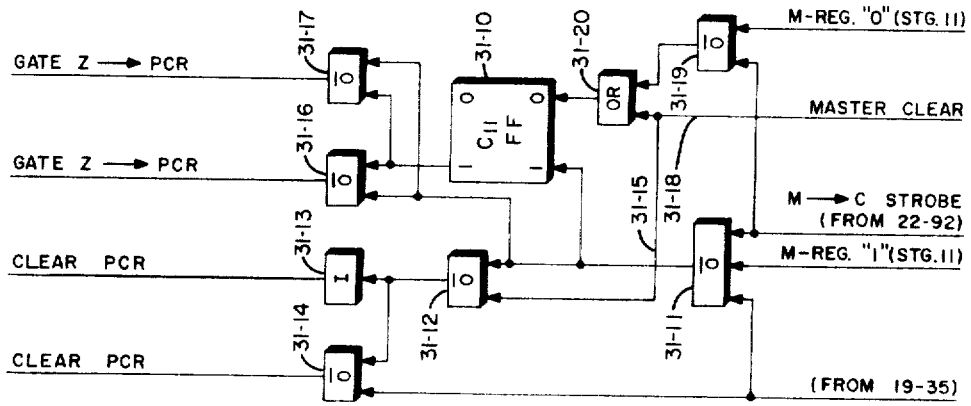
Figure 30:
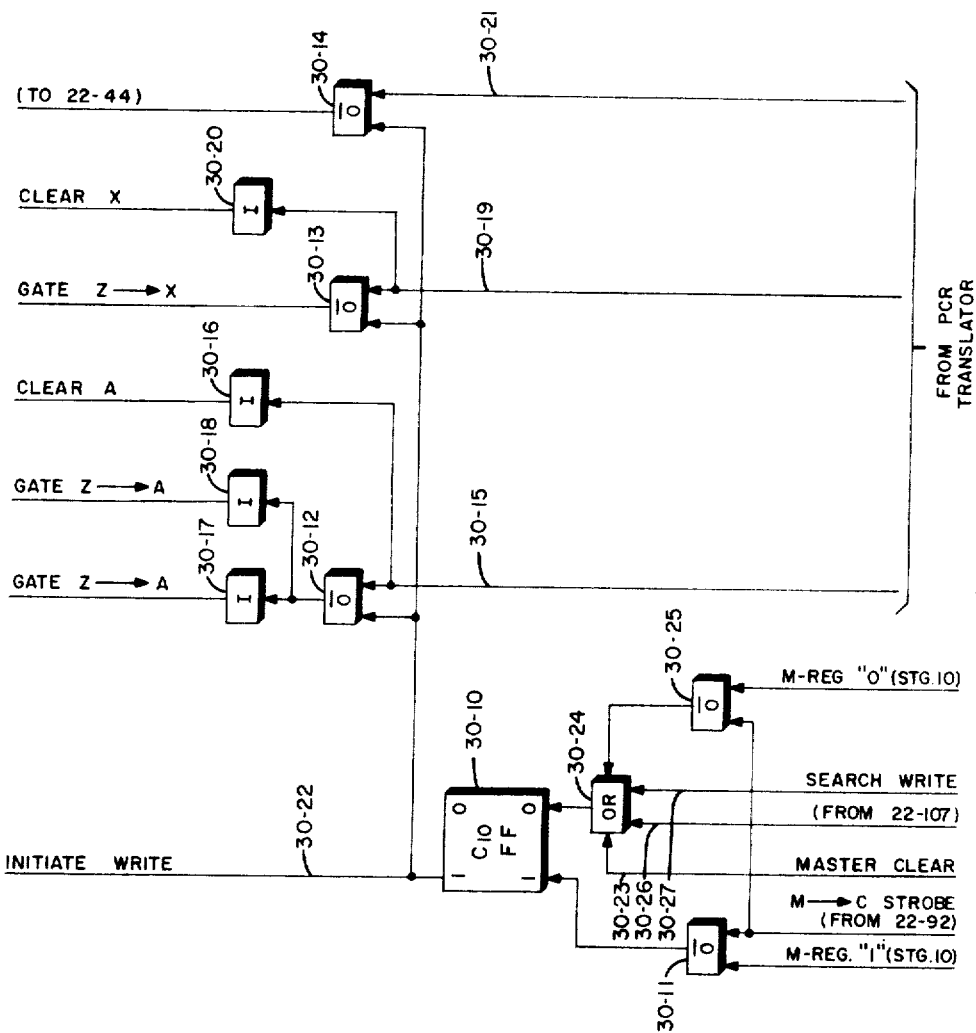

The circuitry of the C-register for implementing subcommand 11 is illustrated in FIG. 31. It may be recalled that subcommand 11, when executed, causes a word contained in the Z-register to be transferred in a parallel mode to the PCR-register. Stage 11 of the C-register is comprised of a flip-flop 31–10 and a plurality of $\bar{O}$ circuits which act as gates and inverters for performing various functions. In order to set this flip-flop, the gate 31–11 must be fully enabled. This gate has three inputs. The first set of inputs are the conventional ones, i.e., those coming from the M to C strobe source and the output from the set side of stage 11 of the memory output register. Unlike the other stages of the C-register, the gate 31–11 has a third input. This input is received from circuit 19–35 of the Repeat timing circuits of FIG. 19. When the machine is operating in the Repeat mode, this signal disables the gate to thereby inhibit the Clear PCR$_A$ and the Z$_A$ to PCR$_A$ steps. When not operating in a Repeat mode, however, the signal from circuit 19–35 is a logical "0," allowing the gate 31–11 to become fully enabled for setting the flip-flop 31–10.

The signal which sets the flip-flop also passes to a first input of a $\bar{O}$ 31–12. The resulting "0" output therefrom is inverted by $\bar{O}$ 31–13 and 31–14 to provide a "1" signal for clearing the PCR-register. Since $\bar{O}$ 31–14 also has an input coming from $\bar{O}$ 19–35, a "1" signal will be generated at its output only if circuit 19–35 is not producing an inhibit signal. It should be noticed that $\bar{O}$'s 31–12, 31–13, and 31–14 are also employed to clear the PCR-register upon the generation of the Master Clear signal. The Master Clear signal is applied to the $\bar{O}$ 31–12 by way of conductor 31–15.

The output from gate 31–11, which was used to set the flip-flop 31–10 is also used to initiate the transfer of the contents of the Z-register to the PCR-register. This is accomplished by applying the logical "1" output signal from gate 31–11 to an input terminal of the inverters 31–16 and 31–17. While this enabling signal lasts only as long as the M to C strobe signal is present, it is maintained by the setting of the flip-flop 31–10. More specifically, the logical "1" signal appearing at the output from the "0" side of flip-flop 31–10 when it is set is applied to a second input terminal of the inverter 31–16 and 31–17. It can be seen that the gating function is initiated at the M to C strobe time, but is maintained by the setting of the flip-flop 31–10. The "0" outputs from inverters 31–16 and 31–17 are applied to the gates associated with the PCR-register for allowing the transmission of the contents of the Z-register therethrough.

Once the stage 11 flip-flop 31–10 is set, it may be cleared by either a Master Clear signal applied to conductor 31–18 or by the enabling of the gate 31–19. In each of these cases, a logical "1" signal passes through the OR circuit 31–20 to clear the flip-flop. As is true in the case of the other stages of the C-register, the gate 31–19 outputs a "1" signal provided the memory output register stage 11 is cleared at the time that the M to C strobe signal is generated.

$X_A$ to $PCR_A$

FIG. 32 illustrates a circuitry for implementing subcommand 12, Transmit $X_A$ to $PCR_A$. The flip-flop 32–10 is set provided that stage 12 of the memory output register is also set at the M to C strobe time. Again, this is by way of a gate 32–11 outputting a logical "1" signal under the assumed conditions. The signal which sets this flip-flop is also applied to the Clear terminals of stages 0 through 9 of the PCR-register to clear out the previous contents thereof, thus, preparing it for the receipt of a new set of address representing signals. The "1" output from gate 32–11 is also applied to an inverter 32–12. The resulting "0" output therefrom is applied to gates associated with stages 0 through 9 of the PCR-register and enables the transmission of the address portion or lower 10-bits of the X-register thereto. As before, the gating signal is initiated at the time that the gate 32–11 outputs a "1" signal, but is maintained by the setting of the flip-flop 32–10. This is due to the fact that the output from the "0" side of the flip-flop 32–10 is employed as an input to the inverter 32–12.

Once this flip-flop is set, it may be cleared by either a Master Clear signal or by a logical "1" output from the gate 32–13. Both of these conditions cause a "1" signal to pass through OR circuit 32–14 to the CLEAR terminal of the flip-flop. As before, the gate 32–13 becomes fully enabled provided that the memory output register is in its "0" state at the time that the M to C strobe signal occurs.

Z to X and $\bar{Z}$ to X

FIG. 33 illustrates the circuitry associated with stages 13 and 14 of the C-register. The reason for considering these two stages together is that they both are used to control the transmission of information from the Z-register to the X-register. When stage 13 of the C-register is set, there takes place a direct transmission of the word in the Z-register to the X-register. However, when it is stage 14 that is set it is the complement of the contents of the Z-register that is transmitted to the X-register. The flip-flop 33–10 controls the execution of subcommand 13. This flip-flop is set by way of the output from gate 33–11 which occurs when the memory output register stage 13 is set at the memory strobe time. The "1" signal which sets the flip-flop 33–10 is also applied to the first input terminal of NOR circuit 33–12 causing it to output a "0" signal to the inverter 33–13. The "1" signal appearing at the output of this inverter is applied to the CLEAR terminal of each of the stages of the X-register and causes this register to be cleared. The output from the gate 33–11 is also applied to the $\bar{O}$ 33–14 and $\bar{O}$ 33–15. Additionally, the second input for these last mentioned circuits comes from the "0" side of the flip-flop 33–10 to maintain one of the input terminals of the inverters at the "1" level upon the completion of the M to C strobe signal. The "0" signal appearing at the output terminals of $\bar{O}$ circuits 33–14 and 33–15 are applied to the gates on the X-register which allow the transmission of the contents of the Z-register thereto.

Once flip-flop 33–10 is set, it may be cleared by the output from the gate 33–16. This occurs if stage 13 of the memory output register is cleared at the time that the M to C strobe signal occurs. Flip-flop 33–10 may also be cleared upon the application of a Master Clear signal on the conductor 33–17. Both this Master Clear signal and the output from the gate 33–16 pass through the OR circuit 33–18 to the CLEAR terminal of flip-flop 33–10.

The flip-flop 33–19 controls the execution of subcommand 14. The output signal from gate 33–20 occurring when stage 14 of the memory output register is set at the time that the M to C strobe signal is applied passes by way of conductor 33–21 to set flip-flop 33–19 and by way of conductor 33–22 to an input terminal of the $\overline{O}$'s 33–12, 33–23 and 33–24. The "0" signal output from $\overline{O}$ 33–12 is inverted by circuit 33–13 and the resulting signal is used to clear the X-register prior to the receipt of the word from the Z-register. This operation is identical to that which occurs when the gate 33–11 outputs the signal to set the flip-flop 33–10 for subcommand 13.

$\overline{O}$ 33–23 and $\overline{O}$ 33–24 receive inputs from the gate 33–20 and from the "0" side of the flip-flop 33–19. When either of these signals is a "1" the $\overline{O}$ circuits output "0" signals for gating the complement of the contents of the Z-register to the X-register. Because the gates to which these enabling signals are applied had their other input coming from the "0" side of the Z-register flip-flops, it is the complement of the contents of the Z-register that is transmitted to the X-register.

The flip-flop 33–19 may be cleared in the same way that the flip-flop 33–10 is cleared. More specifically, a Master Clear signal on the conductor 33–17 will pass through the OR circuit 33–25 to the CLEAR terminal of flip-flop 33–19 or the output from the gate 33–26 will also perform the function. Master Clearing of the X-register is accomplished by means of a "1" signal applied to the conductor 33–26. This conductor is connected to another input of the $\overline{O}$ 33–12, which is the circuit for controlling the clearing of the X-register.

During the execution of subcommand 10 when the T-designator is equal to 011 the inverter 30–13 outputs a "1" signal which passes by way of conductor 33–28 to an input terminal of $\overline{O}$ 33–14 and 33–15. The resulting "0" output from these gates are enabling signals for the gates associated with the X-register to allow the transmission of the contents of the C-register to the X-register.

*Mask (X) with (Z)*

FIG. 34 illustrates the circuitry for implementing subcommand 15. The execution of this subcommand causes those bits of the X-register (X), corresponding to the bits of the Z-register containing a binary "1" signal to be cleared. In other words, this operation "masks" the information in the X-register with the contents of the Z-register. The X-register is not cleared as in a normal transfer from Z to X. Instead, certain bits in the X-register are selectively cleared. That is, only those bits in the X-register are cleared which correspond to the bits in the Z-register which contain binary "1's."

The output from gate 34–10 which occurs when bit 15 of the memory output register is set at the M to C strobe time is applied to the SET terminal of flip-flop 34–11. The output from gate 34–10 is also applied to an input terminal of each of the $\overline{O}$'s 34–12 and 34–13. The output from the "0" side of the flip-flop 34–11 when it is set is used to maintain the output from the $\overline{O}$ circuits 34–12 and 34–13 at the "0" level. The "0" signals are enabling signals for a set of gates associated with each stage of the X-register. The other input to these gates on the X-register comes from the "1" side of the Z-register flip-flops. As such, the output from this gate on the X-register will be a "1" signal only if the corresponding stage of the Z-register is set. This "1" signal is applied to the CLEAR terminal of the X-register so that the ultimate result is for those stages of the X-register corresponding to the stages in the Z-register containing a "1" signal, to be cleared.

Like the other stages of the C-register already described, the flip-flop 34–11 may be cleared either by a Master Clear signal applied to conductor 34–14 which passes through the OR circuit 34–15 or by a logical "1" output from the gate 34–16. The gate 34–16 produces a "1" output only if stage 15 of the memory output register is cleared at the time that the M to C strobe signal occurs.

*$M_{SAZ}$ to Z*

FIG. 35 illustrates by means of a logical block diagram the circuitry employed to carry out subcommand 17. Subcommand 17 is substantially like subcommand 6. Each of these subcommands selects a word in the high speed memory and transfers it to the Z-register. For subcommand 6, the memory location specified by the address in the PAZ-register is selected for subcommand 17, however, the address of the memory location to be referenced is specified by the contents of the SAZ-register.

The flip-flop 35–10 is set provided the memory output register is also set at the M to C strobe time. Under this condition, the gate 35–11 is fully enabled and outputs a "1" signal to set the flip-flop. Additionally, the output from gate 35–11 passes to $\overline{O}$ 29–16 to cause the contents of the Z-register to be cleared out in the manner already described.

The "1" signal, appearing at the output of the "0" side of the flip-flop 35–10 when it is set, is applied to the $\overline{O}$ 22–44 to disable the Z to M string of the timing chain and to enable the M to Z string of the timing chain. In order to reduce the time required for the address contained in the SAZ-register to reach the translator, the C-register is bypassed in the execution of this subcommand. The output from stage 17 of the memory output register is ANDed together with the M to C strobe signal in $\overline{O}$ 22–47 to turn on the gate pulse which shifts the contents of the SAZ-register to the SAC²-register. Once the address is in the SAC² register, the timing chain of FIGURE 22 continues to run causing the strobe signal for the Emitter Line Drivers to be generated by the circuits 22–71 through 22–74 and the sense amplifier to be turned on. Also, the inverters 22–99 and 22–100 produce enabling signals for allowing the transfer of the selected word in the memory output register to the Z-register.

Finally, the gate 22–107 outputs a logical "1" signal to clear the M to Z subcommand.

This clearing signal from gate 22–107 is applied by way of conductor 35–12 and through OR circuit 35–13 to the CLEAR terminal of the flip-flop 35–10. The flip-flop will also be cleared when the gate 35–14 is enabled. Also, a Master Clear signal on conductor 35–15 will pass through the OR circuit 35–13 to clear the flip-flop 35–10.

*Shift subcommand*

FIG. 36 illustrates the stage of the C-register which controls the execution of subcommand 18, the shift command. As was explained earlier in this specification, the computer of the invention utilizes a shift matrix. As such, when stage 18 of the C-register is set, the computer causes a word contained in the Z-register to be shifted a number of places determined by the shift count designator in the instruction word, the results being stored in the shift register. A shift matrix of the type employed herein is fully described in a copending application, Serial No. 118,096, which was filed June 19, 1961, and is assigned to the assignee of the present invention. Because the shift matrix is fully explained in that application it is felt to be unnecessary to explain in detail the operation of the shift matrix in the present application. It may be stated, however, that when bit 18 of the memory output register is set at the time that the M to C strobe signal is generated, the $\overline{O}$ 36–10 outputs a "1" signal which sets the flip-flop 36–11. The pulse which sets this flip-flop also passes to the timing circuit associated with the shift matrix to initiate the shift operation. Under control of this timing circuit, then, the word contained in the Z-register is shifted a number of places determined by the SK-designator of the instruction word in a parallel fashion and the resulting shifted data word is then stored in the shift register.

ADD (X) to (A)

To perform addition, the computer of this invention requires two separate pulses. The generation of these pulses are controlled by subcommands 19 and 20. Because the computer of this invention is subtractive in nature, addition is performed by complementing one of the numbers and subtracting it from the other. The subtraction process is actually performed by a group of circuits called the borrow tree. A borrow tree adder/subtractor suitable for use with the computer of the present invention is fully described in the aforereferenced Erickson application. It is felt to be unnecessary to go into great detail in explaning the operation of a borrow tree adder/subtractor. However, the circuit of FIG. 37 is included to illustrate the manner in which a single stage, $n$, of the adder may be implemented.

The operation of the subtractor utilized can best be explained by referring to the Truth Table below for a single stage of subtraction.

TABLE IV

| An | Xn | Bn−1 | Dn | Bn |
|----|----|------|----|----|
| 0 | 0 | 0 | 0 | 0 |
| 0 | 0 | 1 | 1 | 1 |
| 0 | 1 | 0 | 1 | 1 |
| 0 | 1 | 1 | 0 | 1 |
| 1 | 0 | 0 | 1 | 0 |
| 1 | 0 | 1 | 0 | 0 |
| 1 | 1 | 0 | 0 | 0 |
| 1 | 1 | 1 | 1 | 1 |

Where:

$An$ = bit $n$ of the accumulator
$Xn$ = bit $n$ of X
$Bn-1$ = borrow from stage $n-1$
$Dn$ = differences $An - (Xn + Bn - 1)$
$Bn$ = borrow to *stage* $n+1$ from stage $n$ From the table the following Boolean equations can be written for the borrow and difference.

(1) $Bn = \bar{A}n\bar{X}nBn-1 + \bar{A}nXn\bar{B}n-1 + \bar{A}nXnBn-1$
$\quad + AnXnBn-1 = Bn-1(\bar{A}n\bar{X}n + AnXn)$ (2) $Dn = \bar{A}n\bar{X}nBn-1 + \bar{A}nXn\bar{B}n-1 + An\bar{X}n\bar{B}n-1$
$\quad + AnXnBn-1 = Bn-1(\bar{A}n\bar{X}n + AnXn)$
$\quad + \bar{B}n-1(\bar{A}nXn + An\bar{X}n)$ $Ln$, the logical difference for stage $n$, may be represented by the following expression.

(3) $Ln = \bar{A}nXn + An\bar{X}n$
(4) $\bar{L}n = \bar{A}n\bar{X}n + AnXn$

Using the expression for the logical difference the expression for the difference and borrow may be rewritten as follows:

(5) $Bn = \bar{L}nBn-1 + \bar{A}nXn$
(6) $Dn = \bar{L}nBn-1 + Ln\bar{B}n-1$

The equations are now in a form suitable for implementation. The subtractive mechanism consists primarily of a double rank register, the first rank of which is set to the logical difference as defined in the Equation 3 and the second rank contains the borrow as given by Equation 5. The difference put in the accumulator is given by Equation 6.

One stage of the subtractor is shown in FIGURE 37. The first rank indicated generally by numeral 37–10 is set to all 1's and cleared to the appropriate logical difference at the appearance of the ADD I pulse.

The second rank indicated generally by numeral 37– 11 is set to the borrow, either by the $\bar{A}nXn$ input to the gates 37–12 or by a borrow signal from a previous stage which cannot be satisfied in stage N. This borrow signal from a lower-order stage is applied to $\bar{O}$ 37–13.

It must be remembered that $Bn-1$ in the expression is a function of $Bn-2$. Substituting in Equation 5 gives:

(7) $Bn = \bar{A}nXn + Ln(An-1Xn-1 + Ln-1Bn-2)$

A complete expansion for $Bn$ would include terms for all 24-bits of the register. In order to obtain the greatest speed advantage from parallel subtraction it is desirable to be able to speed up the process of forming the borrow by including a look ahead scheme for propagating the borrow. The first step is to add a gate to each borrow flip-flop which will propagate the borrow two stages.

The logical equation for this gate is:

(8) $Bn = Bn - 2\bar{L}n\bar{L}n - 1$

The 24 stages of the addend register are divided into two sections, each section into two divisions and each division into two groups. Borrows are generated in the highest order stage of each group, division, or section, and propagated to the highest-order stage of the next.

The equations for these borrows are:

Inter division borrow:

(9) $Bn - Bn - 6(\bar{L}n\bar{L}n - 1\bar{L}n - 2\bar{L}n - 3\bar{L}n - 4\bar{L}n - 5)$ Inter section borrow:

(10) $Bn = Bn - 12(\bar{L}n\bar{L}n - 1 \ldots \bar{L}n - 10\bar{L}n - 11)$

This subtractor has an end-around borrow. That is, a borrow is propagated from the highest-order stage to the lowest-order. By using the look ahead scheme outlined above, it is possible to greatly decrease the add time from that resulting when borrows are merely rippled through from one stage to the next.

After the borrow flip-flops 37–11 and logical difference flip-flops 37–10 have been set to their proper values, when ADD II pulse appears from the circuit of FIG. 39, $Ln$ for $Bn-1=0$, or $\bar{L}n$ for $Bn-1=$ is transferred to the accumulator or A-register 37–14. Actually, depending upon the length of the memory cycle which controls the ADD I and ADD II pulses, the Borrow-register may not be set correctly when the ADD II pulse appears. However, double gating is used so $An$ will change states if $Bn-1$ changes.

FIG. 38 illustrates stage 19 of the C-register, which when set, causes ADD Pulse I to be generated for forming the logical difference and for setting the respective stages of the Borrow-register. The flip-flop 38–10 forming stage 19 of the C-register is set when the gate 38–11 becomes fully enabled. This gate is enabled whenever bit 19 of the memory output register is set at the M to C strobe time. The output signal from this gate in addition to setting the flip-flop 38–10 passes to a first input terminal of $\bar{O}$ 38–12. The $\bar{O}$ inverts the signal and a logical "0" is therefore applied to the input terminals of the inverters 38–13 and 38–14. The output from inverter 38–13 is connected to the CLEAR terminal of each of the flip-flops comprising the Borrow-register which is indicated by numeral 37–11 in FIG. 37. The effect of this signal is to clear out the previous contents thereof. The output from inverter 38–14 is applied to the SET terminals of each of the flip-flops in the Difference-register, indicated by numeral 37–10 in FIG. 37, causing the Difference-register to contain all "1's."

Subsequently, when the flip-flop 38–10 is set the "1" signal at the output of the "0" side thereof is applied to a first input terminal of the $\bar{O}$ circuits 38–15 through 38–17. The effect of this signal is to maintain the condition which was initiated when gate 38–11 outputted its "1" signal. The "0" output signal from $\bar{O}$ 38–15 is the ADD I pulse which is applied to the gate 37–15 to gate the signals to be added, i.e., $Xn$ and $An$, into the Difference-register 37–10. The "0" output from $\overline{O}$ 38–17 is used as an ADD I pulse for gating the input through gate 37–60. The output from $\overline{O}$ 38–16 is the enable signal for allowing the transmission of the input signals through the gates 37–12 to the Borrow-register.

The output from $\overline{U}$ 38–18 insures reliable operation by clearing the Borrow-register and setting the Difference-register each memory cycle unless an ADD command is present in the C-register. It does this by ANDing together the output from the "1" side of the M to C flip-flop 22–10, the output from the "0" side of flip-flop 38–10 and the output from the "0" side of flip-flop 39–10. When neither subcommand 19 nor subcommand 20 is set into the C-register at the time in the memory cycle when flip-flop 22–10 is set, the $\overline{O}$ 38–12 received a "1" signal from 38–18. The "0" output from this last mentioned circuit is inverted by circuits 38–13 and 38–14 to provide the clearing and setting signals. If either or both of the flip-flops for subcommands 19 and 20 are set, the $\overline{O}$ 38–18 will have a "1" signal applied thereto and will output a "0" signal to $\overline{O}$ 38–12. As has already been mentioned, under this condition the gate 38–11 provides the "1" signal for effecting the clearing and setting operation.

Like the other stages of the C-register stage 19 may be cleared either by a Master Clear signal or by the enabling of the gate 38–19. Both of these conditions cause a "1" signal to pass to the OR circuit 38–20 to the CLEAR terminal of the flip-flop 38–10.

The computer of this invention executes subcommand 20 when the flip-flop 39–10 is set. The signal from gate 39–11 which sets the flip-flop 39–10 also passes through an input terminal of the $\overline{O}$ 39–12 through 39–15.

The $\overline{O}$ 39–12 produces a "0" output which is used upon the application of the ADD I pulse to gate the contents of the Difference-register to the accumulator. In FIG. 37 this gate is represented by $\overline{O}$ 37–17. Similarly, the output from gate 39–13 is applied to this same gate (37–17) and is used to gate the contents of the Borrow-register 37–11 to the accumulator 37–14 upon application of the ADD II pulse. In a similar manner the gates 39–14 and 39–15 provide a "0" output for gating the contents of the Difference-register and the Borrow-register through the gates 37–18 and 37–19 to the accumulator. Because of the manner in which the logical sum signals and borrow signals are combined, the result stored in the accumulator is the true logical sum or difference of the data stored originally in the accumulator and X-register.

*Search for (Z)*

The execution of subcommand 21 involves an interrogation of the search memory as well as the encoding and storage of the binary address of the "find" if one is obtained. As has been mentioned in the introductory portion of the specification, the search memory is a device in which a plurality of binary coded data words may be stored and arranged such that the contents of the memory may be interrogated in a parallel fashion to determine whether or not a given word is stored in the memory. If a "find" is detected indicating that the word being sought is stored in the memory, a read-out is obtained of the address of the memory location at which a word is stored. A search memory of the type suitable for use with the computer of the present invention is described in a copending Keefer application, Serial No. 19,833, which was filed April 4, 1960, and is assigned to the assignee of the present invention. This search memory is comprised of two main sections or matrices termed the complement and the non-complement sections, respectively. The information contained in one matrix is the one's complement of the information or code contained in the other. Each row of each section of the matrix is provided with an interrogate line, while each column of each section has an output line associated therewith. The code word being searched for is impressed by way of a code translator or other suitable device to the proper interrogate lines in a parallel manner. The output line associated with each column of cores storing the word being searched for will have substantially no signal induced therein. The remaining output lines, however, will carry an induced voltage. It can be seen then that the absence of an output signal on a given line indicates that the word being searched for is contained in the memory matrix in the column of cores associated with the output line, while the presence of a signal on the remaining lines indicates the absence of the desired word in the memory.

In the search memory of this invention there are 128 separate storage locations, each 24 bits in length. When a word being sought is put into the input digit drivers of the search memory and the search subcommand is executed the "find" pulse will appear on the output line associated with the address at which this word is stored.

Referring to FIG. 40, when stage 21 of the memory output register is set at the memory strobe time, the gate 40–10 outputs a "1" signal which sets both the C-register flip-flop 40–11 and the flip-flop 41–10 of the search memory timing chain. Additionally, a "1" signal from gate 40–10 passes to the $\overline{O}$ 40–12, thereby forcing its output to the "0" level. This "0" signal is again inverted by means of $\overline{O}$ 40–13 to produce a "1" signal which is applied to the Clear terminal of each flip-flop in the EKR-register to clear out the address which was stored therein on a previous search command.

Referring now to FIG. 41 which shows the timing circuit for controlling a read out from the search memory, the output from gate 40–10 sets the Search flip-flop 41–10 to its "1" state. Upon being switched to its "1" state the output from the "0" side of the flip-flop goes to its logical "1" level and is applied through an inverter 41–11 to a set of gates associated with the search memory digit drivers which enables them and allows the information contained in the Z-register to activate the digit drivers in accordance with the information contained therein. This enabling signal for the digit drivers remains on until the flip-flop 41–10 is cleared. This is a self-clearing flip-flop. More specifically, $\overline{O}$'s 41–12 and 41–13 and the delay line 41–14 cause a short negative pulse (logical "1" signal) at the time the flip-flop 41–10 is set, and this pulse is delayed by delay line 41–15. The time constants of this last mentioned delay line are set so that the strobe pulse for the search memory will be sufficiently long to permit a complete read out. After passing through the delay line 41–15 the "1" signal is inverted twice by circuits 41–16 and 41–17 such that a "1" signal is applied to the CLEAR terminal of flip-flop 41–10.

When the flip-flop 41–10 sets, the gate 41–18 momentarily has "1" signals applied to both of its input terminals. However, after a delay time fixed by the constants of the delay lines 41–19 this gate is inhibited. While enabled, however, it outputs a "1" signal which passes through a delay line 41–20 and through a pair of inverters 41–21 and 41–22. After passing through the inverter 41–22 this "1" signal is applied to a plurality of inverters 41–23 through 41–30. The resulting "0" signals appearing at the output of this string of inverters is used to strobe the AND circuits connected to the output terminals of the search memory sense amplifiers. As was mentioned, when a "find" occurs a "1" signal is absent from the output of the sense amplifiers associated with the register in which the word being sought is stored. The "0" output is ANDed together with the output from one of the inverters 41–23 through 41–30. The resulting "1" signal which appears at the output of the AND gate feeds into an encoding network which converts the decimal address to binary and sets the equality count register. Had the word being sought not been contained in one of the memory registers, the AND gate would not have been enabled and the EKR-register would not have been loaded. Decimal to binary encoders, as such, are well known in the art and it is felt to be unnecessary to describe a typical embodiment of such a device in detail.

In order to write information into the search memory, subcommand 10 must be executed with the T-designator of the PCR-register equal to 010 (decimal 2). As was described when the details of subcommand 10 were explained, the output from the "1" side of flip-flop 10–10 and the translation of the PCR-register are ANDed together and the resulting output from the AND gate is used to initiate the search write timing chain. Under control of this timing chain, the magnetic state of the storage elements in the search memory are altered in accordance with the data word contained in the Z-register. The particular search memory register to undergo alteration, however, is determined by the address contained in the lower ten bits of the PCR-register.

Subcommand 22 checks the contents of the search register (EKR) to determine whether a word sought during the execution of subcommand 21 was contained in the search memory. In the event that the word sought was not in the search memory, subcommand 22 causes the address contained in the SAC-register to be advanced by "1".

FIG. 42 illustrates the stage of the C-register used to implement subcommand 22. This stage comprises a flip-flop 42–10 having a gate 42–11 connected to the output of the "1" side of the flip-flop. Flip-flop 42–10 will be set when stage 22 of the memory output register is set at the memory strobe time. Under this condition the gate 42–12 is fully enabled and outputs the "1" signal to the Set terminal of flip-flop 42–10. The other input to gate 42–11 comes from a gate and an inverter associated with the EKR-register. This gate has an input from the "0" side of each stage of the EKR-register so that when the register is cleared, indicating that there has not been a "find," it outputs a "1" signal which passes through another inverter causing a "0" signal to appear on conductor 42–13. It can be seen, then, that when the flip-flop 42–10 is set, gate 42–11 will be fully enabled and will output a "1" signal. This "1" signal initiates the timing chain for incrementing SAC. However, if a "find" were detected, at least one of the stages of the EKR-register would have been set, causing the gate associated therewith to be disabled, the result being that the gate 42–11 would also be disabled and the timing chain would not be initiated. As has already been fully described in connection with FIG. 25, the incrementing process is executed by transferring the address contained in the SAC-register to the second rank thereof, and subsequently gating the output from the translator back to the SAC-register.

*Test stop/jump conditions*

The last subcommand to be considered is subcommand 23. When this subcommand is executed, the computer tests the conditions of the manually settable Jump keys and Stop keys. Depending upon the setting of these keys various modes of operation are possible. As has already been mentioned, the SK-designator of the instruction word (FIG. 2d) specifies which one of the operations listed in the column labeled "SJ-Translation" in the table of FIG. 3 are to be effected. For example, if the SJ-designator is 010, a Jump command will be executed provided key number 2 on the display panel is in the operate position. According to which keys are selected, the machine acts as follows:

No S or J keys set _____ No advance SAC, stop clock.
S key set _____ Advance SAC.
J key set _____ No advance SAC.

In FIG. 43, there is shown in block diagram form the circuitry used to implement the Stop-Jump subcommand.

Flip-flop 43–10 is the C-register flip-flop for stage 23. This flip-flop, like the others in the C-register, is set if stage 23 of the memory output register is set at the time that the M to C strobe pulse is generated by the main timing circuits of FIG. 22. The "0" output appearing at the "1" side of flip-flop 43–10 when it is set is applied by way of conductor 43–11 to a first input terminal on a set of $\overline{O}$'s 43–12 through 43–19. The output from the gates are connected to the Set side of individual flip-flops 43–20 through 43–27. The gate 43–19 associated with the machine jump flip-flop 43–20 does not have a key input, but becomes active whenever the J-designator is 000. In other words, whenever the instruction word in question has the SJ-designator of this value the computer undergoes an unconditional jump to a new subroutine of instructions.

The key 1 Jump flip-flop 43–21 is set when three conditions are satisfied. First of all, the Stop-Jump flip-flop 43–10 must be set. Secondly, the SJ-designator of the instruction word must be 001 and finally Key 1 on the operator's console must be closed. When Key 1 is closed a "1" signal is applied to the inverter 43–28 causing it to output a "0" signal to the gate 43–18. It can be seen, then, that a Key 1 Jump is conditional. That is, not only must the instruction word specify a Key 1 Jump, but also the push button switch on the operator's console must be in a closed position before the Jump step will be executed. The Key 2 and Key 3 Jump flip-flops 43–22 and 43–23, respectively, are set in the same manner as was the flip-flop 43–21, except that Key 2 or Key 3, rather than Key 1 must have been in an operate position.

The Machine Stop flip-flop 43–24 is set when the gate 43–15 associated therewith, is fully enabled. This occurs when the Jump-Stop flip-flop 43–10 is set, and when the output from the translator causes a "0" signal to appear on conductor 43–29. This signal will appear on conductor 43–29 when the SJ-designator of the instruction word is 100. When the Machine Stop flip-flop is set the output from the "0" side is a "1" signal. When applied to the $\overline{O}$ 43–30, this "1" signal is inverted and applied to a first input terminal of a gate 43–31. The other input to this last mentioned gate comes from the "1" side of stage 0 of the C-register (flip-flop 12–10). Hence, the gate 43–31 will output a "1" signal on the next $Z_N$ to SAC subcommand. This signal is used to stop the clock from running.

The flip-flop 43–25 through 43–27 performs essentially the same function, the only difference being that flip-flop 43–25 through 43–27 are conditionally set, whereas flip-flop 43–24 is unconditionally set. In other words, in order to set flip-flop 43–26, it is not only necessary that the Stop-Jump flip-flop 43–10 be set and that the PCR-translator be outputting a "0" signal on the conductor 43–32, but also it is necessary that Key 6 on the operator's console be closed. It is only under these conditions that the gate 43–13 will be fully enabled to produce a "1" signal for setting the flip-flop 43–26.

The output from the "0" side of all the flip-flops 43–20 through 43–27 are connected as inputs to a gate 43–33. Whenever any one of the flip-flops is set, then, this last mentioned gate outputs a "0" signal which when inverted by circuit 43–34 produces a signal for disabling the gate 43–35. Gate 43–35 produces an output signal when fully enabled to advance the count contained in the SAC-register. Therefore, it is only when none of the flip-flops 43–20 through 43–27 are set that gate 43–35 can output a signal for advancing the count in SAC.

Once one of the Stop flip-flops 43–24 through 43–27 has been set and the clock stopped, the machine will remain in this condition until the operator again depresses the Run button. The closing of the Run button causes a "1" signal to be applied to the inverter 43–37. The output from the inverter is connected directly to a first input terminal of $\overline{O}$ 43–38, by means of conductor 43–39 and directly to another terminal of $\overline{O}$ 43–38 by way of a delay line 43-40 and an inverter 43-41. Hence, the "0" output from inverter 43-37 fully enables the gate 43-38 for a time period determined by the contents of the delay line 43-40, causing gate 43-38 momentarily to output a "1" signal for clearing the Stop flip-flops 43-25 through 43-27 and for again initiating the clock circuit.

It will be obvious to those skilled in the art that there are modifications of the circuitry employed to implement the computer of this invention that may be made. While a particular embodiment has been discussed and described in detail, it will be understood that the invention is not limited thereto and that it is contemplated to cover any such modifications as fall within the true spirit and scope of the invention as defined by the appended claims.

What is claimed as new and desired to be secured by Letters Patent of the United States is:

1. In a stored program digital computer: memory means for storing sets of instruction word signals, control word signals and operand signals; first and second registerm means; means for extracting from said memory means a predetermined set of control word signals for insertion into said first register; means responsive to the presence of said control words in said first register for developing gating signals; means responsive to certain of said gating signals for extracting from said memory means a selected set of said instruction word signals for insertion into said second register means; instruction word translating means connected to said first and second register means for decoding the instruction word signals; and means responsive to the output from said translating means for selecting a predetermined sequence of said control words from said memory means for performing a function specified by said selected set of said instruction word signals on said operand signals.

2. In a stored program digital computer: memory means for storing sets of instruction word signals, control word signals and operand signals at predetermined locations therein; a plurality of register means; gating means connected intermediate said memory means and said plurality of register means; means for extracting from said memory means a first predetermined set of control word signals for insertion into a first of said plurality registers; means responsive to the presence of said control words in said first register for developing gating signals for said gating means, certain of said gating signals permitting the extraction from said memory means of said instruction word signals for sequential insertion into a second of said plurality of register means; and means including a third of said plurality of registers connected intermediate said first and second register means and translating means connected to said third of said plurality of registers for interpreting at least a portion of the instruction word signals for selecting a second predetermined sequence of said control words for performing the function specified by said instruction word signals on said operand signals.

3. In a stored program digital computer, the combination comprising: memory means for storing at addressable locations therein signals representing operands, control words, and instruction words, said instruction words being comprised of a plurality of designators; first register means connected to said memory means; second register means adapted to be connected to said memory means; third register means adapted to be connected to said second register means; means for reading out a control word from said memory means to said first register means; means responsive to the presence of a first control word in said first register means for controlling the transmission of a predetermined one of said instructions from said memory means to said second register means; means responsive to the presence of a second control word in said first register means for transferring the contents of said second register means to said third register means; means connected to said third register means for developing control signals in accordance with the bit pattern of said instruction word designators; and means responsive to the presence of other control words in said first register means and said control signals for selectively transmitting said operands from or to said second register means.

4. In a stored program digital computer, the combination comprising: memory means for storing at addressable locations therein signals representing operands, control words, and instruction words, said instruction words being comprised of a plurality of designators; first register means connected to said memory means; second register means adapted to be connected to said memory means through gating means; third register means adapted to be connected to said second register means through other gating means; means for reading out a control word from said memory means to said first register means; means responsive to the presence of a first control word in said first register means for developing enabling signals for said gating means for controlling the transmission of a predetermined one of said instructions from said memory means to said second register means; means responsive to the presence of a second control word in said first register means for developing other gating signals for said other gating means for transferring the contents of said second register means to said third register means; means connected to said third register means for developing control signals in accordance with the bit pattern of said instruction word designators; and means responsive to the presence of other control words in said first register means and said control signals for selectively transmitting said operands from or to said second register means.

5. In a stored program digital computer: memory means for storing sets of instruction word signals, control word signals and operand signals at predetermined locations therein, said instruction word signals arranged in groups to form a plurality of designators; a plurality of register means; means for sequentially extracting from said memory means a first predetermined set of control word signals for insertion into a first of said plurality register; means responsive to the presence of said control words in said first register for developing gating signals, certain of said gating signals permitting the extraction from said memory means of said instruction word signals for sequential insertion into a second of said plurality of register means; means including a third of said plurality of register connected intermediate said first and second register means for interpreting at least a portion of the instruction word signals for selecting a second predetermined sequence of said control words for performing a specified function on said operand signals; means including a fourth of said plurality of register means adapted to receive said instruction word signals; translating means connected to said fourth register means for examining said designators and producing control signals in accordance with said designator signals; gating means responsive to other of said gating signals and to said control signals for determining the path of transmission of said operand signals between said plurality of register means.

6. In a stored program digital computer: memory means for storing sets of instruction word signals, control word signals and operand signals at predetermined locations therein, said instruction word signals arranged in groups to form a plurality of designators including a source designator and a destination designator; a plurality of register means; means for sequentially extracting from said memory means a first predetermined set of control word signals for insertion into a first of said plurality register; means responsive to the presence of said control words in said first register for developing gating signals, certain of said gating signals permitting the extraction from said memory means of said instruction word signals for sequential insertion into a second of said plurality of register means; means including a third of said plurality of register connected intermediate said first and second register means for interpreting a first designator of the instruction word for selecting a second predetermined sequence of said control words for performing a specified function on said operand signals; means including a fourth of said plurality of register means adapted to receive said instruction word signals; translating means connected to said fourth register means for examining said source and destination designators and for producing control signals in accordance with said designator signals; gating means responsive both to other of said gating signals and to said control signals for determining the path of transmission of said operand signals between said plurality of register means.

7. In a stored program digital computer: memory means for storing sets of instruction word signals, control word signals and operand signals at predetermined locations therein, said instruction word signals arranged in groups to form a plurality of designators including a source designator and a destination designator; a plurality of register means including a control register, a memory communications register, a storage address register and a program control register; means for sequentially extracting from said memory means a first predetermined set of control words signals for insertion into said control register; means responsive to the presence of said control words in said control register for developing gating signals, certain of said gating signals permitting the extraction from said memory means of said instruction word signals for sequential insertion into said memory communications register; means including said storage address register connected intermediate said control and said memory communications registers for interpreting a first designator of the instruction word for selecting a second predetermined sequence of said control words for performing a specified function on said operand signals; means including said program control register connected to receive said instruction word signals from said memory communications register; translating means connected to said program control register for examining said source and destination designators and producing control signals in accordance with said designator signals; gating means responsive to other of said gating signals and to said control signals for determining the path of transmission of said operand signals between other of said plurality of register means.

8. In a stored program digital computer: memory means for storing at addressable storage locations therein signals representing control words and instruction words, said instruction words being comprised of a plurality of designators and being stored in said memory means in a predetermined order in sequential storage locations; a control word address register; an instruction register for at least temporarily holding said instruction words when read out from said memory means; a plurality of manually operable switches; translator means associated with said instruction register for developing identifying signals in accordance with the bit pattern of one of said designators; means for determining whether one of said switches identified by said identifying signals is in an operative position and if not for advancing the count in said control word address register by one.

9. Apparatus as in claim 8 and further including an instruction word address register adapted to receive another of said designators in the event that the switch specified by said identifying signal is in an operative position.

10. In a stored program digital computer: memory means for storing at addressable locations therein signals representing control words and instruction words, said instruction words being comprised of a plurality of designators and stored in a predetermined order in sequential addresses in said memory means; a control register connected to said memory; a control word address register connected to said memory for effecting a readout of a particular control word from said memory to said control register; an instruction register; an instruction word address register; means for placing the instruction word specified by the contents of said instruction word address register in said instruction register; a plurality of manually operative switches, each having operative and nonoperative positions; means connected to said instruction register for examining one of said designators and developing identifying signals for indicating whether a predetermined one of said switches is in an operative position; and means for advancing the address in said control word address register by one in the event that the predetermined one of said switches is in its nonoperative position.

11. Apparatus as in claim 10 and further including means for transferring another designator of said instruction word from said instruction register to said instruction word address register and for preventing the address advance in the event that said predetermined switch is in its operative position.

12. In a stored program digital computer: memory means for storing at addressable storage locations therein signals representing in binary code control words and instruction words, said instruction words being comprised of a plurality of designators and stored in a predetermined order in sequential storage locations; a control word register adapted to temporarily hold control words read out from said memory for developing gating signals in accordance with the control word code pattern contained therein; a control word address register adapted to receive address representing signals for accessing said control words in said memory; an instruction register for holding instruction words read out from said memory; an instruction word address register connected to said memory and adapted to receive address representing signals for accessing said instruction words in said memory; means utilizing said gating signals for transferring a first designator of said instruction word to said control word address register for accessing a first of a predetermined series of control words for insertion into said control word register; a plurality of manually operable switch means having first and second operating positions; translator means connected to said instruction word register for examining a second of said designators and producing an identifying signal in accordance with the bit pattern of said designator; means for combining the gating signals produced by the presence of the first control word in said control word register with said identifying signal for determining whether one of said switch means is in its first operative position and for advancing the count in said control word address register in the event that said one switch is in its second operative position; and means responsive to gating signals produced by the presence of a second of said series of control words in said control register for transferring a third of said designators to said instruction word address register in the event that said one switch is in its first operative position, the arrangement being such that a new sequence of instruction words are executed when said one switch is in its operative position.

References Cited by the Examiner

UNITED STATES PATENTS 3,161,763   12/1964   Glaser _____ 340—172.5

ROBERT C. BAILEY, *Primary Examiner.*

G. D. SHAW, *Assistant Examiner.*

UNITED STATES PATENT OFFICE
CERTIFICATE OF CORRECTION

Patent No. 3,268,872　　　　　　　　　　　　　　　　　　August 23, 1966

Joseph A. Kimlinger

It is hereby certified that error appears in the above numbered patent requiring correction and that the said Letters Patent should read as corrected below.

Column 53, lines 19 and 20, for "registerm" read -- register --.

Signed and sealed this 1st day of August 1967.

(SEAL)
Attest:

Edward M. Fletcher, Jr.　　　　　　　　　　　　　　　EDWARD J. BRENNER
Attesting Officer　　　　　　　　　　　　　　　　　　Commissioner of Patents